(12) United States Patent
Ukai

(10) Patent No.: US 8,291,195 B2
(45) Date of Patent: Oct. 16, 2012

(54) PROCESSING DEVICE

(75) Inventor: Megumi Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/654,209

(22) Filed: Dec. 14, 2009

(65) Prior Publication Data

US 2010/0100708 A1    Apr. 22, 2010

Related U.S. Application Data

(63) Continuation of application No. PCT/JP2007/062412, filed on Jun. 20, 2007.

(51) Int. Cl.
*G06F 9/30* (2006.01)
*G06F 9/40* (2006.01)
*G06F 15/00* (2006.01)

(52) U.S. Cl. ....................................... 712/205
(58) Field of Classification Search .................. 712/205
See application file for complete search history.

(56) References Cited

U.S. PATENT DOCUMENTS

| | | | | |
|---|---|---|---|---|
| 5,010,482 A * | 4/1991 | Keller et al. | ..................... | 710/52 |
| 5,732,254 A | 3/1998 | Tanimoto et al. | | |
| 5,900,025 A * | 5/1999 | Sollars | ..................... | 712/248 |
| 6,493,741 B1 * | 12/2002 | Emer et al. | ..................... | 718/107 |
| 6,535,905 B1 * | 3/2003 | Kalafatis et al. | ..................... | 718/108 |
| 6,898,694 B2 * | 5/2005 | Kottapalli et al. | ..................... | 712/207 |
| 7,185,178 B1 | 2/2007 | Barreh et al. | | |
| 2003/0005262 A1 * | 1/2003 | Kottapalli et al. | ............ | 712/207 |
| 2003/0005263 A1 * | 1/2003 | Eickemeyer et al. | ......... | 712/218 |
| 2004/0003203 A1 | 1/2004 | Ukai | | |
| 2004/0073905 A1 | 4/2004 | Emer et al. | | |
| 2005/0240752 A1 | 10/2005 | Yokoi et al. | | |
| 2005/0240930 A1 * | 10/2005 | Amamiya et al. | ............ | 718/100 |
| 2006/0066623 A1 | 3/2006 | Bowen | | |
| 2006/0136915 A1 | 6/2006 | Aingaran et al. | | |
| 2008/0163216 A1 * | 7/2008 | Li et al. | ......................... | 718/100 |

FOREIGN PATENT DOCUMENTS

| | | |
|---|---|---|
| EP | 1555610 | 7/2005 |
| JP | 2004-038344 | 2/2004 |
| JP | 3683968 | 8/2005 |
| JP | 2005-309762 | 11/2005 |
| JP | 3845043 | 11/2006 |
| JP | 2006-343872 | 12/2006 |

OTHER PUBLICATIONS

"Extended European Search Report" mailed by EPO and corresponding to European application No. 07767250.9 on Mar. 31, 2011.

(Continued)

*Primary Examiner* — Corey S Faherty
(74) *Attorney, Agent, or Firm* — Fujitsu Patent Center

(57) ABSTRACT

A processing device which can execute a plurality of threads includes: an execution unit which executes a command; a supply unit which supplies a command to the execution unit; a buffer unit which holds the command supplied from the supply unit; and a control unit which manages the buffer unit. The buffer unit has a set of buffer elements. Each of the buffer elements has a data unit for storing a command and a pointer unit for defining a connection relationship between the buffer elements. The control unit has a thread allocation unit which allocates a sequence of buffer elements whose connection relationship has been defined by the pointer unit for respective threads executed by the processing device.

22 Claims, 47 Drawing Sheets

OTHER PUBLICATIONS

International Preliminary Report on Patentability, mailed Jan. 21, 2010, in corresponding International Application No. PCT/JP2007/062412 (12 pp.)

International Search Report for PCT/JP2007/062412, mailed Oct. 2, 2007.

Extended European Search Report mailed May 16, 2012 for corresponding European Application No. EP 12 15 3535.

* cited by examiner

FIG.10B

```
TH0_VALID & ( TH0 <= TH1 | ~TH1_VALID )
         & ( TH0 <= TH2 | ~TH2_VALID ) & ... & ( TH0 <= THn | ~THn_VALID )

TH1_SEL = TH1_VALID & ( TH1 <= TH0 | ~TH0_VALID )
        & ( TH1 <= TH2 | ~TH2_VALID ) & ... & ( TH1 <= THn | ~THn_VALID )

TH2_SEL = TH2_VALID & ( TH2 <= TH1 | ~TH1_VALID )
        & ( TH2 <= TH0 | ~TH0_VALID ) & ... & ( TH2 <= THn | ~THn_VALID )

.................

THn_SEL = THn_VALID & ( THn <= TH1 | ~TH1_VALID )
        & ( THn <= TH2 | ~TH2_VALID ) & ... & ( THn <= TH0 | ~TH0_VALID )
```

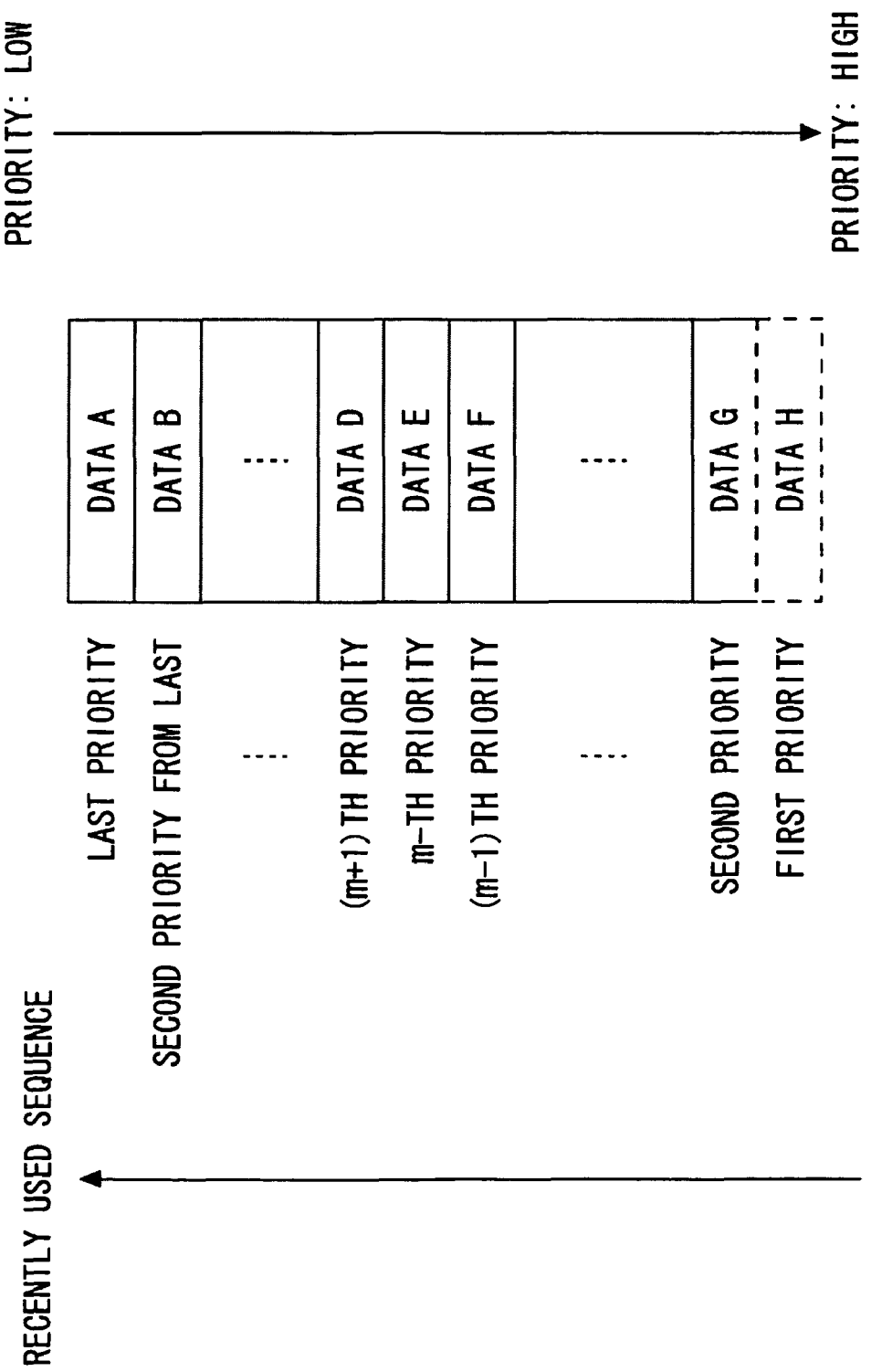

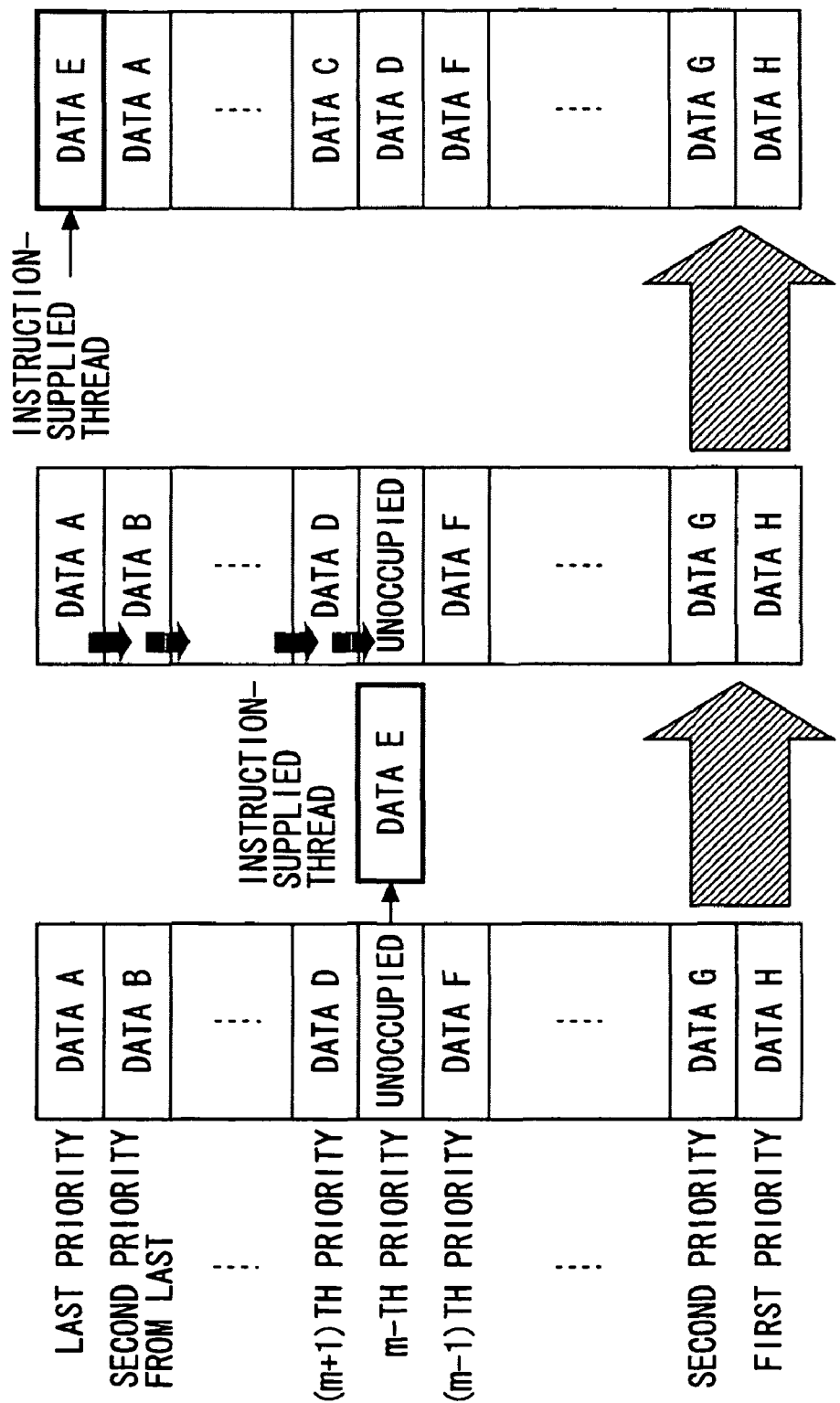

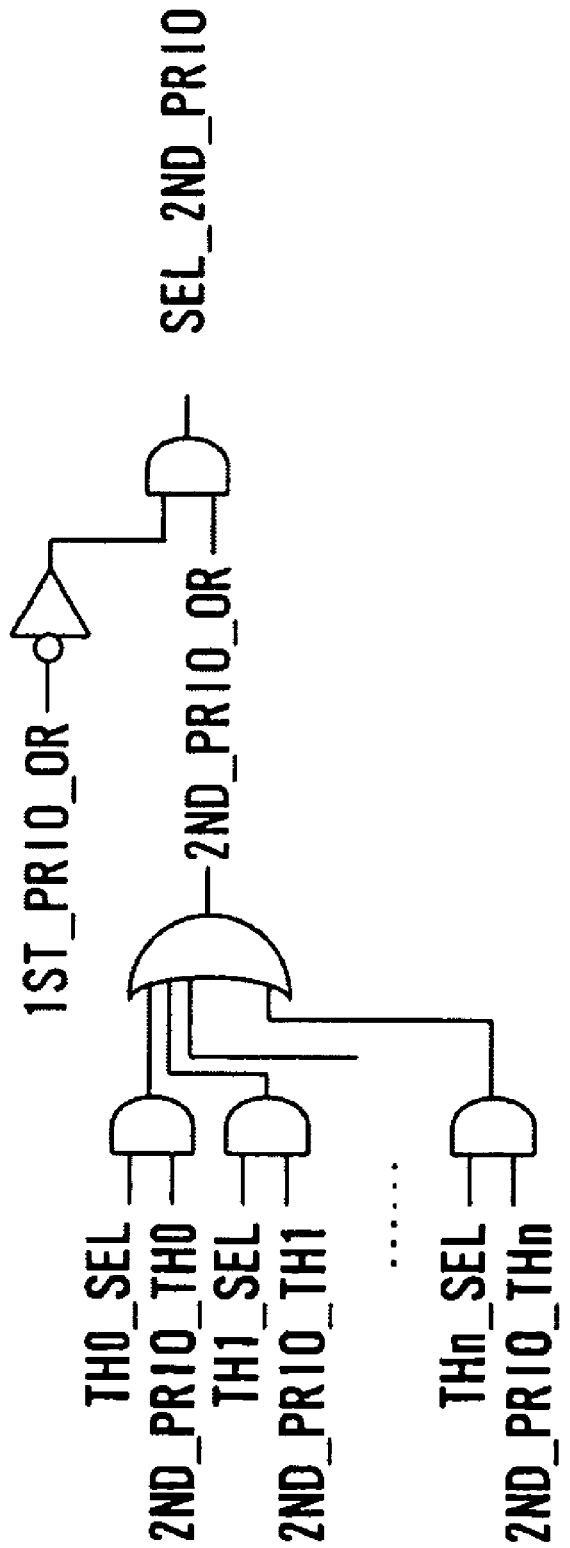

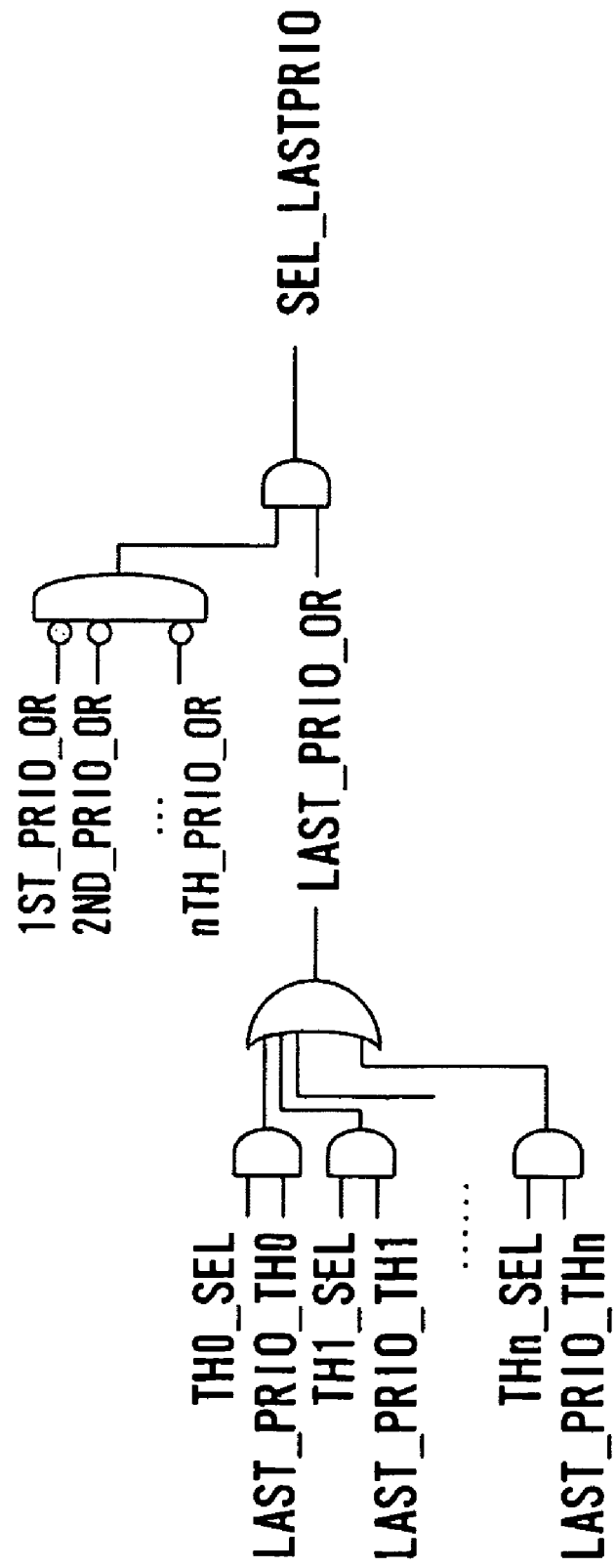

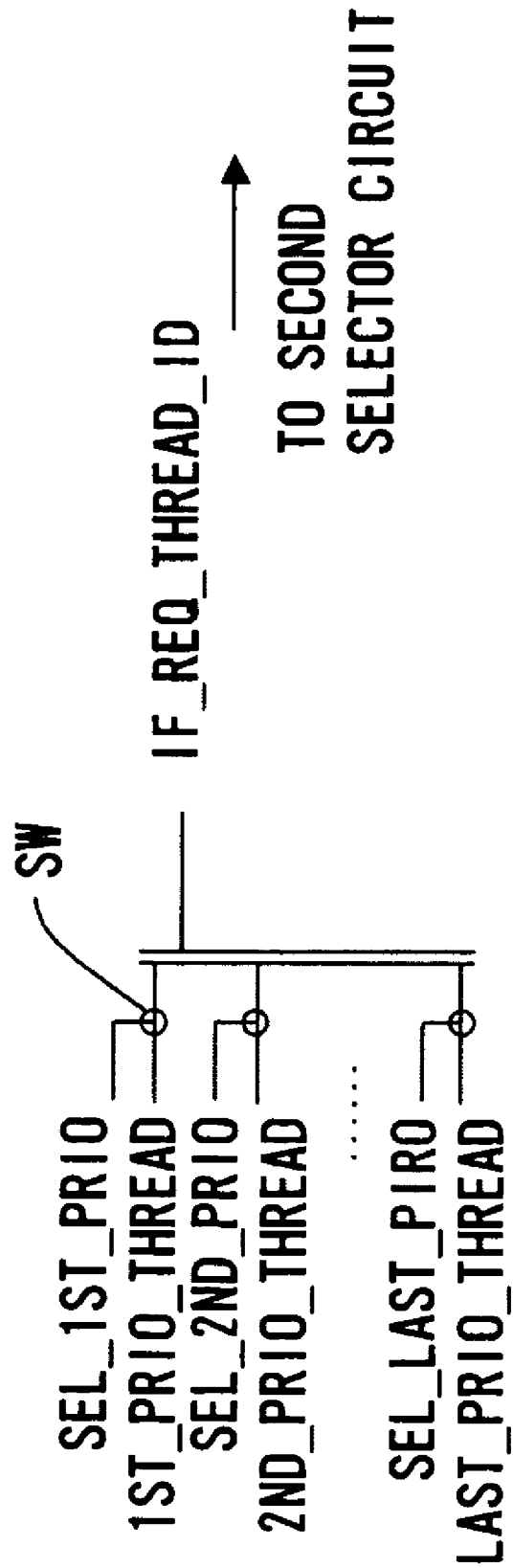

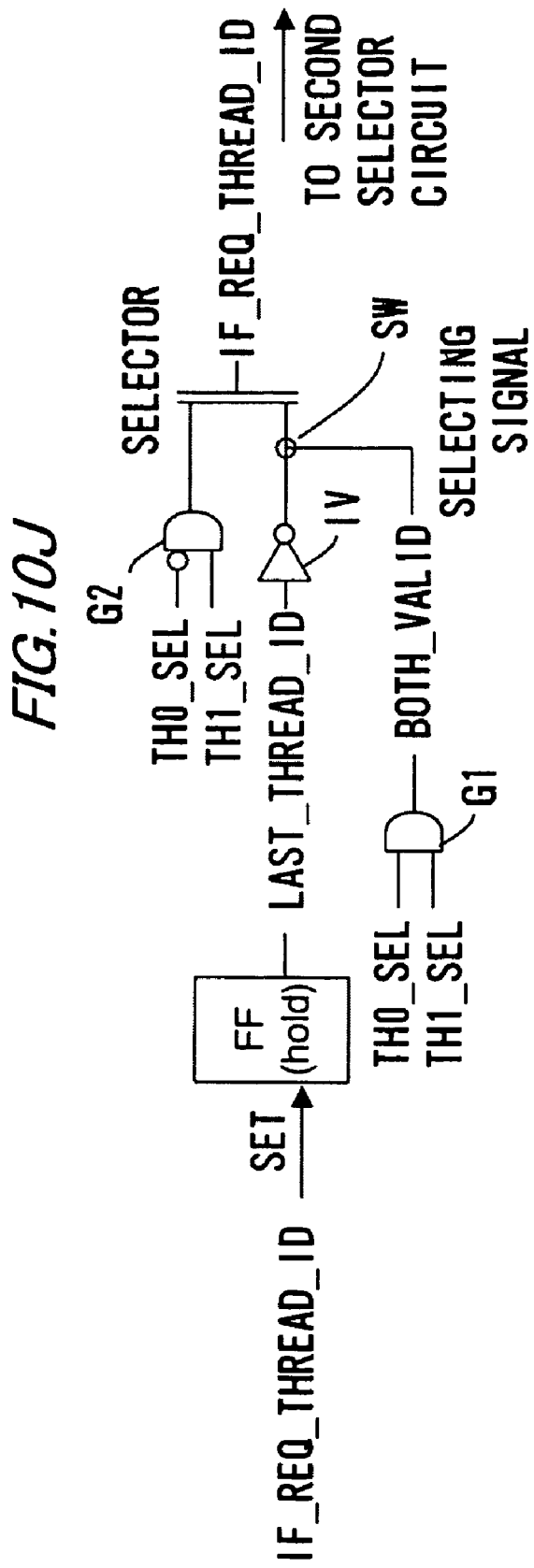

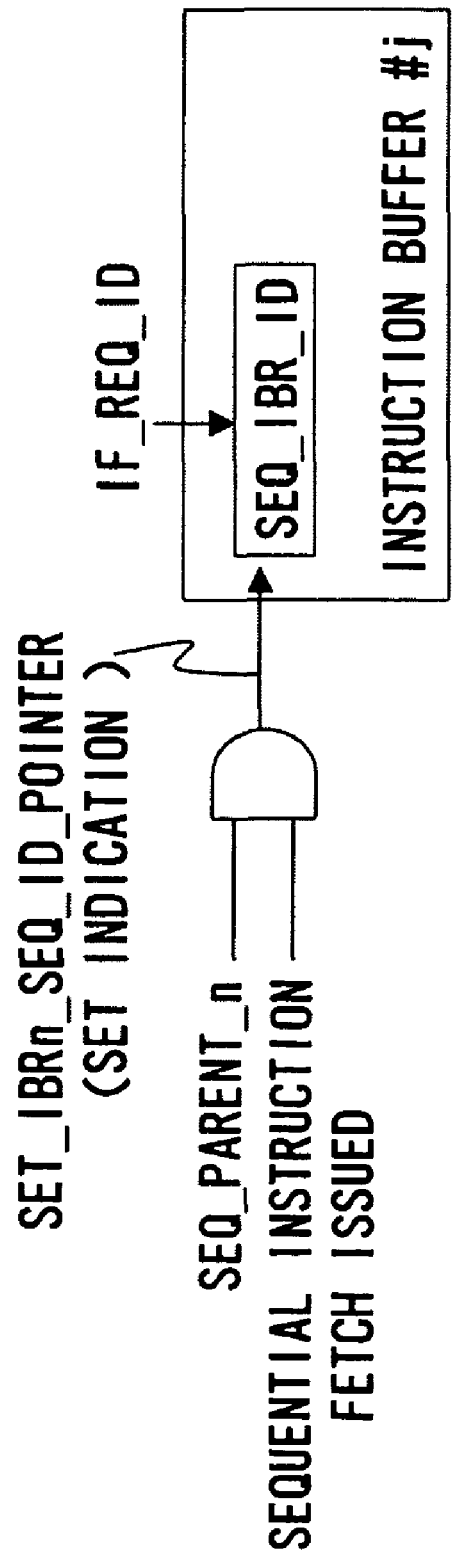

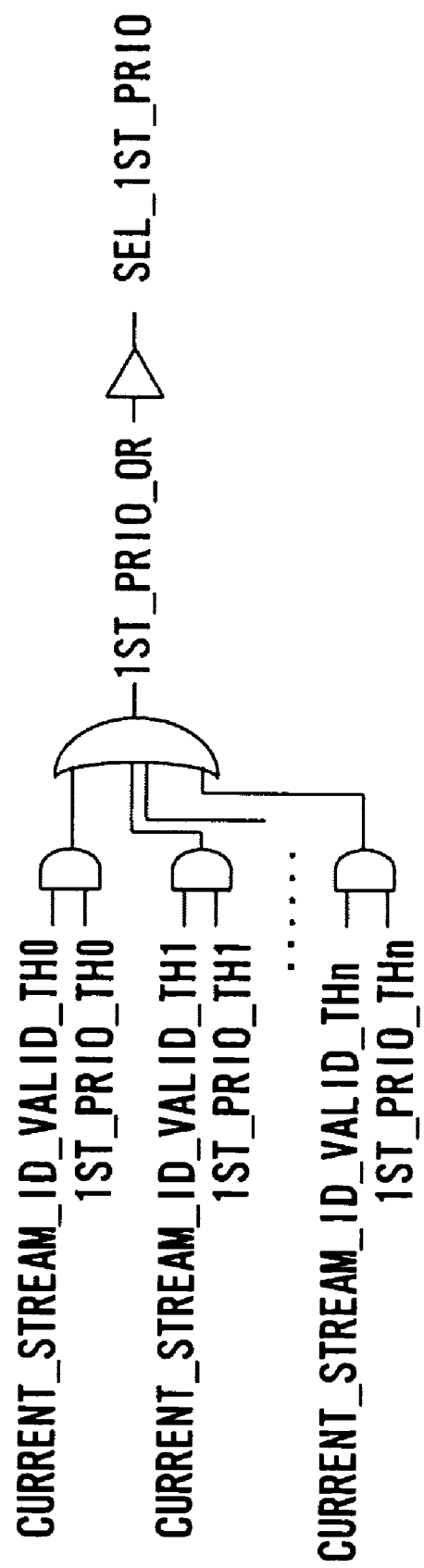

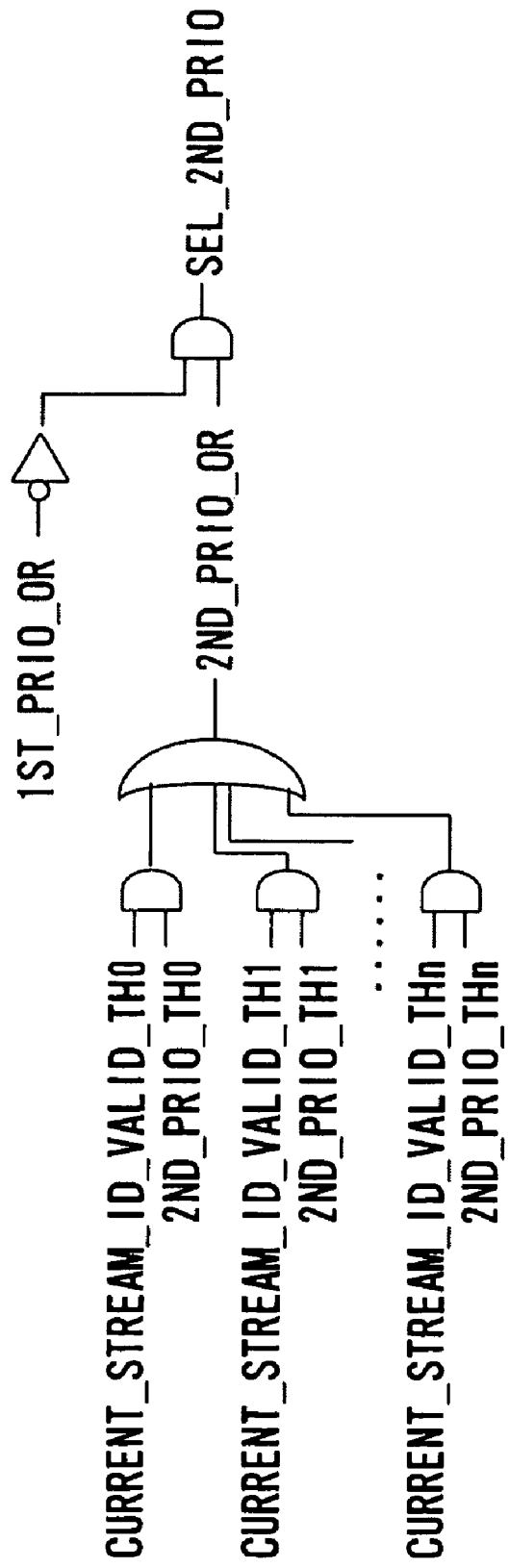

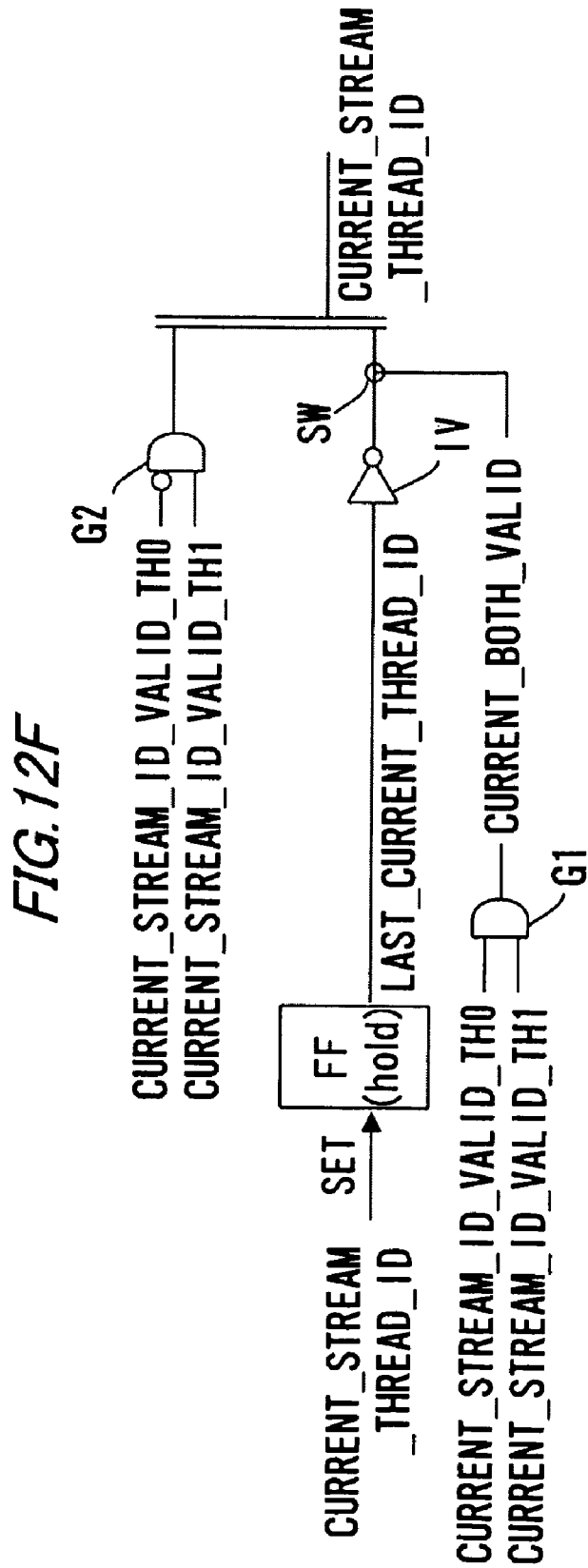

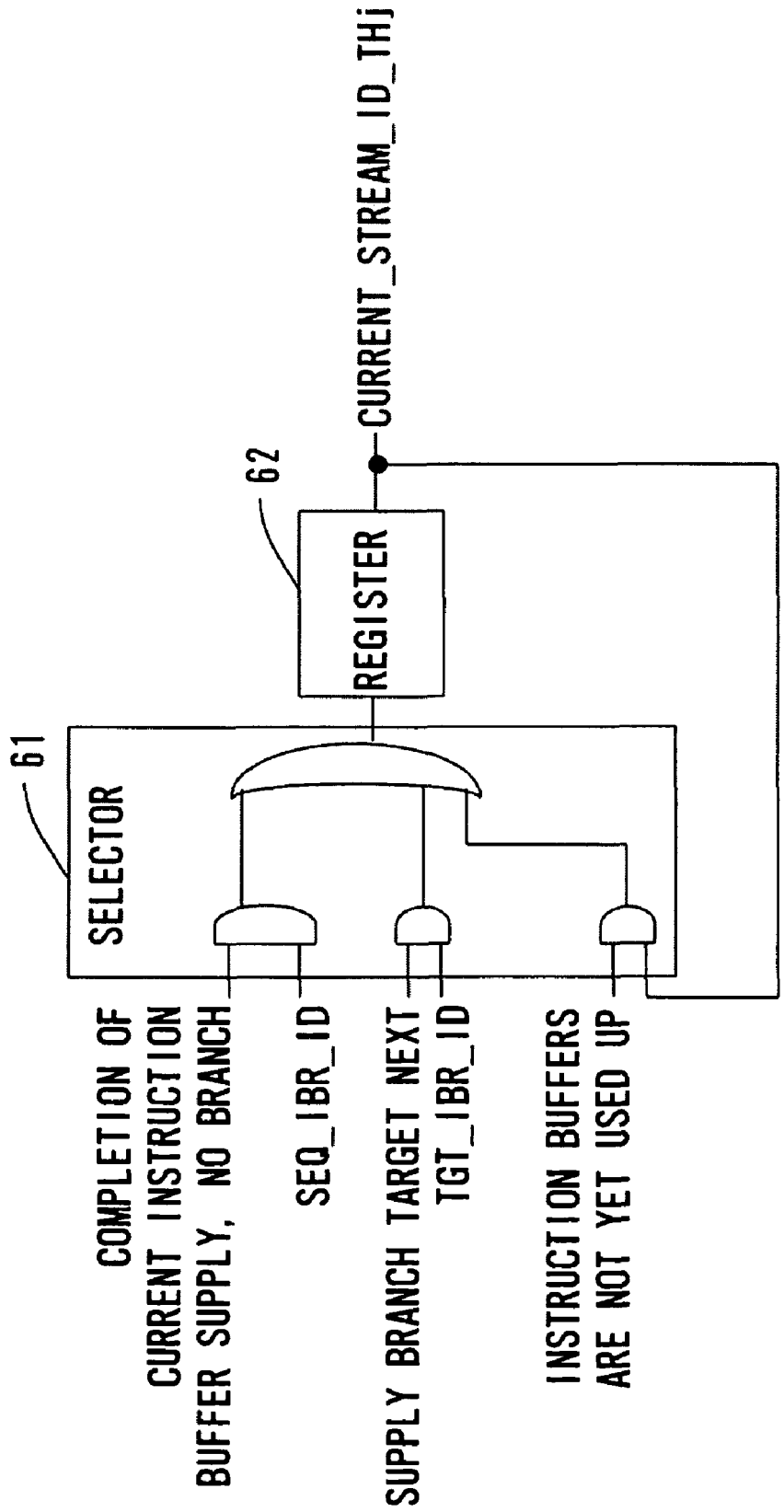

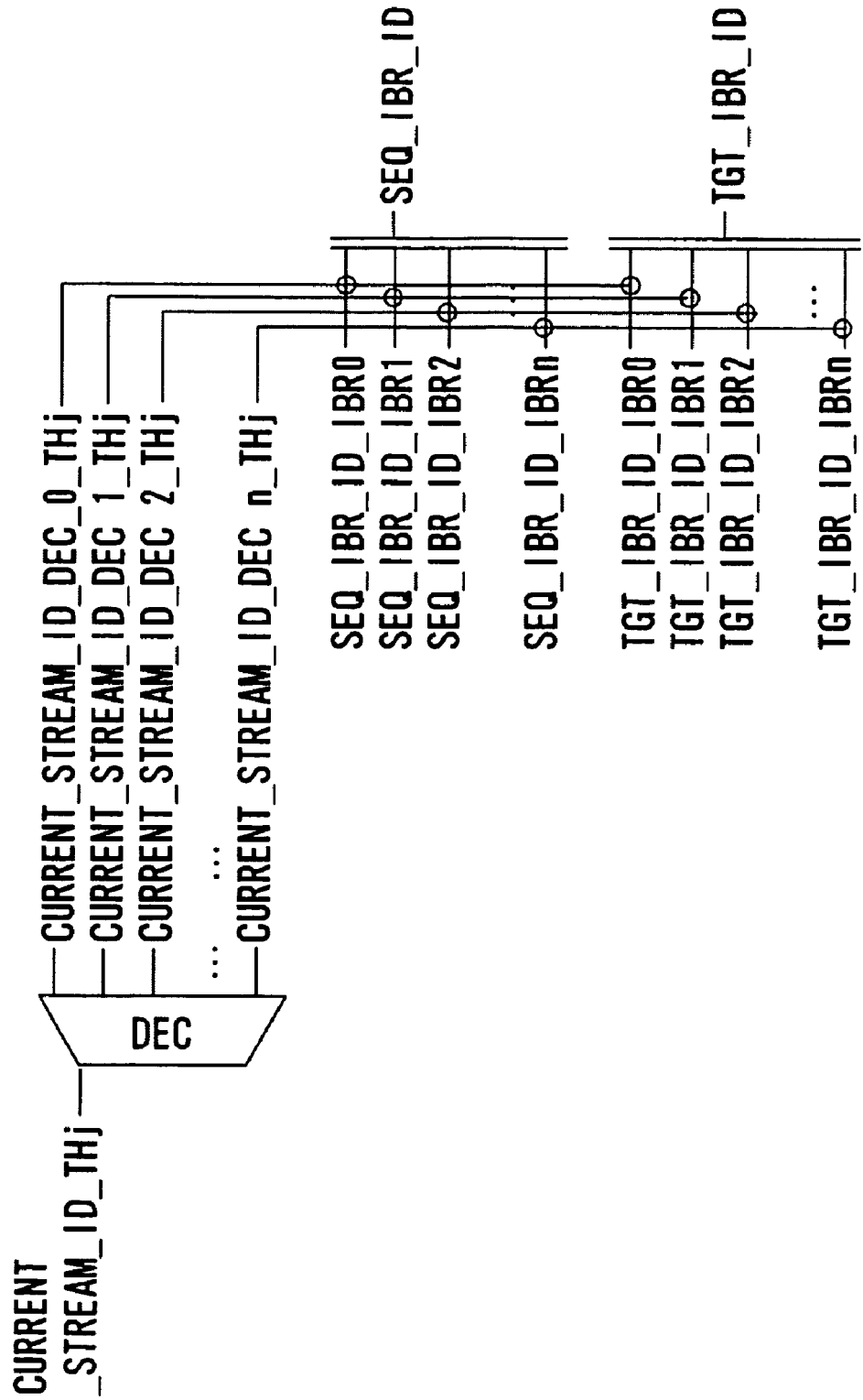

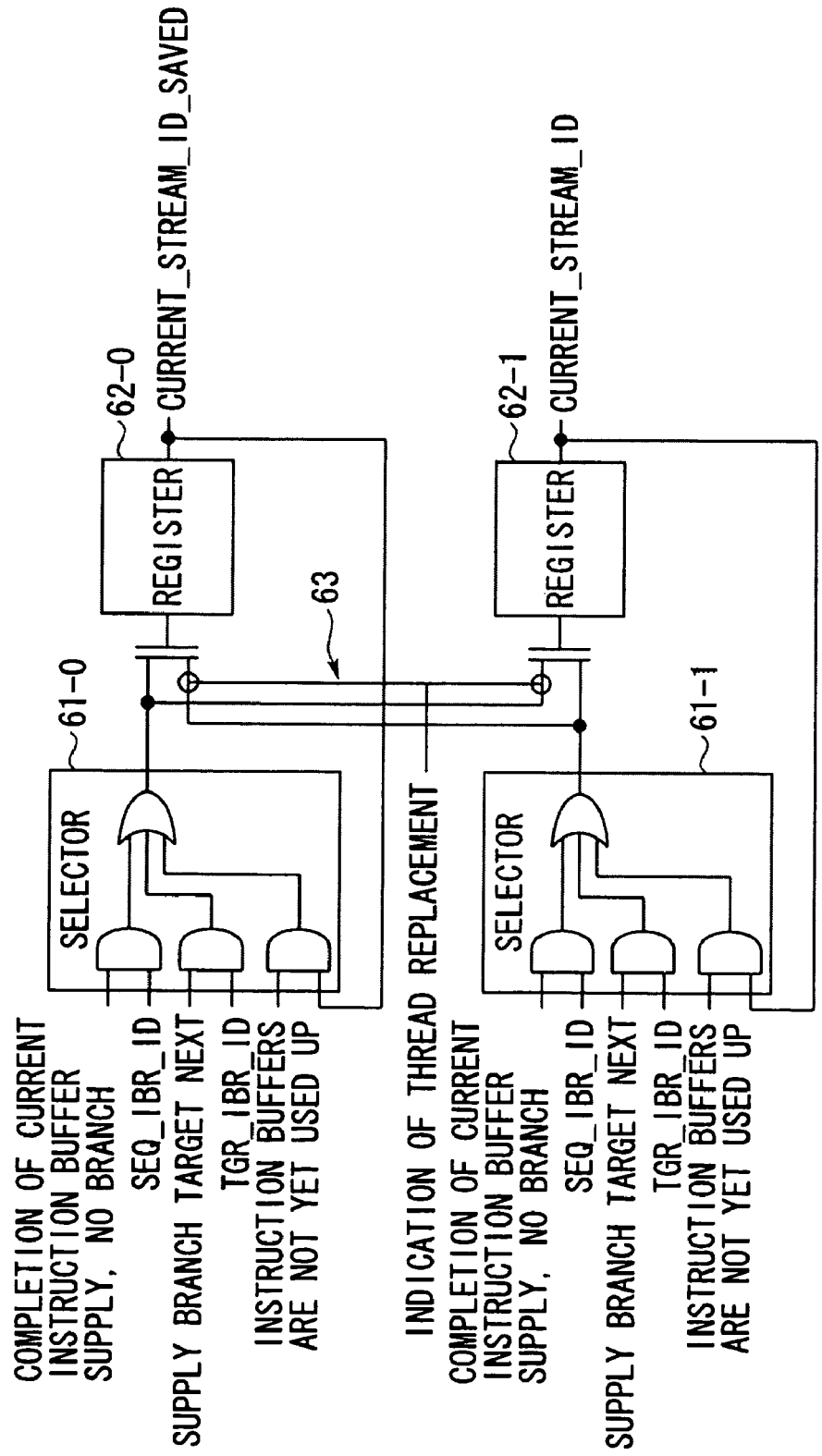

C: INSTRUCTION BUFFER INPUT STAGE
D: INSTRUCTION DECODE STAGE
R: INSTRUCTION BUFFER RELEASE STAGE

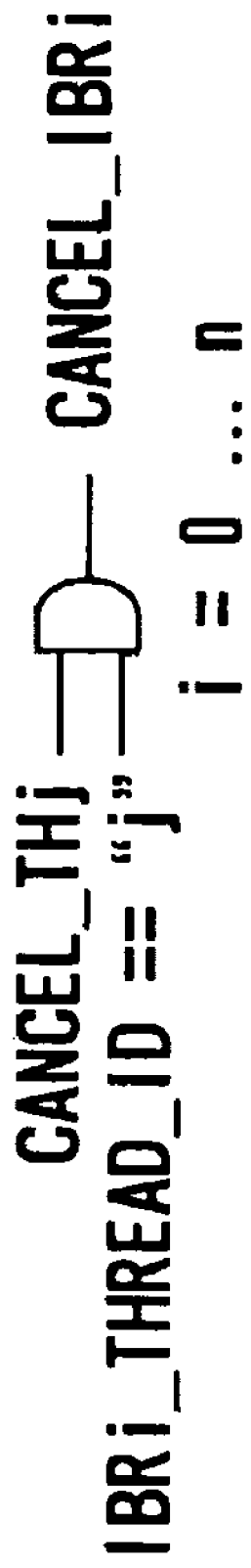

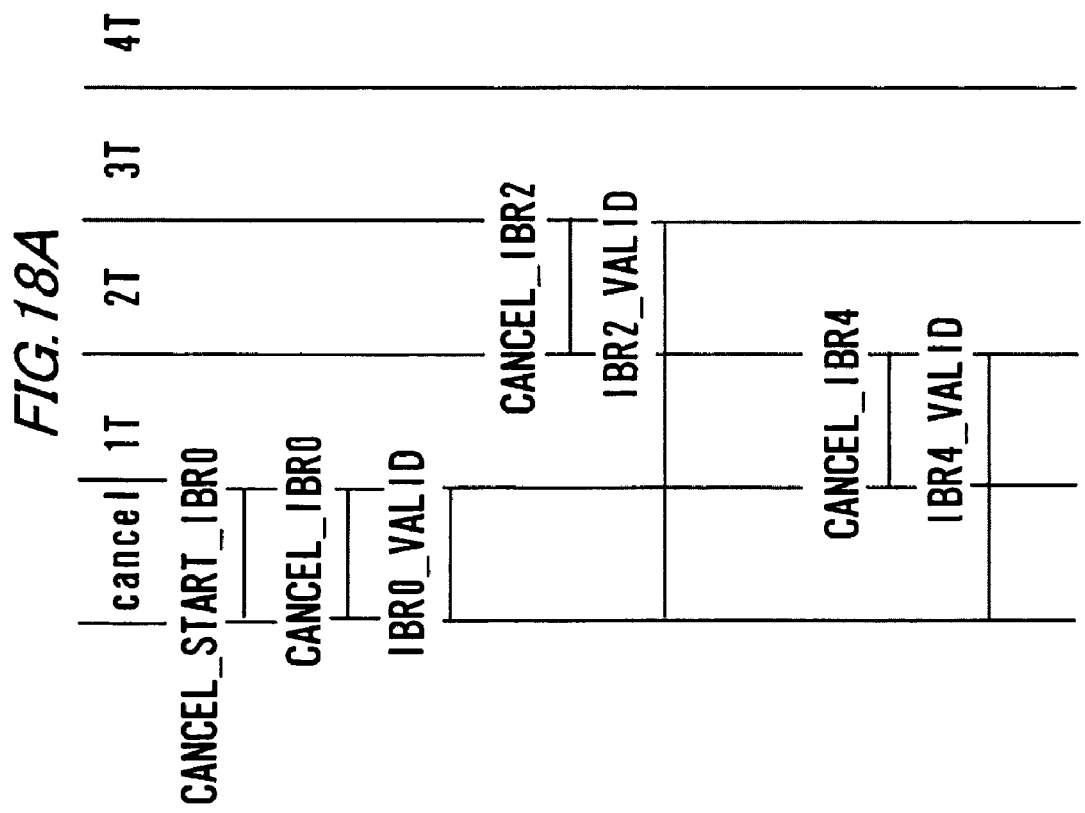

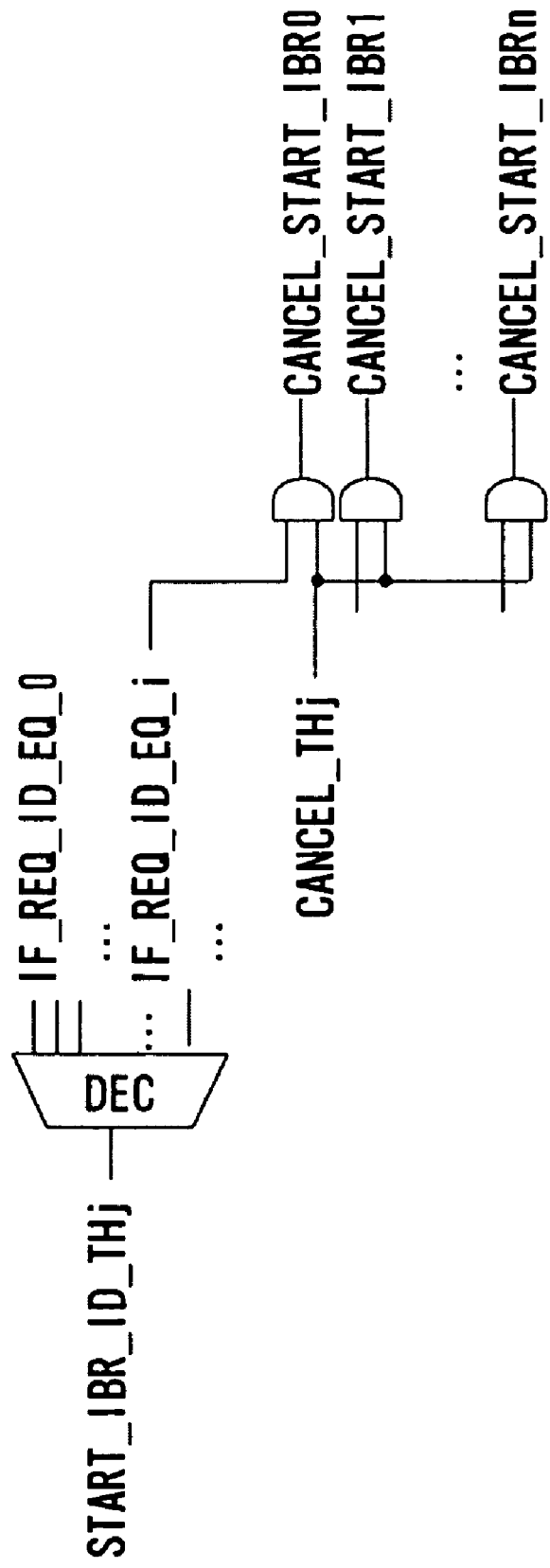

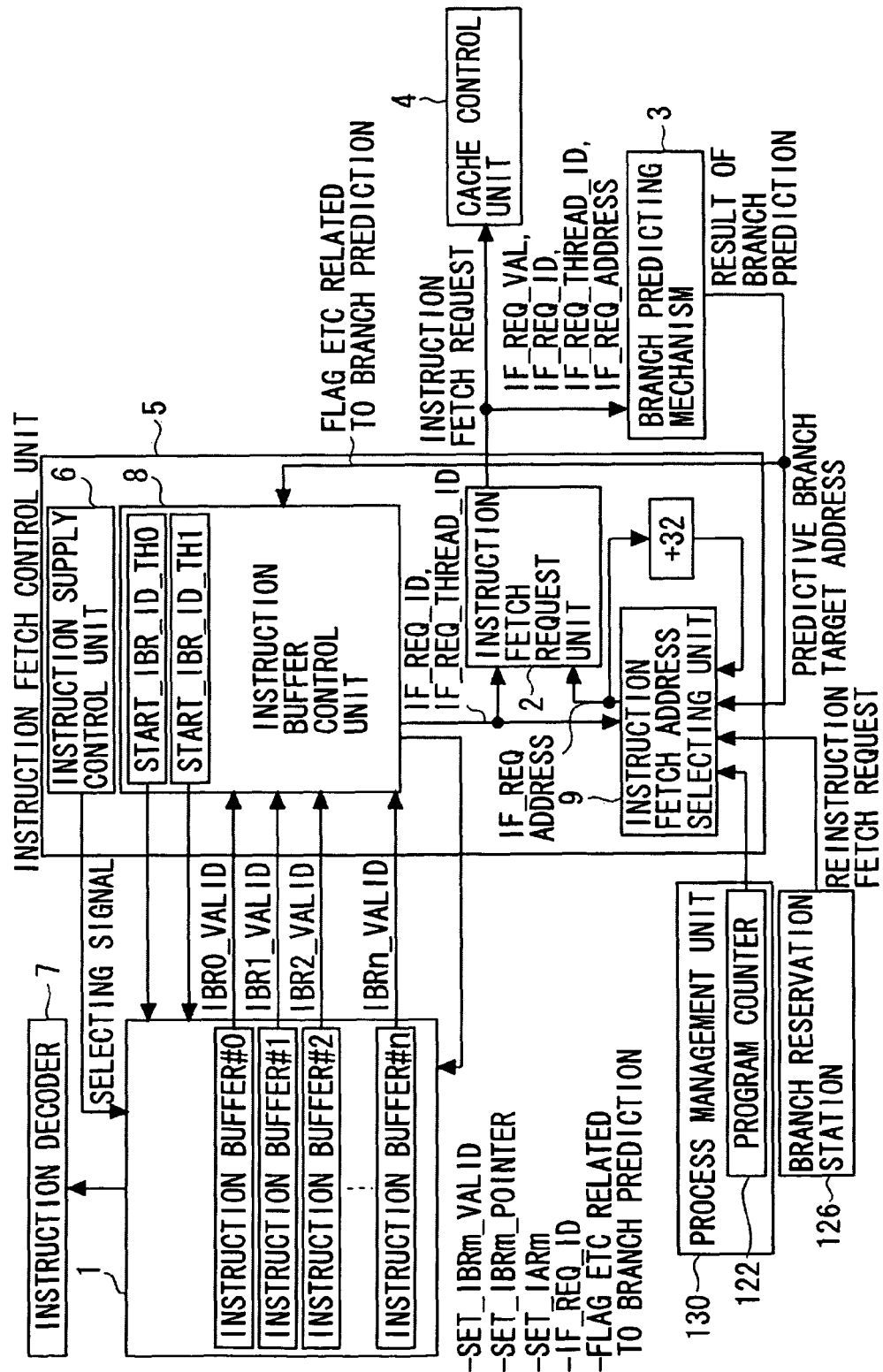

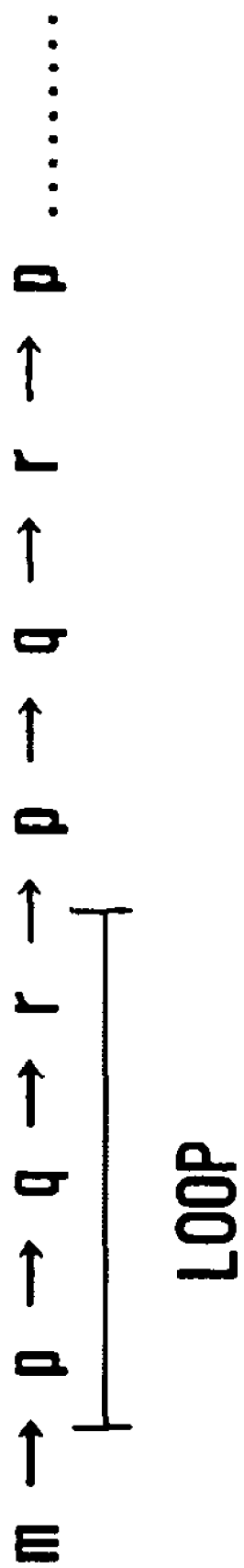

PROCESSING DEVICE

CROSS-REFERENCE TO RELATED APPLICATION

This is a continuation of application PCT/JP2007/062412, filed on Jun. 20, 2007, now pending, the contents of which are herein wholly incorporated by reference.

BACKGROUND

The technology relates generally to a technology of controlling an information processing device, and more particularly to an instruction processing technology.

An information processing device adopting a highly advanced instruction processing system after adopting a pipeline processing system, has schemed to improve the performance by speculatively processing a subsequent instruction without waiting for an end of executing one instruction. As a matter of course, the performance has been improved by speculatively supplying the instructions (fetching the instructions) in advance of executing the instructions. Herein, the term "speculative" connotes, e.g., fetching the subsequent instruction from the branch target address according to a predetermined prediction result before the fetch address of the subsequent instruction is determined, and processing the subsequent instruction.

In the instruction buffer system, the speculatively-fetched instruction is temporarily retained in an instruction buffer. Then, the instruction buffer supplies the instructions to an execution control unit which interprets and executes the instruction. The speculative fetch can be advanced forward by having this type of plural instruction buffers. Resources of the information processing device are not, however, limitless, and therefore an endeavor was such that the instruction buffers are utilized efficiently by, for instance, a method disclosed in Patent document 1.

[Patent document 1] Japanese Patent Publication No. 3845043

[Patent document 2] Japanese Patent Publication No. 3683968

SUMMARY

One aspect of the technology is configured by way of a processing device in which a process is organized by a plurality of instructions, and a plurality of processes, which can be executed independently of each other, is each identified as a thread. The processing device includes an executing unit executing instructions, a supply unit supplying the instructions to the executing unit, a buffer unit retaining the instructions supplied from the supply unit, and a control unit managing the buffer unit. Then, the buffer unit includes an aggregation of a plurality of buffer elements, and the buffer element includes a data unit stored with the instruction and a pointer unit defining a linking relationship between or among the buffer elements. In this configuration, the control unit includes a thread allocating unit allocating a stream of the plurality of buffer elements of which the linking relationship is defined by the pointer unit to each thread executed by the processing device.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 10B is a diagram illustrating a concept in the case of selecting the thread according to the number of the instruction buffers in use.

FIG. 10C is a diagram illustrating a concept of a register queue for determining a thread priority level based on elapse time after selecting the thread.

FIG. 10D is a diagram illustrating a processing example of changing the priority level of the thread on the basis of selecting the thread.

FIG. 10G is a diagram illustrating a circuit which is switched ON when determining a second priority thread.

FIG. 10H is a diagram illustrating a circuit which is switched ON when determining a last priority thread.

FIG. 10I is a diagram illustrating a circuit which outputs a thread number when the thread having the highest priority level is determined by output signals of the circuits depicted in FIG. 10F through FIG. 10H.

FIG. 10J is a diagram illustrating an example of a thread selecting circuit usable in a case where the number of threads is "2".

FIG. 11B is a diagram illustrating an example of a circuit which sets a pointer in a sequential direction.

FIG. 12B is a diagram illustrating a circuit which is switched ON when determining the first priority thread given the top priority.

FIG. 12C is a diagram illustrating a circuit which is switched ON when determining the second priority thread.

FIG. 12F is a diagram illustrating an example of the thread selecting circuit usable in the case where the number of threads is "2".

FIG. 13 is a diagram illustrating a circuit which generates a further pointer which points a top buffer entry of the instruction buffer 1 in use.

FIG. 14 is a diagram illustrating a circuit which selects the pointer in the sequential direction and the pointer in the branch target direction, which serve as inputs to a selector 61 in FIG. 13.

FIG. 16 is a diagram illustrating an example of a configuration of a circuit in which one dedicated register stored with the further pointer is provided for the thread undergoing the instruction supply, and the further pointer is replaced between the threads.

FIG. 17C is a diagram illustrating an example of a circuit which generates a signal for releasing batchwise the instruction buffers 1 used for a specified thread (having, e.g. a thread number j).

FIG. 18A is a time chart illustrating a process since cancellation occurs.

FIG. 18B is a diagram (part 1) illustrating a circuit which sequentially releases chains of the instruction buffers 1 with START_IBR_ID_THj serving as a starting point.

FIG. 19 is a diagram illustrating a configuration of an instruction fetch control unit to which a starting point register is applied.

FIG. 26 is a conceptual diagram illustrating the loop of the instruction buffers.

DESCRIPTION OF EMBODIMENT(S)

Figure 1:
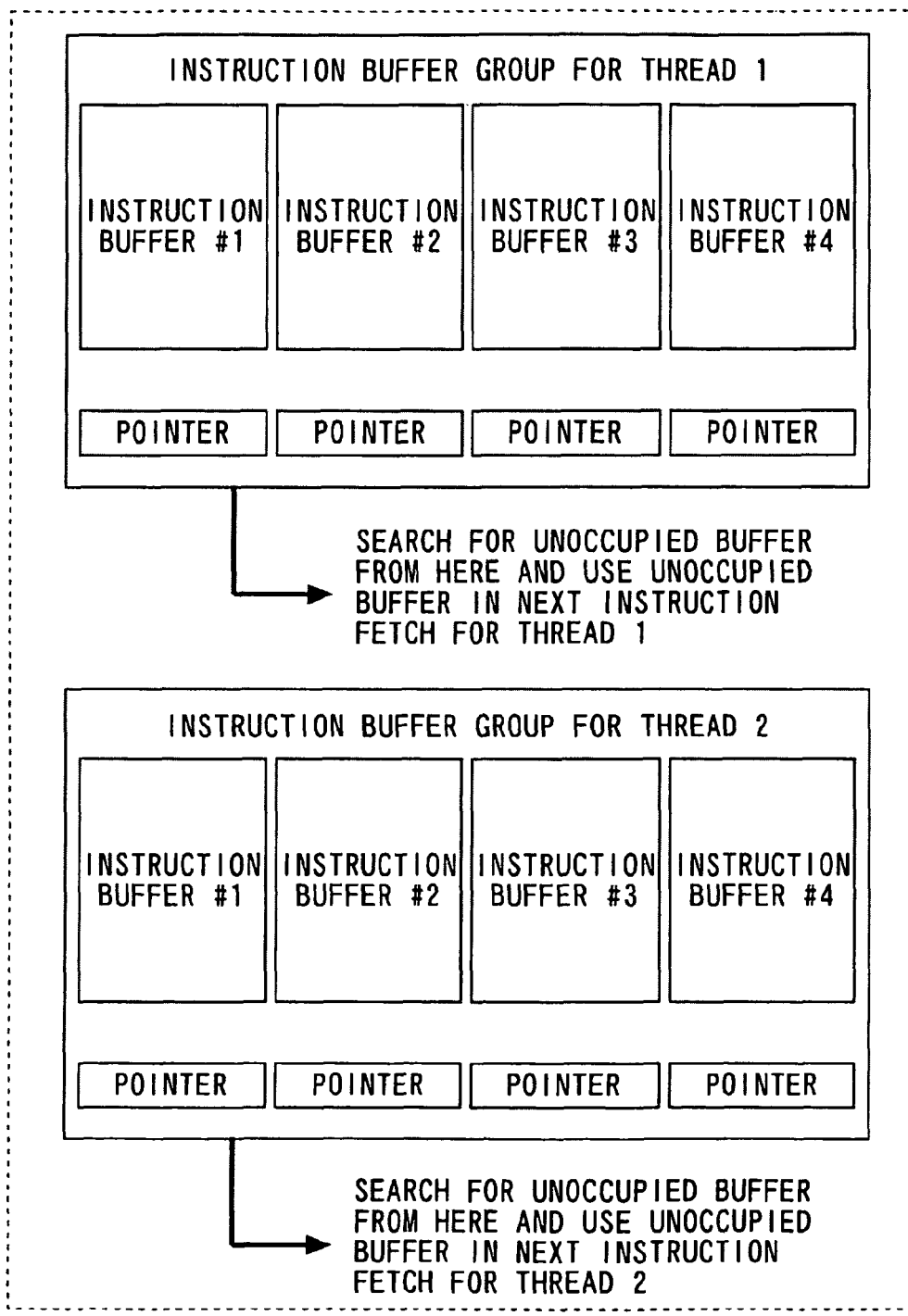
FIG. 1 is a diagram illustrating an architecture of a system having sets of instruction buffers by a count corresponding to the number of threads.

There is a Multi-Threading technique in the instruction process of a processor. "Multi-Threading" is a technique by which the processes are executed by use of one single processor as if appearing to be executed by a plurality of processors. The "thread" represents the process of one logical processor in the plurality of logical processors. Alternatively, as viewed from the processor, a stream of instructions handed over to the processor as the processes that can be executed independently of each other can be defined as the thread, each of which includes a plurality f instructions to be executed by the processor.

For example, it is presumed that a cache mistake occurs when executing the process of a certain thread. The processor with the occurrence of the cache mistake, it follows, sends a memory read request and gets data to be sent from another processor or a memory. In the meantime, the arithmetic unit for this thread becomes unnecessary and can be therefore effectively utilized by having a process of a different thread executed instead. Further, plural types of arithmetic units which are normally prepared do not necessarily all operate at all times even in a state of having no cache mistake. Therefore, the unused arithmetic units can be effectively utilized by running the threads having none of a dependent relationship.

In the Multi-Threading technologies such as this, a method called Simultaneous Multi-Thread (SMT) involves including a single or a plurality of pipelines for processing the instructions, inputting instruction streams of a plurality of threads alternately or simultaneously, and executing the process in a way that shares an arithmetic unit with each other. Hence, it follows that a plurality of threads are executed by the arithmetic unit at a certain point of time and the plurality of threads exist even within a device for supplying the instructions to the arithmetic unit. In this technology, a key for improving the performance while restraining costs is how well the resources are allocated efficiently to the plurality of threads.

The instruction buffer, which supplies the instructions to an execution control unit interpreting and executing the instructions, has as a matter of course this problem, i.e., the problem of how well the instruction buffers are allocated efficiently to the plurality of threads. The instruction buffers provided so far get satisfactory by retaining only the instructions of one thread for a certain period of time. It is, however, preferable for being flexible to the SMT that the instruction buffer retains the instruction streams of the plurality of threads simultaneously and supplies the instructions to the arithmetic unit.

At first, a thinkable scheme for solving this problem is that devices as proposed in Japanese Patent Application No. 3845043 are arranged by a device count corresponding to the number of the threads. For example, when the number of the threads is "2", the number of the instruction buffers for every thread is set to "4", and it may be sufficient to manufacture the device including totally eight pieces of instruction buffers.

In this case, the instruction buffers are counted totally 8. For example, however, if the cache mistake occurs in one thread, it is meaningless to issue an instruction fetch request during a period till the data is acquired. The reason why so is that if this cache mistake is an instruction cache mistake, the instruction stream can not, of course, be obtained even when making the instruction fetch request thereafter. Further, if the mistake is a data cache mistake, the processing of the subsequent instruction does not proceed till the data thereof is acquired, and hence, even when the instruction stream is acquired by the instruction fetch, there is merely a wait for a long period of time on the instruction buffer. Such being the case, it is recommended that the priority is given to the instruction fetch for another thread by stopping the instruction fetch request for the thread concerned during such a period of time. In the thread with the occurrence of the cache mistake, there are extra instruction buffers because of stopping the instruction fetch. On the other hand, in another thread desired to be given the priority, the instruction buffer resources have already been used up, and such a situation might happen with a great possibility that the fetch can not be conducted.

In the SMT aiming at scheming to improve the performance by utilizing the resources highly efficiently, it is said to be inappropriate to adopt the method of using the futile resources such as this. Moreover, the instruction buffer entails having an large area in terms of implementation. It is effective for ameliorating the performance to increase the number of the instruction buffers for every thread. The rise in physical quantity leads to occurrences of many demerits such as an increase in chip area, an augmentation in power consumption, a rise in fault rate and an increase in cost. Accordingly, there is desired an endeavor in terms of reducing the area for the implementation by restraining the number of the instruction buffers in a way that utilizes the resources highly efficiently.

To summarize what has been discussed so far:
(1) The examples of the prior arts do not present solution technology about how the instruction buffers are allocated when in the Multi-Threading;
(2) A simple extension method involves having sets of the instruction buffers corresponding to the number of the threads;
(3) According to such a method as to take account of only a part of the system, however, there is a possibility of having the thread with the extra instruction buffers and the thread with the deficient instruction buffers for a certain period of time, resulting in a decline of efficiency; and
(4) When trying to exhibit the high performance by the method having the low efficiency, it follows that the directivity might be reversed to realization of reducing the power consumption, which is an urgent task in the field of the present computer industry.

Such being the case, it is proposed to provide a technology capable of allocating instruction buffers to each thread efficiently with no futility in a system which actualizes Multi-Threading.

One aspect of the embodiment is configured by way of a processing device in which a process is organized by a plurality of instructions, and a plurality of processes, which can be executed independently of each other, is each identified as a thread. The processing device includes an executing unit executing instructions, a supply unit supplying the instructions to the executing unit, a buffer unit to retain the instructions to be supplied to the executing unit, and a control unit managing the buffer unit. Then, the buffer unit includes an aggregation of a plurality of buffer elements, and the buffer element includes a data unit to retain the instructions in a plurality of entries and a pointer unit defining a linking relationship between or among the buffer elements. In this configuration, the control unit includes a thread allocating unit allocating a stream of the plurality of buffer elements of which the linking relationship is defined by the pointer unit to each thread executed by the processing device.

According to the processing device, the buffer elements retaining the instructions, of which the linking relationship is defined by the pointer unit, form a plurality of streams. These steams of buffer elements are allocated to the thread defined as the plurality of processes that can be executed independently of each other. Accordingly, in the processing device which executes the plurality of threads, it is feasible to effectively and simply allocate the buffer elements as one of important resources to the thread requiring the buffer elements. The streams of the buffer elements are linked via pointers, and therefore the allocation and a release thereof can be actualized flexibly. As a result, in the processing device executing the plurality of threads, the buffer elements can be allocated to each thread with the high efficiency without scaling up the buffer unit physically excessively.

According to the embodiment, the set of the instruction buffers is not provided on a per-thread basis but can be shared between or among the threads. This scheme enables the instruction buffer resources to be effectively used for each thread as far as there are these resources. Hereafter, details of a computer system illustrating the processing device is described.

The following is a description of an outline of a computer system (which will hereinafter be simply referred to as a processing device) capable of efficiently allocating a set of instruction buffers to each thread without any futility in a system based on a Multi-Threading scheme. FIG. 1 simply illustrates an architecture of the system having sets of instruction buffers of which the number corresponds to the number of threads. In the following discussion, the Multi-Thread system, in a case where the number of threads is set to "2", will be exemplified.

An area circumscribed by a dotted line in FIG. 1 represents the whole of the instruction buffers held by the system. Provided in this example are an instruction buffer group for a thread 1 and an instruction buffer group for a thread 2. Further, each instruction buffer group includes instruction buffers #1 through #4. Note that the number of the instruction buffers in each instruction buffer group is not necessarily limited to "4".

Still further, pointers are provided corresponding to the respective instruction buffers within each instruction buffer group. The pointer is used for specifying the instruction buffer buffered with an instruction to be supplied next when the instructions in the respective instruction buffers are supplied to an instruction executing unit. For example, in an instruction fetch control device disclosed in Japanese Patent Publication No. 3845043, the instructions in the instruction buffers are efficiently supplied to the instruction executing unit by dynamically connecting the plurality of instruction buffers via the pointers. Simultaneously with this operation, the instruction is fetched (the phrase "the instruction being fetched" has the same meaning as "the instruction being read out"; and the discussion will proceed on the assumption that the "readout" implies the "fetch" as the case may be), and, even in such a case that a plurality of streams exists as streams of instructions supplied to the instruction executing unit, the efficiency of using the instruction buffers is restrained from decreasing. Herein, the plurality of streams is organized by, e.g., a stream subsequent to occurrence of branching through a branch instruction and by a stream subsequent to execution of the instruction without being branched.

The architecture in FIG. 1 might not, however, basically, attain an efficient use of the instruction buffers in the Multi-Threading scheme. Namely, this is a case in which the multiplicity of instruction buffers is used for the thread 1 with the result that the number of instruction buffers becomes insufficient, while the thread 2 requires less of the use of the instruction buffers.

Figure 2:
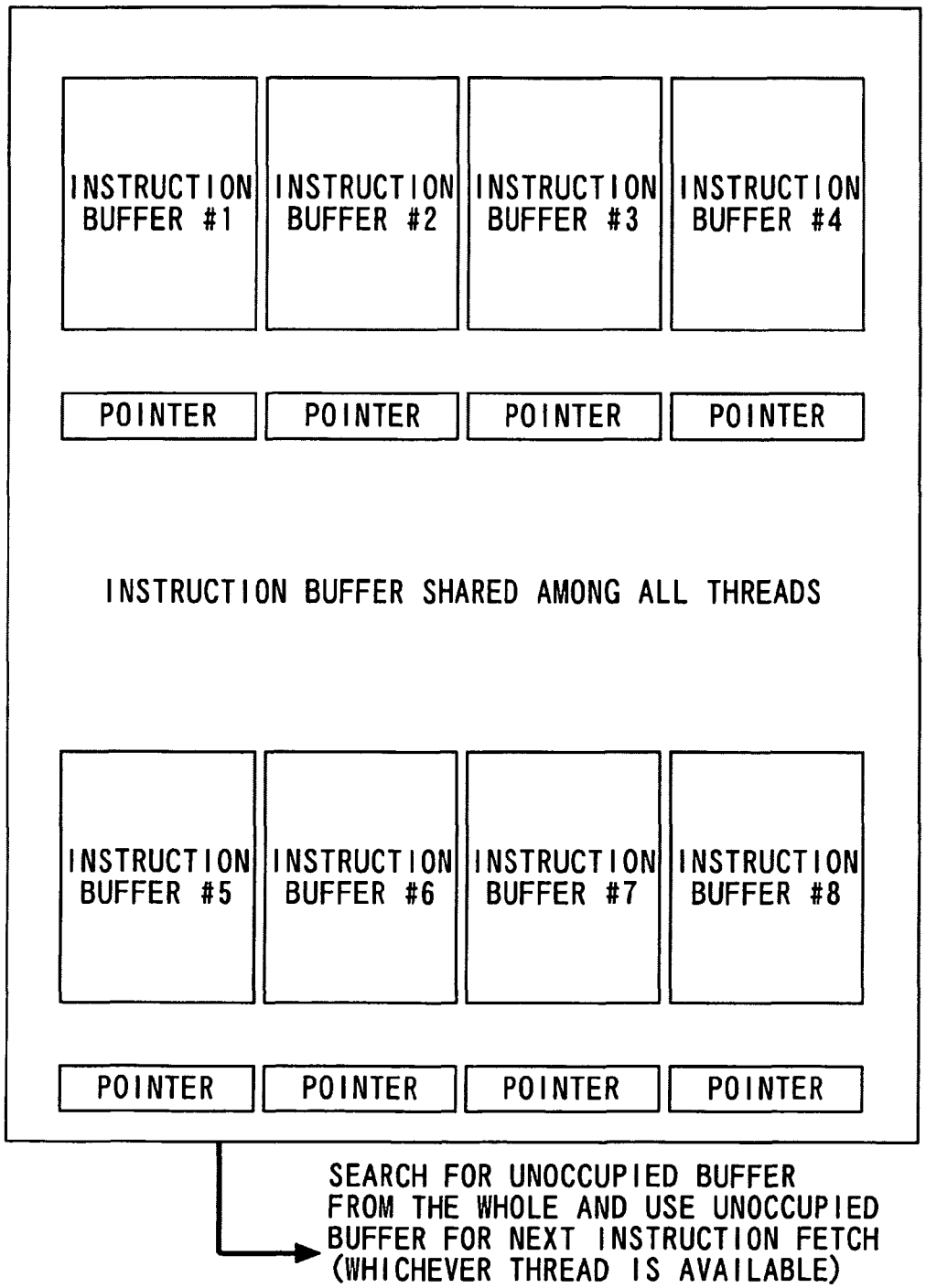
FIG. 2 is a diagram of the system architecture according to one embodiment.

FIG. 2 depicts the system architecture according to the embodiment. This architecture has none of a concept that the instruction buffer group are provided for previously fixed threads. To be specific, the thread to which the instruction buffers are allocated is not fixed beforehand, but the thread to which the respective instruction buffers are allocated is determined on the occasion of fetching the instruction.

The architecture in the embodiment is that each instruction buffer is constructed of a data unit which retains instruction words in a plurality of entries and of a pointer unit for pointing the instruction buffer having the entry to be supplied for use next to the instruction buffer having the plurality of entries. Further, one single instruction buffer allocating unit (which is also called an instruction buffer control unit) which specifies the instruction buffer for buffering the instruction-fetched data is provided in common between the threads.

The instruction buffer allocating unit selects, without being aware of which thread requests an instruction fetch, simply one instruction buffer from within the instruction buffers that are not used at the present. The selection of the instruction buffer in this case may be done in the same way as when the thread count is "1".

In the system according to the embodiment, when the instruction buffer is selected, the thread to which the selected instruction buffer belongs is determined. Namely, the thread to which the instruction buffer belongs is determined depending on which thread the instruction fetch at the time of using this instruction buffer is conducted for. Within the system, the instruction fetch request unit, which starts the instruction fetch, issues the instruction fetch request on a per-thread basis.

An instruction buffer allocation rule may be, e.g., such that individual numbers are previously given to the instruction buffers, and the current unoccupied instruction buffers are allocated in the sequence from the smallest in number. The free instruction buffers may be employed without any restriction. Moreover, for instance, an available scheme is that the current unoccupied instruction buffers are linked via the pointers, thus building up an unoccupied buffer list structure. The instruction buffers may be used from the top instruction buffer listed in the unoccupied buffer list.

The pointer unit of each instruction buffer establishes a link to the next instruction buffer so as to point the instruction buffer to be buffered with the instruction stream to be input next within the same thread. The function of "establishing the link" can be also realized by, e.g., a method of previously giving the individual numbers to the instruction buffers and specifying the number of the next instruction buffer.

Moreover, the processing device includes a branch prediction unit. Therefore, if the instruction stream buffered in the instruction buffer contains a branch instruction for branching, the pointer unit sets the link to the instruction buffer of the instruction stream by pointing the instruction buffer that is buffered with a predictive branch target instruction stream within the same thread.

Namely, if the branch instruction does not exist in the instruction fetch unit and if the instructions are consecutive sequentially, the instruction buffer, which is buffered with the instruction stream consecutive in the sequential direction in the same thread, is pointed. Note that the instruction stream in the case of having none of the branch instruction is herein called a stream in the sequential direction.

If the branch instruction exists, the instruction buffer to be pointed is the instruction buffer that is buffered with the instruction stream of the branch target in the same thread. The pointer unit may have one register which is stored with information on any one of an indication of the instruction buffer consecutive in the sequential direction from the instruction buffer concerned and an indication of the instruction buffer consecutive in the branch direction, and may also be provided with a register stored with the pointers dedicated in the sequential direction and a register stored with the pointers dedicated in the branch direction, separately.

Thus, the pointers of the instruction buffers are linked up on the per-thread basis, thereby enabling a pointer chain to be formed without any interminglement of the threads.

Figure 3:
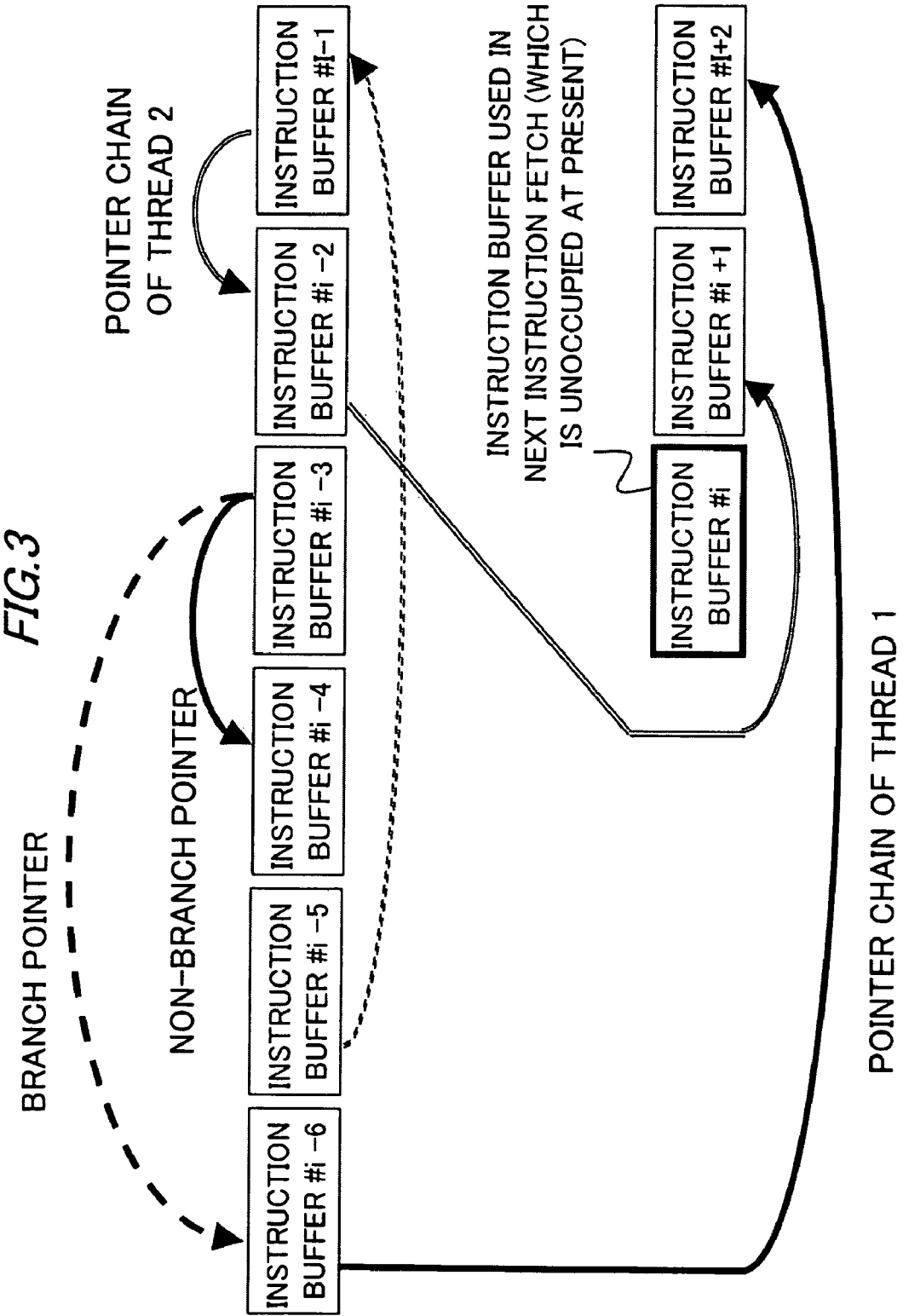
FIG. 3 is a diagram illustrating one example of a pointer chain of instruction buffers.

FIG. 3 illustrates one example thereof. In this example, two pointer chains of the thread 1 and the thread 2 are formed. Further, the pointer depicted by a solid line representing the sequential direction and the pointer depicted by a broken line representing the branch direction exist in each thread.

In the processing device, the instruction buffers are linked up via the pointers. Each time the instruction is fetched, the instruction buffer is allocated. Accordingly, the instruction fetch for any thread may be done at a certain point of timing. The thread in which to perform the instruction fetch can be selected without any restriction, depending on conveniences of the instruction fetch and other elements.

Moreover, a thinkable scheme is that an address of the instruction fetch request is selected corresponding to a priority level predetermined from an instruction fetch address, a branch predictive target address and a reinstruction fetch address by use of a register which retains the instruction fetch address in the sequential direction as disclosed in Japanese Patent Publication No, 3845043, a register which retains the branch predictive target address and a register which retains the reinstruction fetch address for resuming the instruction fetch if all of the instruction buffers are invalidated.

One set of these registers for retaining the respective addresses are prepared on the per-thread basis so that the registers are made correspond to each of the Multi-Threads. The reinstruction fetch address is, it follows, an address for resuming the instruction fetch if all of the in-use instruction buffers belonging to the same thread are invalidated.

A variety of address selection guidelines for conducting the instruction fetch as described above can be considered. For example, one single register is selected from within all of the registers on the basis of the predetermined priority level, and the instruction fetch request may be issued with the address stored in the selected register. Further, for instance, the priority level is determined beforehand on the per-thread basis, then the single register is selected for every thread, and, further, another mechanism determines which thread the instruction fetch request is issued for, thus enabling the instruction fetch request to be issued.

In the latter case, at first, a thinkable technique of selecting the thread undergoing the instruction-fetch is that the threads to be selected are made to go round simply based on the round-robin. For employing the instruction buffers efficiently to even a small degree, if there is not any restriction in the instruction fetch on the per-thread basis in terms of another factor, there may be selected the thread having a smaller number of instruction buffers that are in use at the present. The selection such as this leads to an idea that whichever threads are always used on the average. Those threads may also be selected based on set values in a different register. The threads, which may be given the priority, may be set in the register. Those threads may be set either statically or dynamically according to a result of measuring the performance. There may be determined, for example, the threads that are fetched in the sequence of elapse time (in such a sequence that the higher priority level is given to the thread that is not instruction-fetched for a long period of time, while the lower priority level is given to the thread that is instruction-fetched recently) after the instruction fetch.

The embodiment proposes a mechanism for the instruction fetch such as this. Then, on the occasion of supplying the data acquired from the instruction fetch to an execution control unit which executes interpretation of the instruction, it may be sufficient to trace the pointer chain of each instruction buffer on the per-thread basis. The instruction fetch means is not, however, limited to the configuration of the embodiment.

Figure 4:
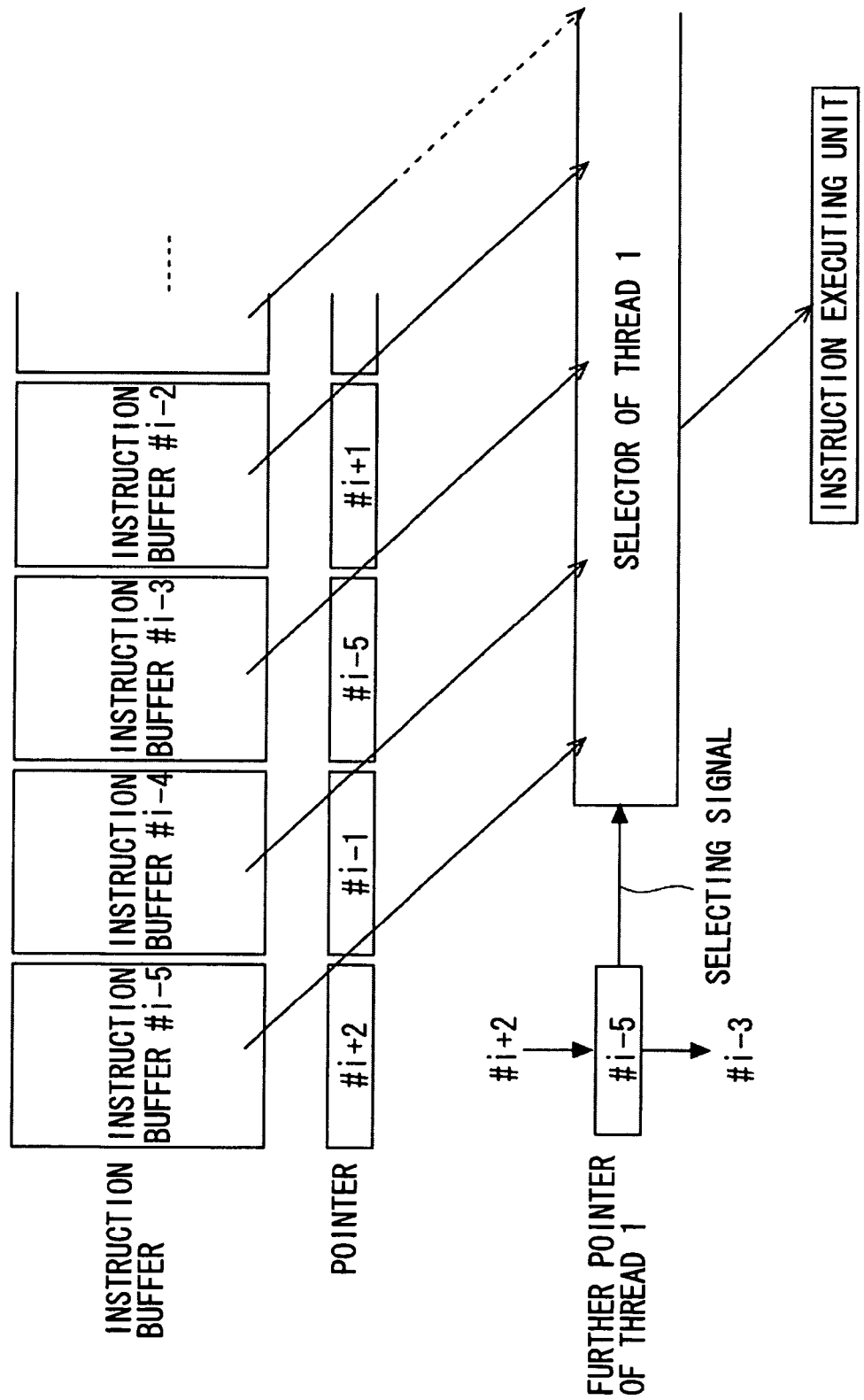
FIG. 4 is a diagram depicting a further pointer in the case of using identification numbers as pointers allocated to the individual instruction buffers beforehand.

A further pointer for pointing the instruction buffer used for supplying the instruction at the present or pointing the in-use instruction buffer can be prepared as the mechanism for tracing the (original) pointers. With this further pointer, the pointers held in the instruction buffers themselves are traced on. The instruction buffer is selected by use of an output signal of the further pointer, and the instruction is supplied to the execution control unit. The further pointer may be prepared for every thread. On this occasion, another mechanism selects which thread the instruction buffer is selected through the pointer of and whether this instruction buffer is actually input or not. FIG. 4 illustrates the further pointers in the case of using identification numbers as the further pointers, which are given previously to the individual instruction buffers.

In this example, the pointer (buffer number) of the instruction buffer to be traced is set to the further pointer of the thread 1. Then, the further pointer outputs a select signal, then switches over a selector of the thread 1, and gets the instruction to be output from the instruction buffer to be read. The instruction, which has been output, is handed over to the instruction executing unit.

Moreover, the further pointer may point the instruction buffer of the thread that is determined to be input. Another mechanism previously selects which thread is input.

A method by which another mechanism selects the thread containing the instructions to be supplied to the instruction executing unit, is at first considered such that the thread numbers (which are information for identifying the threads and are also termed thread identifying information) sequentially go round simply based on the round-robin. A thinkable scheme for using the instruction buffers efficiently to even a small degree, if there is not any restriction in supplying the instructions on the per-thread basis in terms of another factor, there is selected the thread having a larger number of instruction buffers that are in use at the present, and whichever threads are always used on the average. Those threads may also be selected based on set values in a different register. Those threads may be set either statically or dynamically according to a result of measuring the performance. For instance, there may be determined the threads that are instruction-supplied in the sequence of the elapse time (in such a sequence that the higher priority level is given to the thread of which the instruction is not executed for a long period of time, while the lower priority level is given to the thread of which the instruction is executed recently) after executing the instruction belonging to the thread.

Thus, another mechanism determines the thread to be supplied with a instruction, in which case a register for retaining a piece of information showing how far other threads have been currently processed is separately provided. The register for retaining the information may be provided fixedly on the per-thread basis, or a thread number may also be given to the register itself without being fixed on the per-thread basis. Regarding the thread determined to be processed next, the instruction buffer to be input next is finalized by use of the information of how far the thread is processed stored so far in this register and information of the finalized instruction buffer is set to the further pointer. Thus, the pointer chain can be traced on for every thread.

Moreover, the thread number can be retained as a tag attached to the instruction buffer. If all of the in-use instruction buffers of the specified thread become unnecessary due to a failure in the branch prediction or some kind of initialization request, e.g., an error process etc, this thread number enables the instruction buffer to be distinguished and released. The released buffer may be used by whichever threads.

Furthermore, a thinkable scheme of releasing the instruction buffers of the specified thread is such a procedure that the instruction buffers are sequentially released by making use of the links between the respective instruction buffers. Unless the plurality of instruction buffers start being employed simultaneously, any problem may not arise by sequentially releasing the instruction buffers while tracing the buffers according to the pointers (links). The released buffers may be employed by whichever threads. The limited number of instruction buffers can be used at the high efficiency by taking the configuration discussed so far.

Further in the case of desiring to form a short loop as disclosed in Japanese Patent Application No. 3804941, the short loop in the instruction buffers can be formed and utilized by having a start point retaining register for retaining a start point of the short loop on the per-thread basis.

The instruction buffer serving as the start point can be set without restricting the position for every thread by having the start point register. The instruction buffer, if unoccupied, can be used by every thread. Besides, the short loop can be formed. Thus, it is feasible to perform the Multi-Threading process which sufficiently utilizes the limited resources.

The following is a summary of what has been discussed so far.

(1) One instruction buffer allocating unit may be sufficient as it has been so far. Next, the allocating unit may simply select one usable instruction buffer.

(2) Determination of which thread the instruction buffer is allocated to depends on which thread the instruction buffer belongs to.

(3) The instruction fetch request unit is also made correspond to the Multi-Threading scheme. This involves several methods. One is a method of selecting one instruction fetch request according to a certain level of priority from within all of the requests. Another is a method of selecting, after determining the priority level according to the conventional procedure and selecting one instruction fetch request for every thread, a thread by another mechanism and thus finally deciding one instruction fetch request from the fetch requests.

(4) A technique of selecting the thread for the instruction fetch may be a method based on the simple round-robin, a method of comparing in magnitude the instruction buffer usage counts with each other (the thread with the smaller instruction buffer usage count is selected), and a method of taking the elapse time sequence (of giving the higher priority level to the thread that is not instruction-fetched for a long period of time and the lower priority level to the thread that is instruction-fetched recently) after the instruction fetch, or a method of setting the thread to be preferentially selected in the register.

(5) A method of selecting an instruction supplying target thread to the instruction executing unit may be a method based on the simple round-robin, or a method of comparing in magnitude the instruction buffer usage counts with each other (the thread with the larger instruction buffer usage count is preferentially selected), and a method of taking the elapse time sequence (of giving the higher priority level to the thread that is not instruction-supplied for a long period of time and the lower priority level to the thread that is instruction-supplied recently) after the instruction supply, or a method of setting the thread to be preferentially selected in the register.

(6) The pointers to the respective instruction buffers are set so as to trace the instruction buffers of the individual threads. Namely, the pointer is set at a timing of next instruction fetch of each thread (it is difficult to predict when issued). With this simple setting, the pointer chain for every thread can be built up.

(7) The instruction supply may be attained by tracing on the pointer chain on the per-thread basis. A mechanism for tracing the pointer chains can be exemplified as follows.

Mechanism 1: A register serving as a tracer is provided for every thread, and the pointer chains are traced on. The executing unit selects any one of the threads when inputting the instructions.

Mechanism 2: A dedicated register for the pointers pointing the instruction buffers from which the instructions are input to the executing unit, is held. The information about how far instructions of the threads in a standby status have been currently input, is retained.

First Embodiment

Figure 5:
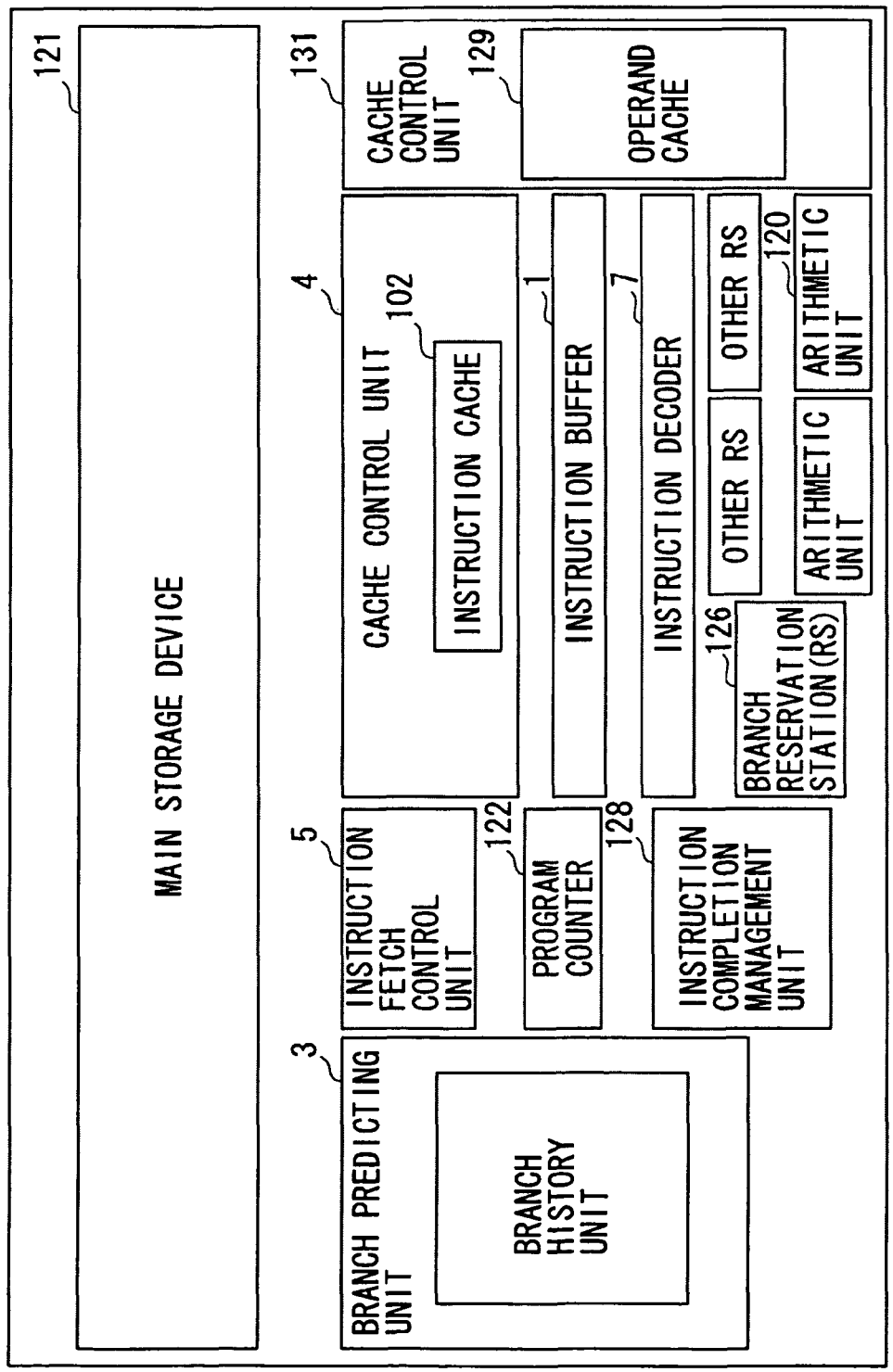
FIG. 5 is a diagram of a configuration of a processing device.
Figure 6:
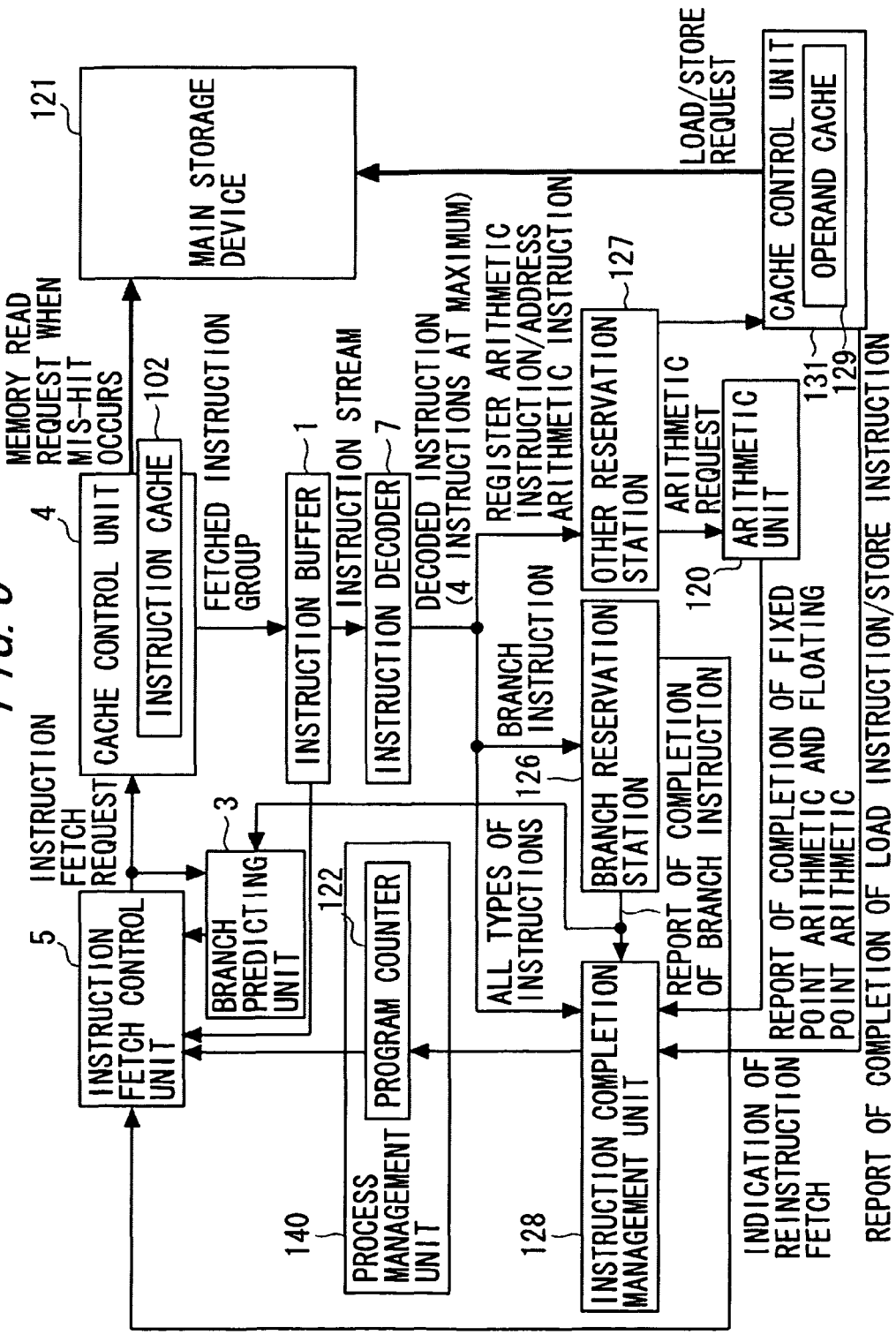
FIG. 6 is a diagram of whole control in instruction fetch.

FIG. 5 illustrates a diagram of a configuration of the processing device. FIG. 6 depicts a diagram of the whole of control in the instruction fetch. The processing device is, e.g., a computer taking a so-called stored program system, which reads and executes the instruction stored in a main storage device 121.

As illustrated in FIGS. 5 and 6, the processing device includes an arithmetic unit 120 which executes the instructions, a main storage device 121 stored with the instructions executed by the arithmetic unit 120 and the data etc processed by the arithmetic unit 120, and a program counter 122 which specifies an address, on the main storage device 121, of the instruction to be executed by the arithmetic unit 120.

In FIG. 6, more specifically, the processing device includes: an instruction fetch control unit 5 (corresponding to an instruction fetch unit) which controls the fetch of the instruction on the basis of an address generated by the program counter 122, a reinstruction fetch indication given from a branch reservation station 126 or a result of the prediction made by the branch prediction unit 3; an instruction cache control unit 4 which controls an instruction cache 102 and fetches the instruction in response to the instruction fetch request given from the instruction fetch control unit 5; an instruction buffer 1 (the instruction buffer 1 corresponds to a buffer element, and an aggregation of the instruction buffers 1 corresponds to a buffer unit) which retains the instructions fetched from the instruction cache 102; an instruction decoder 7 which decodes the instructions in the instruction buffer 1; reservation units (a branch reservation unit 126 which controls the execution of the branch instruction and other reservation units 127 which control execution of a register arithmetic instruction and an address arithmetic instruction) which control timing of executing the decoded instruction; an instruction completion management unit 128 which monitors completion of executing the instruction; an operand cache 129 which supplies fast the arithmetic unit 120 with an operand of the instruction that is executed by the arithmetic unit 120; and a data cache control unit 131 which controls transfer and reception of the data between the main storage device 121 and the operand cache 129.

Herein, the instruction decoder 7 and the arithmetic unit 120 correspond to an executing unit. Further, the main storage device 121 and the instruction cache 102 correspond to a storage unit. Moreover, the instruction fetch control unit 5, a process management unit 140, the reservation units (including the branch reservation unit 126), the branch prediction unit 3 and instruction completion management unit 128 correspond to a control unit.

<Configuration of Instruction Fetch Control Unit>

Figure 7:
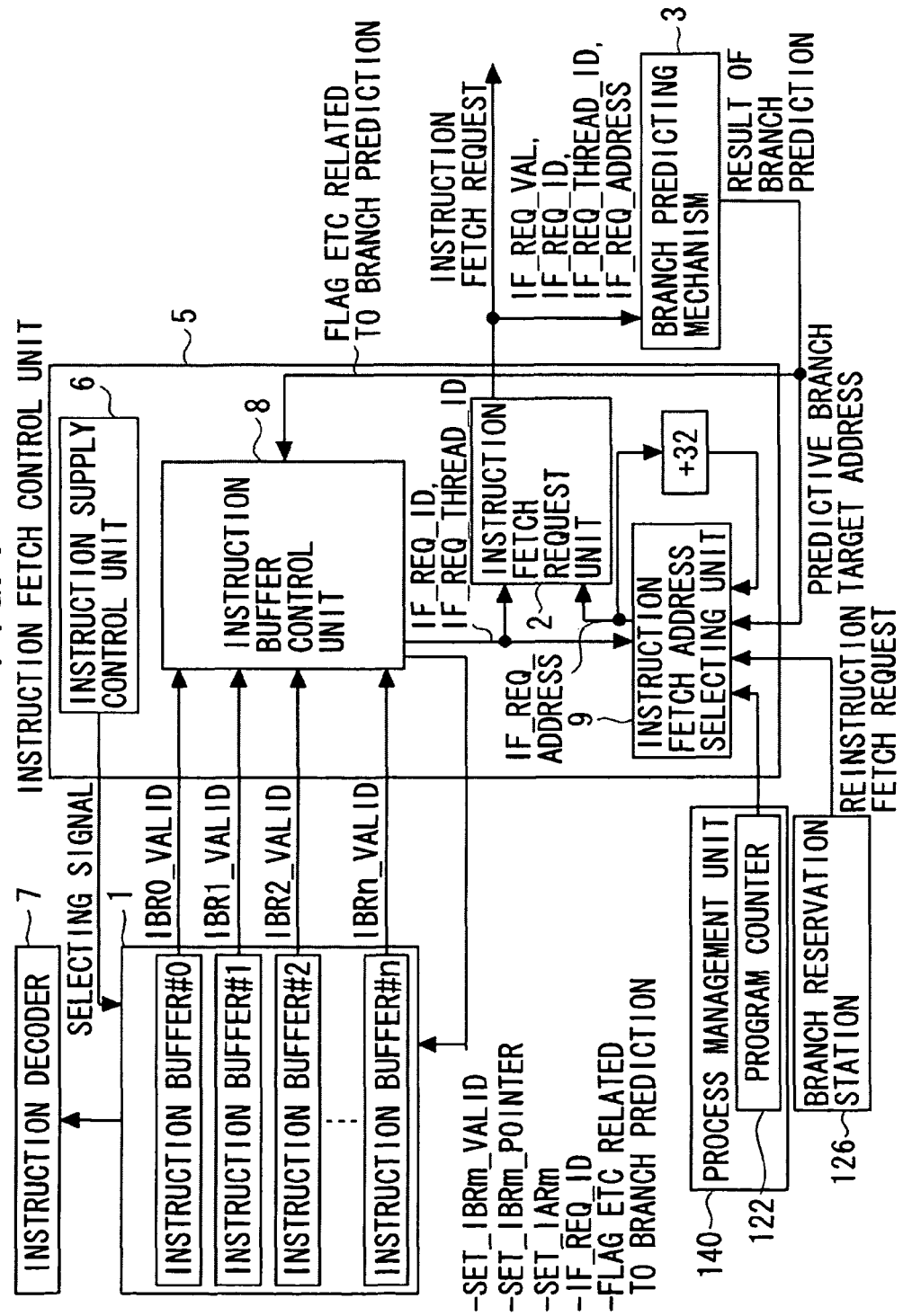
FIG. 7 is a diagram illustrating a detailed structure of an instruction fetch control unit and a configuration of a circuit related to the instruction fetch control unit 5.

FIG. 7 illustrates a detailed structure of the instruction fetch control unit 5 and a configuration of circuits related to the instruction fetch control unit 5.

The process management unit 140 has a program counter 122 for every thread. The program counter 122 updates a value along with the completion of executing the instruction on the per-thread basis.

The branch reservation unit 126 controls the execution of the branch instruction. Then, the branch reservation unit 126 sends a report on whether to branch off by executing the branch instruction and a report of the completion when the branch target address is determined, if branched, to the instruction completion management unit 128. Moreover, the branch reservation unit 126 decides whether the branch prediction is proper or not, and notifies the branch prediction unit 3 of a result thereof. Further, if failing to predict the branch, a cancel signal representing this purport is transmitted to the instruction fetch address selecting unit 9.

The instruction fetch address selecting unit 9 generates an instruction fetch request address (IF_REQ ADDRESS) for looking up in the instruction cache 102 stored with the instruction data on the basis of an address supplied from the program counter 122 when an interrupt or a trap etc occurs, a reinstruction fetch request signal and a reinstruction fetch request address that are output from the branch reservation unit 126 when failing to predict the branch, a branch predicting target instruction fetch request and a branch predicting target instruction fetch request address that are output from the branch predicting unit 3, or an address (which is an instruction address generated in a way that sequentially makes an addition of an instruction word length unit, e.g., 32 bytes) in the sequential direction.

The instruction fetch request unit 2 receives buffer identifying information (IF_REQ_ID) for specifying the instruction buffer ensured by the instruction buffer control unit 8 from within a set of instruction buffers (a single unit of the instruction buffers 1 is also called the instruction buffer) that are invalidated at the present in the instruction buffers 1. The instruction fetch request unit 2 is configured to issue the instruction fetch request as far as the invalidated instruction buffer 1 exists.

Then, the instruction fetch request unit 2 executes a process of outputting, together with the generated instruction fetch request address (IF_REQ ADDRESS), an instruction fetch request signal (IF_REQ VALID) and the buffer identifying information (IF_REQ_ID) for specifying the single invalidated instruction buffer 1, and so on. The instruction stream associated with the IF_REQ_ADDRESS is thereby read from within the instruction data cached in the instruction cache 102. The readout instruction stream is buffered in the instruction buffer 1 associated with IF_REQ_ID. Note that the instruction fetch address selecting unit 9 may generate, though omitted in FIG. 7, an instruction fetch request into which IF_REQ_ID is combined with IF_REQ ADDRESS.

The branch predicting unit 3 predicts whether or not the instruction stream associated with IF_REQ ADDRESS contains the branch instruction for establishing the branch, then predicts, in the case of predicting that this branch instruction is contained, a branch target instruction address thereof, and outputs the branch predicting target instruction fetch request signal together with the thus-predicted branch target instruction address (the branch predicting target instruction address) to the instruction fetch address selecting unit 9. Further, in this case, the branch predicting unit 3 executes a process of outputting a piece of information representing that the instruction stream associated with IF_REQ_ADDRESS contains the instruction with the branch establishment being predicted and a piece of information specifying a position, on the instruction stream, of the predetermined instruction to the instruction buffer control unit 8, and so forth. The instruction buffer control unit 8 manages these pieces of information as the tags attached to the instruction buffers.

The instruction buffer control unit 8 selects any one of the invalidated instruction buffers 1, and supplies the instruction fetch request unit 2 with the thread identifying information (IF_REQ_ID) for specifying the selected instruction buffer 1. Moreover, the instruction buffer control unit 8 links the instruction buffers 1 to be decoded continuously by the pointers. To be specific, the instruction buffer control unit 8 stores, in a pointer unit 1B of the instruction buffer 1 (1-1) buffered with the instruction stream associated with IF REQ_ADDRESS, the information for specifying the instruction buffer 1 (1-2) which retains the subsequent instruction stream to be supplied next to the instruction stream retained in the instruction buffer 1 (1-1). In the first embodiment, when ensuring the subsequent instruction buffer 1 (1-2) buffered with the subsequent instruction stream, the identification ID of the subsequent instruction buffer 1 (1-2) is set in the pointer unit 1B of the preceding instruction buffer 1 (1-1).

The instruction supply control unit 6 (corresponding to a supply thread determining unit) executes a process of setting CURRENT_STREAM_ID specifying an identification ID of the instruction buffer 1 which retains the instruction stream supplied next to the instruction decoding unit 7 and NSI_COUNTER (offset value) specifying an offset position of the instruction stream retained by the instruction buffer 1, and so on. NSI_COUNTER specifies which instruction among the plurality of instructions (e.g., eight instructions) included in each of the instruction buffers 1, the instructions are to be supplied from. The instruction buffer is selected based on CURRENT_STREAM_ID, and the instructions are supplied from an instruction specified by the NSI counter (NSI_COUNTER), thus realizing the instruction supply to the instruction decoding unit 7. Still further, CURRENT_THREAD_ID specifying the thread number of the thread being currently supplied is prepared.

<Configuration of Instruction Buffer>

In the processing device, each instruction buffer 1 individually has an identification number i. An assumption in the first embodiment is that totally eight instruction buffers 1 each having the identification number i=0-7 are provided. Further a thread count of the Multi-Threads is given by N+1, and a thread number j is given such as j=0–N.

Figure 8:
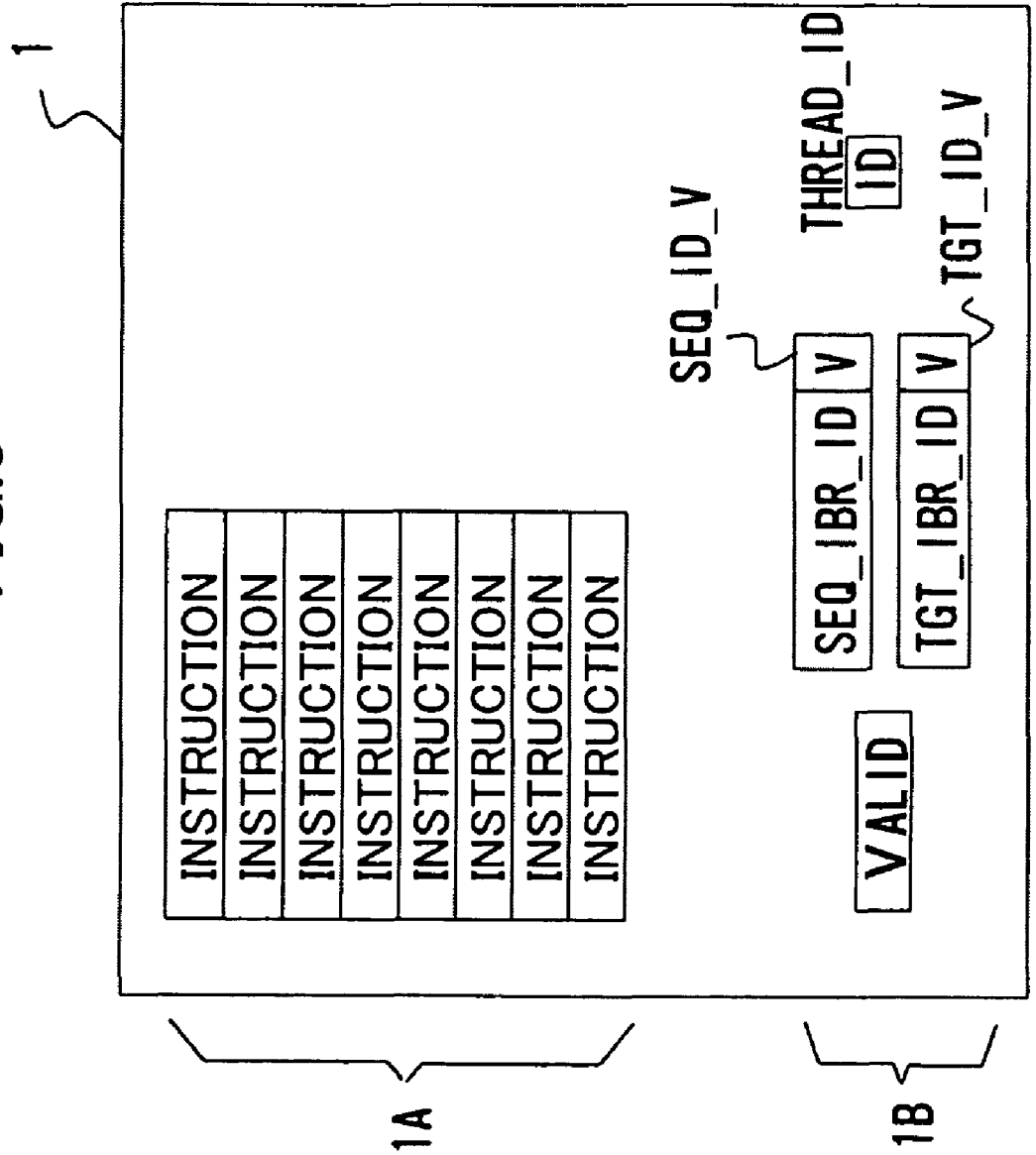
FIG. 8 is a diagram illustrating a structure of the instruction buffer.

FIG. 8 illustrates a structure of the instruction buffer 1. Each instruction buffer 1 is constructed of a data unit 1A retaining the instruction words for every instruction fetch unit, and a pointer unit 1B for pointing the buffer number of the instruction buffer 1 that is used for the supply next to the instruction buffer 1 concerned.

As illustrated in FIG. 8, the data unit 1A includes a register array retaining the plurality of instructions. Further, the pointer unit 1B has registers in two lines such as IBRi_SEQ_IBR_ID representing the buffer number of the instruction buffer 1 subsequent in the sequential direction and its validity flag IBRi_SEQ IBR_V and, in the case of the branch, IBRi_TGT_IBR_ID representing the buffer number of the instruction buffer 1 retaining the branch target instruction stream and its validity flag IBRi_TGT_IBR_V.

Herein, in the case of expressing the register with IBRi_SEQ_IBR_ID etc, the head symbol "IBRi_" represents the register belonging to the i-th instruction buffer 1 (IBRi). In FIG. 8, the instruction buffer 1 is the generic term, and hence "IBRi_" is omitted. Hereinafter, in the case of using this generic term "instruction buffer 1", the head symbol "IBRi_" of each of the registers is omitted. Further, IBRi_SEQ_IBR_ID etc represents the register and also indicates a type of the signal stored in each register.

Moreover, the instruction buffer 1 includes a retaining unit for a valid bit (IBRi_VALID) and a thread number (IBRi_THREAD_IBR_ID) of the thread which employs the instruction buffer 1. The valid bit is set to "1", thereby indicating the instruction buffer 1 being in use. If the instruction buffer 1 gets unnecessary, the valid bit is set "0". This process is called a release or invalidation of the instruction buffer 1.

<Function of Instruction Fetch Request Address Selecting Unit>

(Selection of Instruction Fetch Request Address in One Thread)

Figure 9:
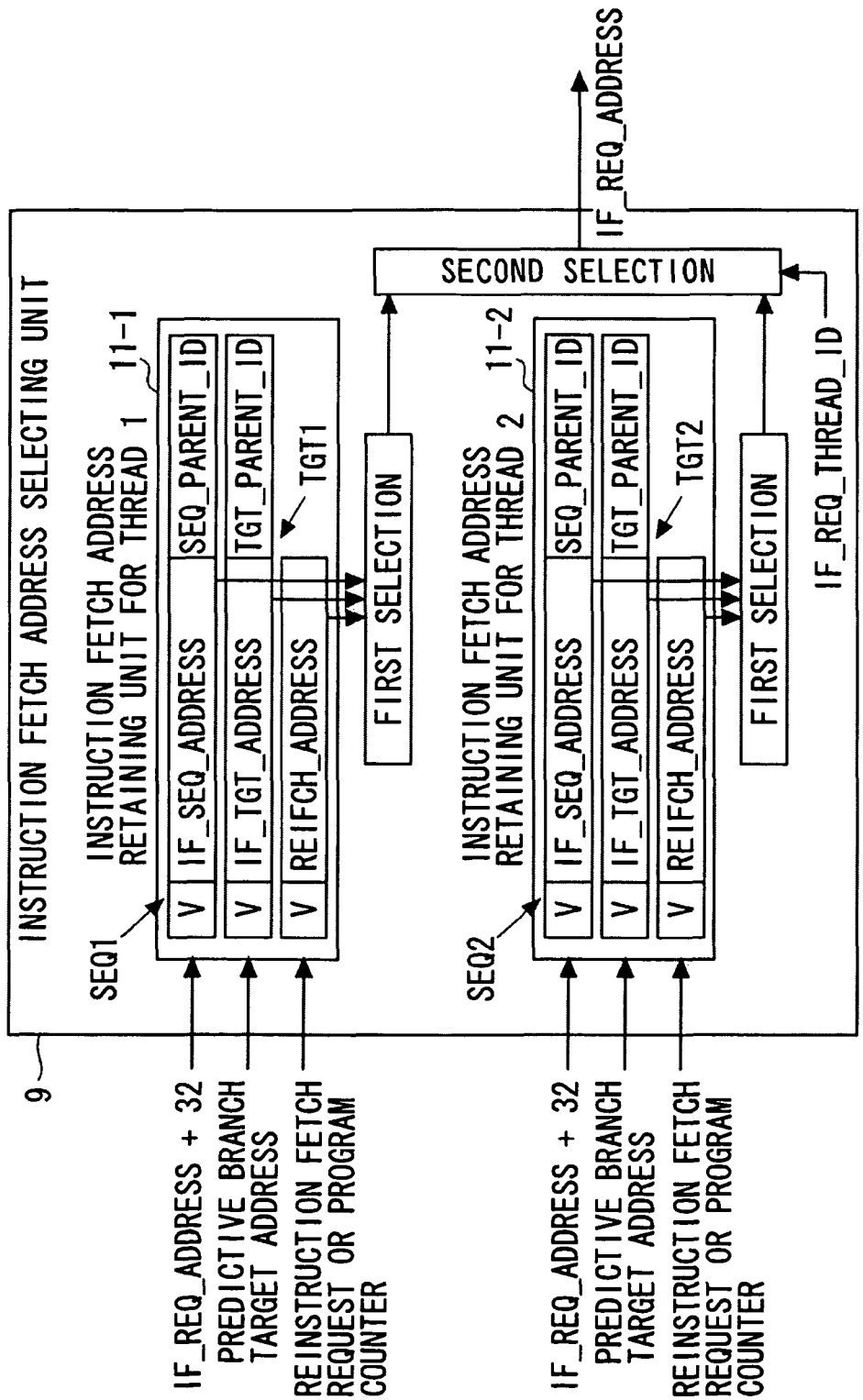
FIG. 9 is a diagram illustrating details of an instruction fetch address request unit.

FIG. 9 depicts details of the instruction fetch address selecting unit 9. The instruction fetch address selecting unit 9 includes a plurality of instruction fetch address retaining units 11 each provided individually on the per-thread basis. Therefore, in the case of identifying the threads 1, 2, etc, these instruction fetch retaining units (corresponding to address retaining units) are expressed by 11-1, 11-2 and so on. Moreover, in the case of giving a generic term, this is referred to as the instruction fetch address retaining unit 11.

The instruction fetch address retaining unit 11 of the instruction fetch address selecting unit 9 has, for every thread, registers retaining a plurality of instruction fetch request addresses, these registers being given as follows.

(1) A register for a sequential instruction fetch request (corresponding to a non-branch address retaining unit): An address of the sequential instruction fetch request is an address which sequentially follows an address of a certain instruction fetch request currently being output. This address is an address into which a total instruction length of the instruction stream acquired by the instruction fetch and retained within the instruction buffer 1 is added to the address (IF_REQ_ADDRESS) of the instruction fetch request being output.

Specifically, if the instruction buffer 1 is buffered with the eight instructions (32 bytes) each consisting of 4 bytes, a next instruction address is set such as IF_REQ_ADDRESS+32.

(2) A register for a branch target instruction fetch request (corresponding to a branch target address retaining unit): An address for the branch target instruction fetch request is generated in the case of including the branch predicting unit 3. The address for the branch target instruction fetch request is a predictive branch target address (IF_TGT_ADDRESS) when the branch instruction to branch off is predicted in the instruction stream obtained in response to a certain instruction fetch request that is currently output.

(3) A register for a reinstruction fetch request (corresponding to a re-reading address retaining unit): An address for the reinstruction fetch request is a reinstruction fetch address (REIFCH_ADDRESS) when starting newly the instruction fetch if the instruction buffers 1 for a certain thread are all invalidated for reasons such as a failure in the branch prediction and the error process. If the interrupt or the trap etc occurs, however, the program counter 122 supplies the reinstruction fetch request register with the address to be fetched next.

These addresses are stored in the respective registers. These registers have the valid bits. The valid bit shows the validity of the address retained in the register as well as showing the validity of the request, simultaneously.

The instruction fetch request serves to select one address from within the registers (1) through (3) according to the predetermined priority level. This is called a first selection in the first embodiment. The first selection is the selection from the instruction fetch request registers (1) through (3) within one thread.

(Selection of Thread)

Furthermore, the processing device has these registers of which the number corresponds to the number of the threads. In the case of taking a configuration of sharing the single instruction cache 102 between the threads and accepting only one fetch request simultaneously such as accepting one input, the thread (IF_REQ_THREAD_ID) to be output in the next instruction fetch is required to be selected from within the plurality of threads (a second election). As a matter of course, the first embodiment can be, without being limited to only the configuration such as this, applied to a processing device which accepts the plurality of fetch requests simultaneously. Conditions for the selection in the case of selecting the thread are set as below.

A. A condition is to be currently in an instruction process executing status (ENABLE_PROCESS_THj).
B. Another condition is that "all-cancel" due to the failure in the branch prediction is not issued (~CANCEL THj). Note that the symbol "~" denotes negation in the first embodiment.
C. Still another condition is that the instruction cache control unit 4 can accept the instruction fetch request (~I$_BUSY_THj). Namely, the instruction cache 102 is not busy.
D. Yet another condition is that the number of the instruction buffers 1 in use is smaller than for other threads.

The number of the instruction buffers 1 in use for every thread can be checked by counting the number of VALIDs of the instruction buffers 1 with, e.g., an adder circuit. Moreover, the determination of whether the instruction buffer 1 is used for the specified thread or not may be done by referring to THREAD_ID specifying the register illustrated in FIG. 8.

If these conditions are satisfied and if the plurality of threads each having the same usage number (IBUFF_NUM_THj) of the instruction buffers 1 for every thread exists and is hard to be given the priority levels, the processing device selects the thread showing the longest elapse of time from the last instruction fetch from within these threads.

<Selection Signal of Second Selector Circuit of Instruction Fetch Address>

A selector circuit is illustrated in FIGS. 10A-10J. The second selection of the instruction fetch request address of each thread is further made, which has been thus selected in the first selection. Then, the address (IF_REQ_ADDRESS) used for the instruction fetch is finally acquired.

Figure 10A:
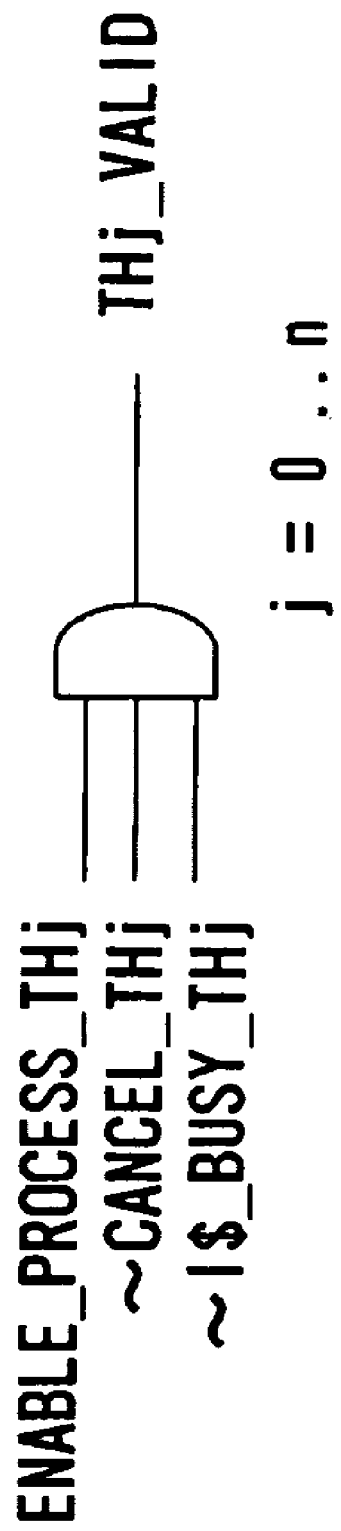
FIG. 10A is a diagram illustrating a circuit of generating a valid thread identifying signal (THj_VALID).

FIG. 10A depicts a circuit of generating a valid thread identifying signal (THi_VALID). As in FIG. 10A, the valid thread identifying signal (THi_VALID) is generated by an AND signal of an enable process thread signal (ENABLE_PROCESS_THj), the negation of the cancel thread signal (~CANCEL_THj) and the negation of the cache busy thread signal (~I$_BUSY_THj). A configuration of the generation circuit in FIG. 10A is matched with the three conditions A, B and C explained in the selection of the thread.

The enable process thread signal (ENABLE PROCESS_THj) is a signal that is output from the process management unit 140 (see FIG. 7) and indicates the thread being currently in the instruction execution status.

The cancel thread signal (CANCEL_THj) is a signal which is output from the branch reservation station 126 and requests the cancellation of the process for the thread j. The case of canceling the process is a case of invalidating the not-yet-executed instruction which is read out to the instruction buffer 1 due to, e.g., the failure in the branch prediction.

The cache busy thread signal (I$_BUSY_THj) is a signal which is output from the instruction cache control unit 4 and indicates that a new instruction fetch request for the instruction cache is not accepted.

As discussed above, if executable at the present and if the cancel signal is not currently output and when the instruction cache 102 has a free space, the valid thread identifying signal (THi_VALID) is switched ON.

FIG. 10B depicts a concept of the case of selecting the thread according to the number of the instruction buffers 1 in use. In FIG. 10B, the number (IBUFF_NUM_THj) of the instruction buffers 1 in use for each thread j is simplified as expressed by THj.

For instance, a case of selecting the n-th thread is a case in which the following expression is true.
THn_VALID
& (THn=<TH2|~TH2_VALID)
& . . . (ellipsis) . . .
& (THn=<TH0|~TH0_VALID)

Namely, a condition for selecting the n-th thread is that the valid thread identifying signal (THi VALID) illustrated in FIG. 10A is switched ON and that the number (THn) of the instruction buffers 1 in use for the thread n is smaller than the number (Thj, where j excludes n) of the instruction buffers 1 in use for another valid thread. Herein, "|" represents an OR condition. Accordingly, if (~TH1_VALID) etc is kept ON, i.e., if the thread 1 etc is not valid, it follows that the number of the instruction buffers 1 in use for this thread is not compared. The configuration in FIG. 10B is attained directly by logic gates, thereby enabling the selection of the thread entailing the small number of the instruction buffers 1 in use.

FIG. 10C illustrates a concept of the register array which determines the thread priority level based on the elapse time after selecting the thread. In FIG. 10C, data A through data H stored in the register queue are pieces of thread identifying information (the thread numbers). In the register queue, the identifying information of the thread, which has been instruction-fetched more recently, is stored in the register existing in an upper location in the drawing. Further, in the register queue, the identifying information of the thread having a low priority level is stored in the register existing in an upper location in the drawing. Conversely, in the register queue, the identifying information of the thread having a high priority level is stored in the register in a lower location in the drawing.

FIG. 10D illustrates a processing example of changing the priority level of the thread through the selection of the thread. In this example, the data E is stored in the register existing in the m-th location from the above. Now, it is considered that the thread corresponding to the data E is selected and then instruction-fetched. In this case, to begin with, the entry of the register existing in the m-th location is emptied (which actually comes to an overwrite-enabled status). At this time, the content (the data E) in the register existing in the m-th location is retained by an external register.

Then, the registers (stored with the data A through the data D) upper than the (m)th register are shifted downwards on a one-by-one basis. The priority levels of the threads corresponding to the data A-D are thereby raised one by one. Then, finally, the data E retained by the external register is stored in the uppermost register. As a result, the thread corresponding to the data E is given the lowest priority level.

Figure 10E:
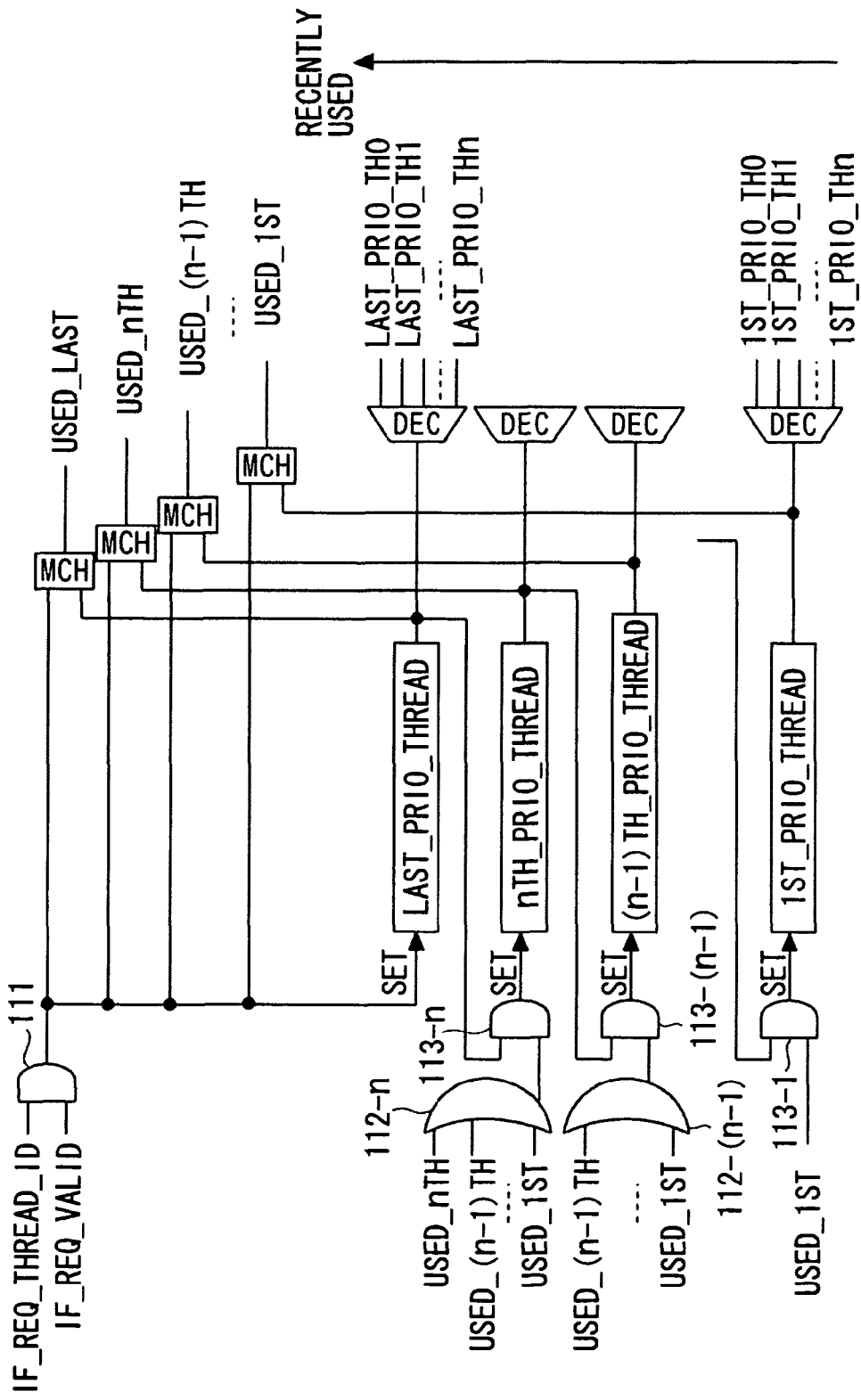
FIG. 10E is a diagram illustrating a thread priority level determining circuit according to the elapse time after selecting the thread.

FIG. 10E illustrates a thread priority level determining circuit (corresponding to a thread sequence management unit and a sequence management unit) according to the elapse time after selecting the thread. The thread priority level determining circuit determines further priority levels, which are suspended in terms of the order of superiority among the threads, on the basis of the number (THj) of the instruction buffers 1 in use illustrated by FIG. 10B. In the circuit of FIG. 10E, any one of the thread numbers (TH0 through THn) is retained in each of the entries such as "LAST_PRIO_THREAD", "nTH PRIO_THREAD", . . . , "1ST_PRIO_THREAD".

Initial values thereof are set in the sequence of the thread numbers from the lowest. In this case, TH0 is set in "1ST_PRIO_THREAD", and THn is set in "LAST_PRIO THREAD". Then, hereafter, the thread number of the recently-instruction-fetched thread is shifted to the uppermost entry (LAST_PRIO_THREAD) having the lowest priority level according to the selection of the thread in the instruction fetch, and the threads other than this thread are sequentially shifted to the second entry and entries onward below the second entry from the above. The entry of the thread priority level determining circuit corresponds to a thread register.

An operation of the circuit in FIG. 10E will hereinafter be described. The thread number (IF_REQ THREAD_ID) of the thread requested to be instruction-fetched by the instruction fetch request unit 2 in the last process and the signal (IF_REQ_VALID) showing the validity thereof are input to IF_REQ_THREAD_ID and IF_REQ VALID defined as terminals on the left side of the upper part in FIG. 10E. Note that a circuit generating IF_REQ THREAD_ID is depicted in FIG. 10I.

An AND gate 111, when IF_REQ_VALID is set ON, outputs, to a matching circuit (MCH, which corresponds to a comparing unit), the thread number (IF_REQ_THREAD_ID) of the thread about which the instruction fetch request unit 2 has issued the instruction fetch request in the last process.

The respective matching circuits (MCH) receive inputs of the entries such as "LAST_PRIO_THREAD", "nTH PRIO_THREAD", . . . , "1ST_PRIO_THREAD". Accordingly, when the thread number of IF_REQ_THREAD_ID gets coincident with a result of the comparison between the respective entries, an output of the matching circuit (MCH) is switched ON. Specifically, any one of USED_LAST through USED_1ST is switched ON.

It is now assumed that IF_REQ_THREAD_ID takes a value of 1ST_PRIO_THREAD (as described above, the initial value is the thread number 0 (TH0)). Then, USED_1ST is switched ON. As a result, the lowest AND gate 113-1 opens, and the thread number of the entry of 2ND_PRIO THREAD located higher by one is written to the entry 1ST PRIO_THREAD.

At this time, all of OR gates 112-$n$, 112-($n$−1), . . . to which USED_1ST is input are switched ON. As a consequence, the AND gates 113-$n$, 113-($n$−1), . . . at the stage next to the OR gates 112-$n$, 112-($n$−1), . . . are switched ON.

Then, the thread numbers are sequentially shifted from the entry of LAST_PRIO_THREAD down to the entry of 2ND_PRIO_THREAD. Finally, the thread number 0 (TH0) is set in LAST_PRIO_THREAD. The OR gates 112-$i$ ($i$=1−$n$), the AND gates 113-$k$ ($k$=2−$n$) and the decoder correspond to a shift control unit.

Similarly in such a case that IF_REQ_THREAD_ID is the thread number j (0<j<N), the entry of LAST PRIO_THREAD at the uppermost stage is shifted one by one sequentially from the entry higher by one than the j-th entry, and the thread number j is written to the entry of LAST_PRIO_THREAD at the uppermost stage. Thus, the thread number of the instruction-fetched thread is retained in the entry of LAST_PRIO_THREAD at the uppermost stage, while the thread numbers of the threads, which are not instruction-fetched, are shifted sequentially to the lower entries.

In FIG. 10E, a decoder (DEC) is a circuit for switching ON a bit line corresponding to the thread number. Accordingly, it follows that the bits corresponding to the values in the respective entries such as "LAST_PRIO_THREAD", "nTH_PRIO_ THREAD", . . . , "1ST PRIO_THREAD" are individually switched ON and decoded. Namely, the threads are identified in the sequence from the thread that is used recently.

According to the configuration discussed above, the low priority level is given to the thread that is processed recently, while the high priority level is given to the thread that is not processed for the longest period of time since the process has been done, thus enabling the threads to be managed. As in FIG. 10E, only the entries for identifying the management target threads, the matching circuit which compare each of these entries with the thread undergoing the process at the present point of time, and the shift circuit which shifts the respective entries according to the result of matching may be sufficient for the management. It is therefore feasible to manage the priority levels of the threads in an simple and flexible manner.

Figure 10F:
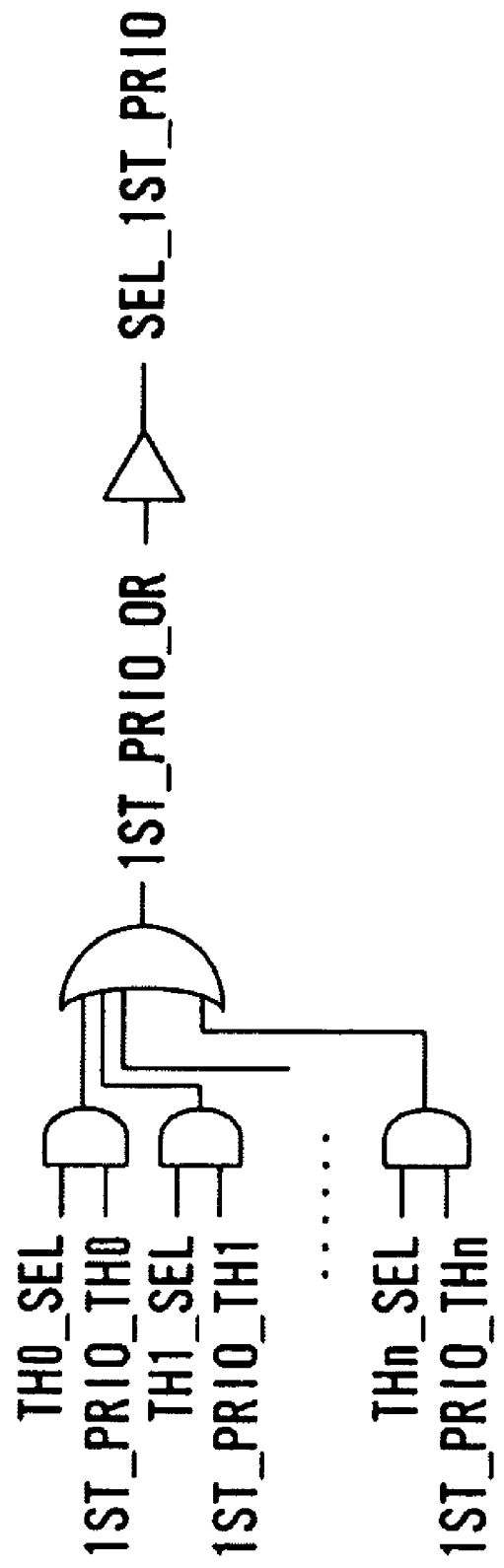
FIG. 10F is a diagram illustrating a circuit which is switched ON when determining a first priority thread given a top priority.

FIG. 10F illustrates a circuit that is switched ON when the first priority thread given the top priority is determined. To be specific, TH0_SEL through THn_SEL input to the respective AND gates in FIG. 10F are thread selection signals based on the numbers of the instruction buffers 1 being in use for the respective threads illustrated in FIG. 10B. Further, 1ST_PRIO_TH0 through 1ST_PRIO_THn are decode signals of the first priority tread illustrated in FIG. 10E. Accordingly, there exists the thread showing the minimum number of instruction buffers 1 in use and given the first priority, an output SEL_1ST_PRIO of the circuit in FIG. 10F is switched ON.

FIG. 10G depicts a circuit which is switched ON similarly when the thread given the second priority is determined. A 1ST_PRIO_OR signal is, however, inverted and thus input to the AND gate, and therefore a condition is that the first priority thread is not determined.

FIG. 10H illustrates a circuit which is switched ON similarly when the thread given the last priority is determined. The 1ST_PRIO_OR signal through an nST_PRIO_OR signal are, however, inverted and thus input to the AND gate, and hence a condition is that the threads given the n-th or higher priorities are not determined.

FIG. 10I illustrates a circuit which outputs, when the thread given the highest priority determined based on the output signals of the circuits depicted in FIGS. 10F through 10H is determined, the thread number of this determined thread. Namely, when SEL_1ST_PRIO etc is switched ON, 1ST_PRIO_THREAD etc is each output from the switch, and it follows that IF_REQ_THREAD_ID is generated. This identifying information IF_REQ_THREAD_ID is used as a control signal for selecting the thread in the second selector circuit illustrated in FIG. 9. Moreover, IF_REQ THREAD_ID is a signal input from the terminal depicted upward on the left side in FIG. 10E, and specifies the thread selected in the instruction fetch of the last time.

FIG. 10J illustrates an example of a thread selector circuit usable in a case where the number of the threads is 2. Namely, when the number of the threads is 2 and if the number of the instruction buffers 1 in use is the same, the priority levels may be changed alternately. The thread number of the two threads are defined as 0 and 1 respectively. Herein, the thread number of the thread, which has been instruction-fetched last time, is retained in a flip-flop FF (corresponding to a binary retaining unit). For example, if the thread that has been instruction-fetched last time is the thread 0, the flip-flop may be led to a reset status (reset to "=0"). Moreover, if the thread that has been instruction-fetched last time is the thread 1, the flip-flop may be led to a set status (set to "=1").

Further, BOTH_VALID is set ON when the two inputs of the AND gate G1 are true, i.e., when the numbers of the instruction buffers 1 being currently in use for the two threads respectively are the same. The AND gate G1 corresponds to a count determining unit. An inverter IV (corresponding to an inverting unit) inverts the signal (LAST_THREAD_ID) indicating the signal that has been instruction-fetched last time.

On the other hand, in FIG. 10J, when BOTH_VALID is set OFF, i.e., when the numbers of the instruction buffers 1 being currently in use for the two threads respectively are not the same, the AND gate G1 with one input being inverted determines the thread according to the number of the instruction buffers 1 in use. For example, if the number of the instruction buffers 1 in use for the thread 0 is smaller than that for thread 1, IF_REQ_THREAD_ID becomes 0. Further, in the case of selecting the thread 1, IF_REQ_THREAD_ID turns out to be 1. Thus, if the number of the threads is limited to 2, the circuit simpler than in FIGS. 10B-10G can select the thread.

Note that the second selecting signal is generated in the instruction buffer control 8.

<Instruction Fetch Processing Procedure>

A processing procedure will hereinafter be described with reference to FIGS. 7 and 9. In the instruction fetch address retaining unit 11-1 for the thread 1 and the instruction fetch address retaining unit 11-2 for the thread 2 in FIG. 9, IF_SEQ_ADDRESS and SEQ PARENT_ID are registered in registers SEQ1 (for the thread 1) and SEQ2 (for the thread 2) for the sequential instruction fetch request (each corresponding to a non-branch address retaining unit). Moreover, IF_TGT_ADDRESS and TGT_PARENT_ID are registered in registers TGT1 (for the thread 1) and TGT2 (for the thread 2) for the branch instruction fetch request (each corresponding to a branch address retaining unit). Furthermore, REIFCH_ADDRESS (corresponding to a reinstruction read address retaining unit) represents that the instruction fetch target address when processing the reinstruction fetch request is retained.

Then, as stated above, one instruction fetch request address is selected in the first and second selections from within the retained addresses. It is noted, when issuing reinstruction fetch request, the status is such that all of the instructions within the same thread in execution by the arithmetic unit are cancelled, and hence the top priority are given to the reinstruction fetch request. The selection within one thread is conducted in a way that gives the highest priority level to the reinstruction fetch, however, in the second selection, it follows that this instruction fetch request address is inevitably selected under the condition D. The reason why so is that the number of the buffers in use is 0.

The instruction fetch request unit 2 sends the thus-selected instruction fetch request address. IF_REQ VALID represents a valid signal for issuing the instruction fetch request. At this time, the instruction buffer control unit 8 selects, each time the instruction fetch is performed, one instruction buffer 1 for buffering the new instruction fetch data from within the instruction buffers 1 which are not currently used (=VALID is not established) (IF_REQ_ID). The selected instruction buffer 1, it follows, belongs to the thread specified by the thread identifier IF_REQ_THREAD_ID at this time.

Then, the instruction buffer control unit 8 gives an indication of setting a VALID flag of the selected instruction buffer 1 when issuing the instruction fetch request. Moreover, the instruction buffer control unit 8 registers the thread number of the thread about which the instruction fetch request is issued in the thread number retaining unit (THREAD_ID) (see FIG. 8) of the instruction buffer 1.

Further, a search for the branch instruction is performed in parallel by use of the instruction fetch request address. The branch predicting unit 3 can make the use of a branch history as in, e.g., Japanese Patent Laid-Open Publication No. H09-218786.

Moreover, the registers (the registers SEQ1, SEQ2 for the sequential instruction fetch request and the registers TGT1, TGT2 for the branch target instruction fetch request in FIG. 9) for the sequential instruction fetch request and for the branch target instruction fetch request, include buffer number retaining units (SEQ PARENT_ID, TGT_PARENT_ID) of the instruction buffers 1 buffered with the data of the instruction fetch which corresponds to a parent of the instruction fetch request retained in each of the registers. The "parent" is, namely, defined as the instruction fetch request (a storage content of SEQ_PARENT_ID is the parent instruction buffer number: SEQ_PARENT_ID_THj, where j is the thread number) which specifies the address serving as a basis for adding the total instruction length in the case of the registers SEQ1, SEQ2 for the sequential instruction fetch request. Further, in the case of the registers TGT1, TGT2 for the branch target instruction fetch request, the parent is defined as the instruction fetch request (a storage content of TGT_PARENT_ID is the parent instruction buffer number: TGT_PARENT_ID_THj), in which the branch instruction to branch off is predicted (see FIG. 9).

Then, the link (established by setting the pointers) between the instruction buffer 1 and the next instruction buffer 1 is established on the occasion of the next instruction fetch for the same thread. As illustrated in FIG. 9, the instruction fetch address selecting unit 9 has the parent instruction buffer number. Such being the case, the instruction buffer control unit 8, when the instruction fetch request is issued, selects the pointer to the parent instruction buffer within the instruction buffers 1 by use of the parent instruction buffer number (SEQ_ PARENT_ID or TGT_PARENT_ID), and sets the instruction buffer number (IF_REQ_ID) employed for the instruction fetch being currently in process. Moreover, IF_REQ_ID newly becomes the parent instruction buffer number. If the instruction fetch request is in the sequential instruction fetch request, the instruction fetch address selecting unit 9 sets the instruction buffer number (IF_REQ_ID at that time) being currently in process into SEQ_IBR_ID of the parent instruction buffer 1 (SEQ_PARENT_ID_THn). Moreover, if the instruction fetch request is related to the prediction branch target, the instruction fetch address selecting unit 9 sets the instruction buffer number (IF_REQ_ID at that time) being currently in process into TGT_IBR_ID of the parent instruction buffer 1 (TGT_PARENT_ID_THj). Furthermore, the instruction fetch address selecting unit 9 sets flags each indicating that the pointer is valid (SEQ_IBR_V, TGT IBR_V in FIG. 9).

Figure 11A:
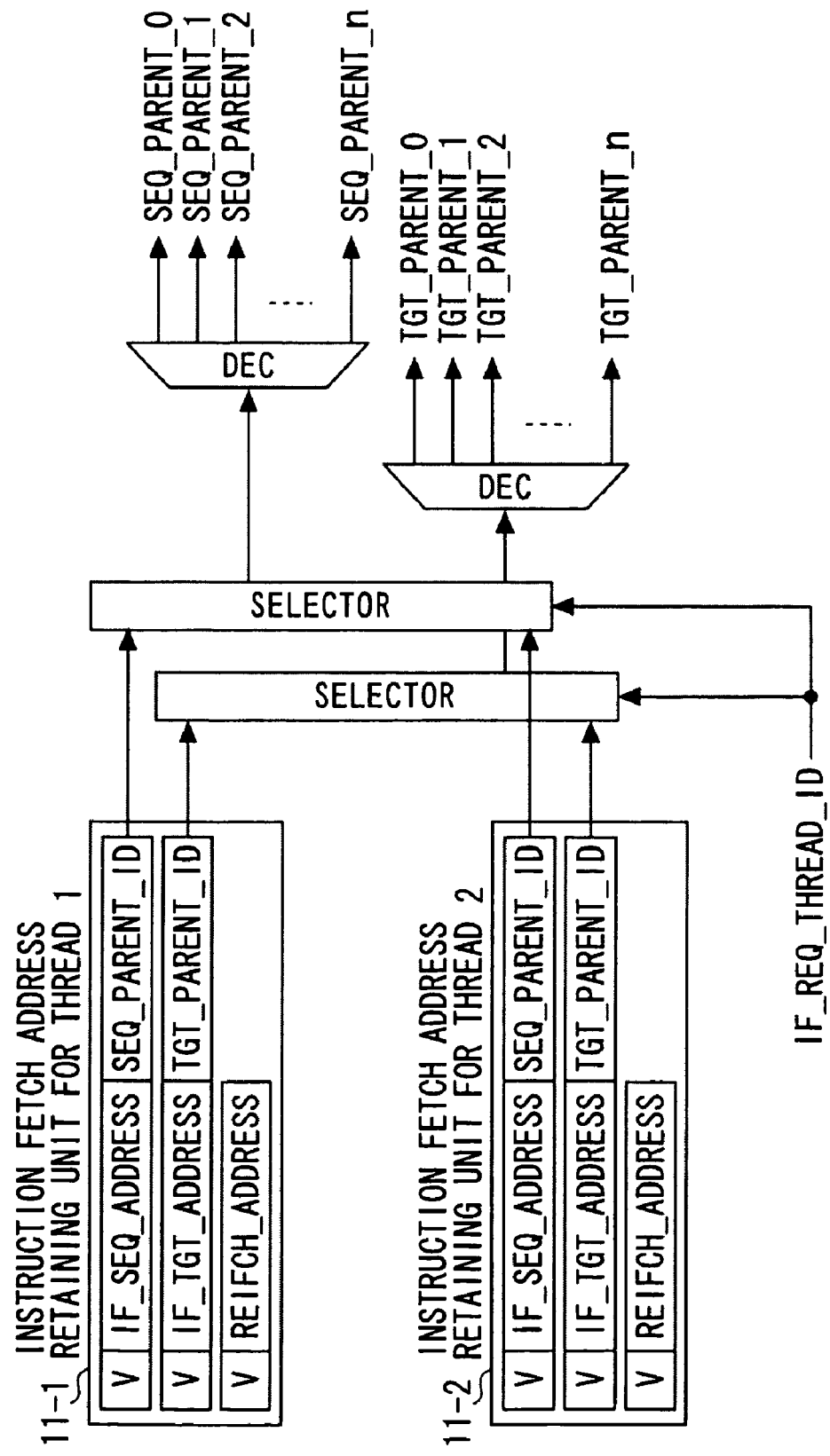
FIG. 11A is a diagram illustrating a circuit which selects a parent instruction buffer via a selector and a decoder from a fetch address retaining unit for a thread 1 and from a fetch address retaining unit for a thread 2.
Figure 11C:
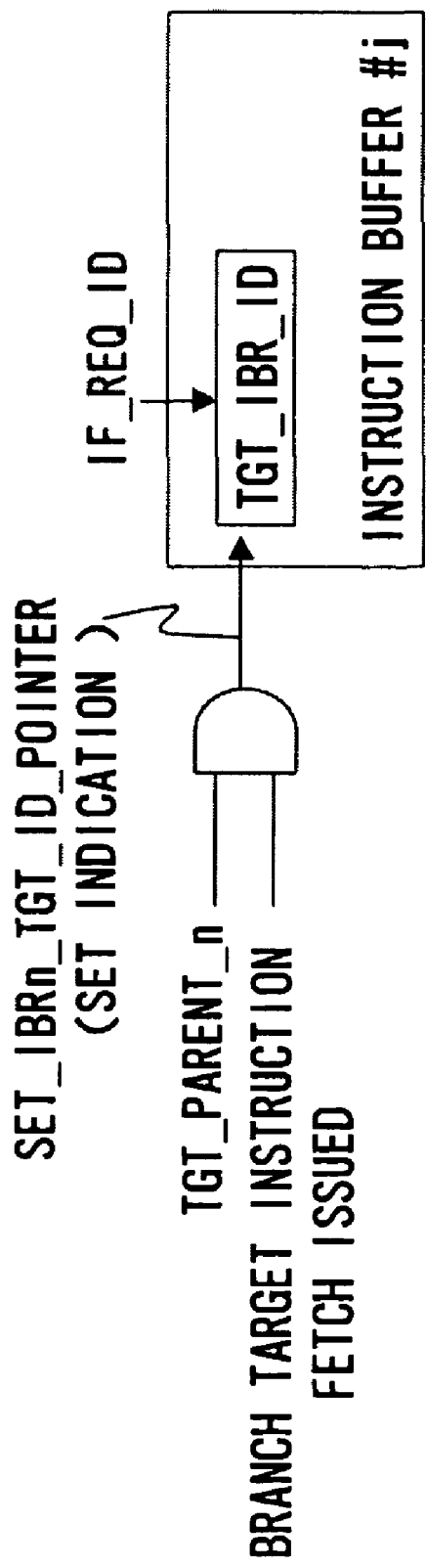
FIG. 11C is a diagram illustrating an example of a circuit which sets a pointer in a branch target direction.

FIGS. 11A-11C illustrate configurations of circuits which execute setting the pointers to the parent instruction buffer. FIG. 11A depicts the circuit which selects the parent instruction buffer 1 via the selector and the decoder from the instruction fetch address retaining unit 11-1 for the thread 1 and the instruction fetch address retaining unit 11-2 for the thread 2. As a result of being decoded, in the sequential direction, any one of SEQ_PARENT_0 through SEQ_PARENT_n is switched ON, thereby selecting the parent instruction buffer 1. Further, with respect to the predictive branch target, any one of TGT_PARENT_0 through TGT_PARENT_n is switched ON, thereby selecting the parent instruction buffer 1.

FIG. 11B illustrates an example of the circuit which sets the pointers in the sequential direction. For example, when SEQ_PARENT_n is switched ON and further when the request proves to be the sequential instruction fetch request, a setting signal (SET_IBRn_SEQ_ID_POINTER) is generated for SEQ_IBR_ID of the parent instruction buffer 1 (SEQ_PARENT_ID_THn). Then, with this setting signal, IF_REQ_ID for identifying the instruction buffer 1 being currently in process is set in SEQ_IBR_ID.

FIG. 11C illustrates an example of the circuit which sets the pointer in the branch target direction. When the branch target instruction fetch request occurs, the operation of the circuit setting the pointer is the same as in FIG. 11B. Namely, for instance, when TGT_PARENT_n is switched ON and further when the request proves to be the instruction fetch request in the branch target direction, a setting signal (SET_IBRn_TGT_ID POINTER) is generated for SEQ_IBR_ID of the parent instruction buffer 1 (TGT_PARENT_ID_THn). Then, with this setting signal, IF_REQ_ID for identifying the instruction buffer 1 being currently in process is set in TGT_IBR_ID.

With a continuation of this procedure, the pointer chain of the instruction buffer 1 is formed. The instruction is supplied by tracing this pointer chain on the per-thread basis. Thus, the pointer chain is formed for every thread while allocating the instruction buffer 1 without any restrictions, thereby enabling the resources to be effectively utilized.

<Instruction Supply Process>
(Selection of Thread)

The following is an exemplification of a process of the selecting mechanism determining which thread is selected on the occasion of supplying the instruction. Let CURRENT_STREAM_ID_VALID_THj be "VALID" of CURRENT_STREAM_ID_THj selected as the instruction buffer 1 that is input next for each thread.

In the first embodiment, among the threads with CURRENT_STREAM_ID_VALID_THj being switched ON, there is selected the thread with an elapse of the longest period of time since the instruction has been input last time. FIGS. 12A, 12B, 12C, 12D, 12E and 12F illustrate the thread selector circuits when supplying the instructions.

Figure 12A:
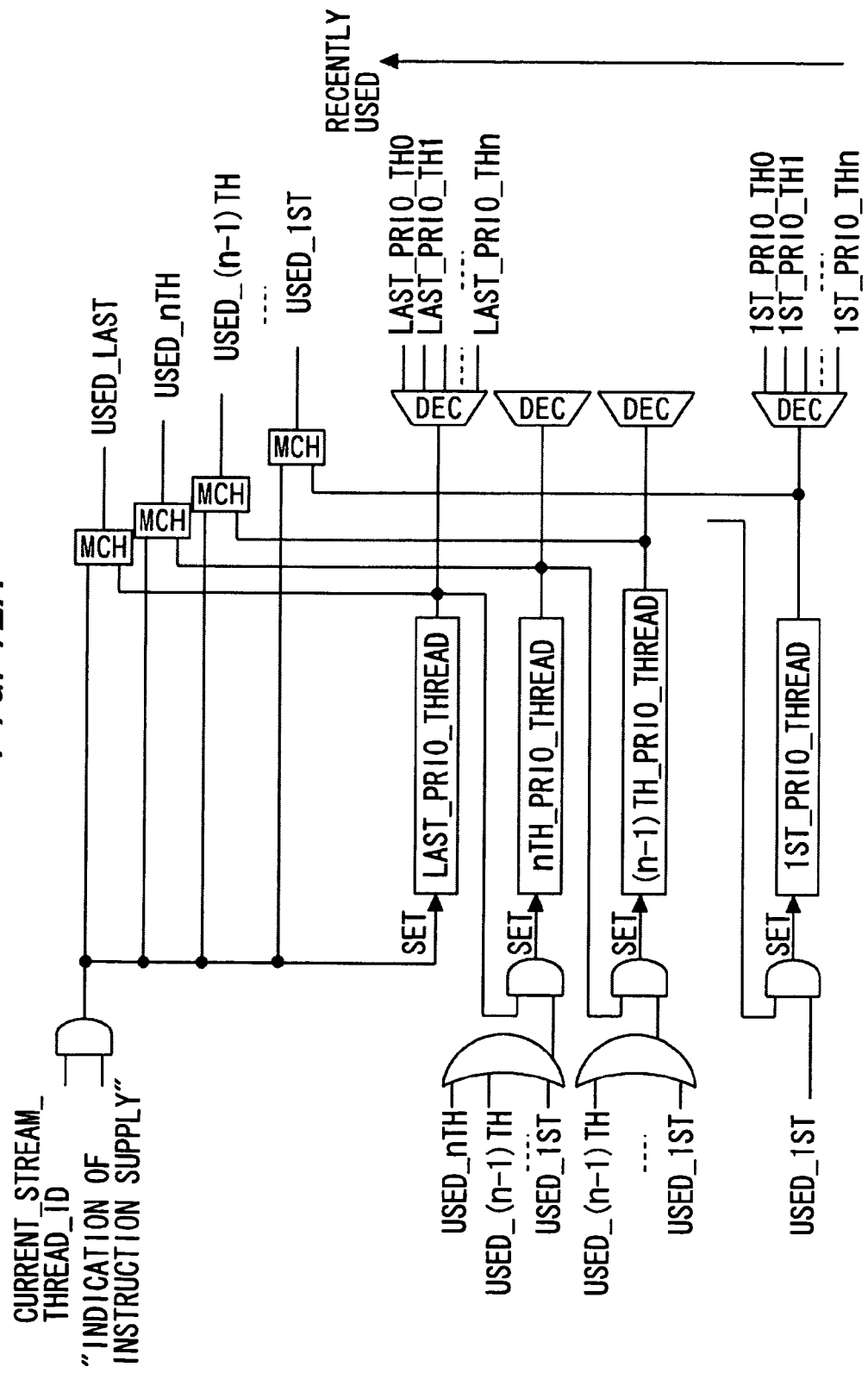
FIG. 12A is a diagram illustrating the thread priority level determining circuit according to the elapse time after selecting the thread.

FIG. 12A depicts a thread priority level determining circuit (corresponding to a supply sequence management unit and a sequence management unit) on the basis of the elapse time after selecting the thread. This circuit is a circuit which shifts the priority level of the thread being recently instruction-supplied to the last position but raises the priority level of the thread on the one-by-one basis, which is not instruction-supplied.

FIG. 12B illustrates a circuit which is switched ON when determining the first priority thread given the top priority.

FIG. 12C illustrates a circuit which is similarly switched ON when determining the second priority thread.

Figure 12D:
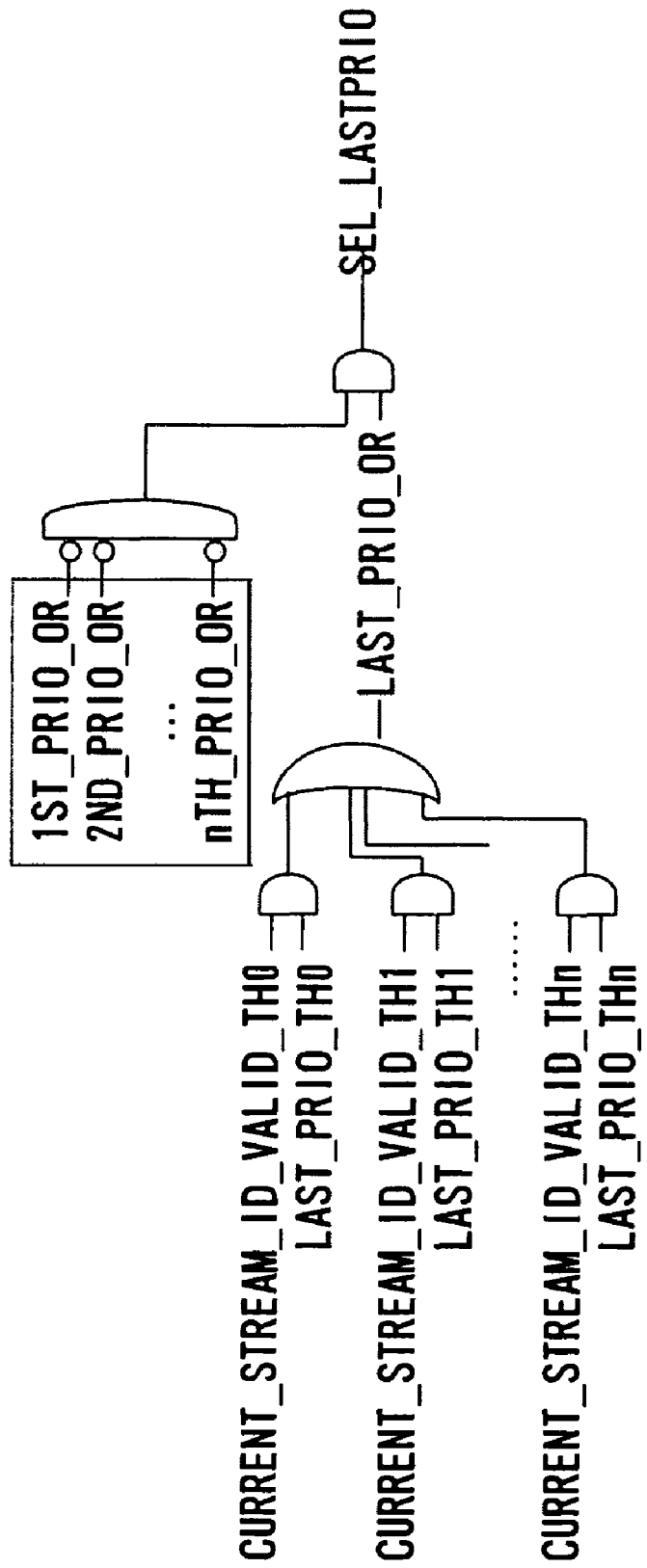
FIG. 12D is a diagram illustrating a circuit which is switched ON when determining the last priority thread.

FIG. 12D depicts a circuit which is similarly switched ON when determining the last priority thread.

Figure 12E:
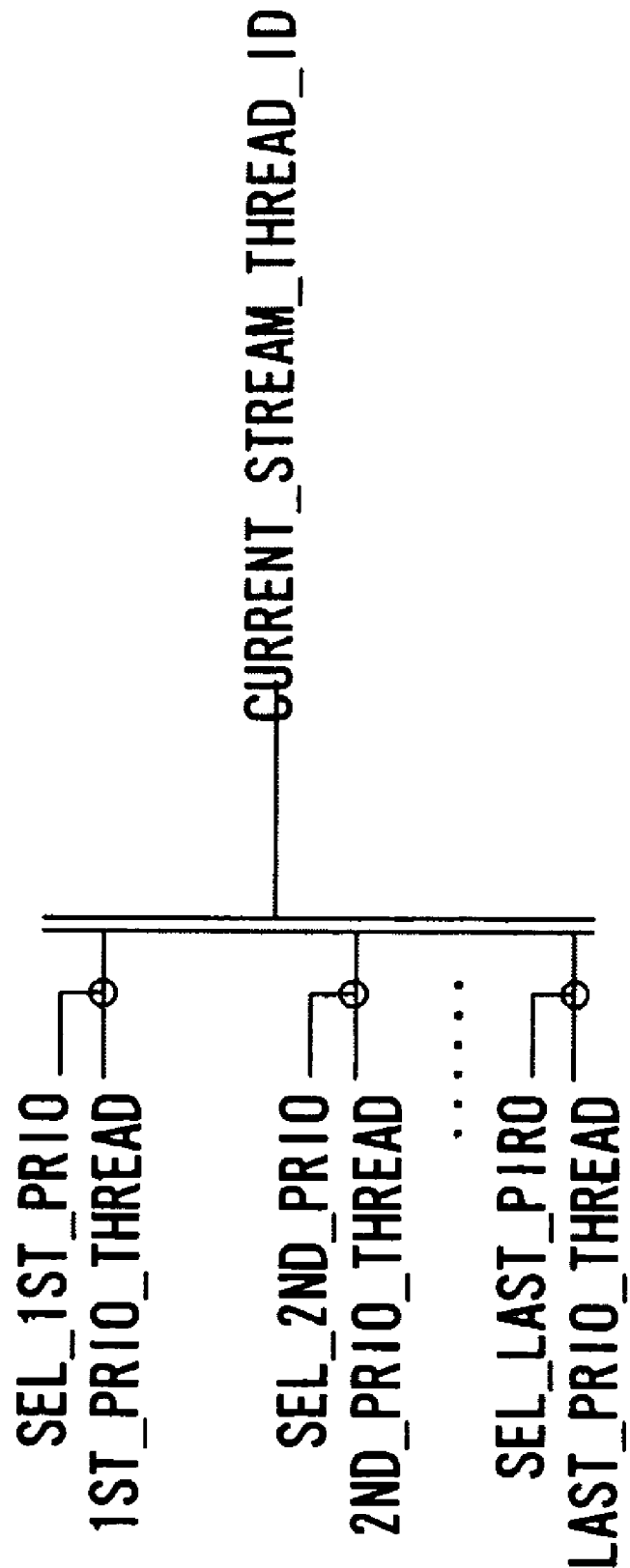
FIG. 12E is a diagram illustrating a circuit which outputs a thread number when the thread having the highest priority level is determined by output signals of the circuits depicted in FIG. 12A through FIG. 12D.

FIG. 12E depicts a circuit which outputs the thread number when the thread having the highest priority level to be decided based on the output signals of the circuits illustrated in FIGS. 12A through 12D is determined.

FIG. 12F illustrates an example of the thread selector circuit utilized in a case where the number of the treads is 2. To be specific, when the number of the threads is 2 and if the number of the instruction buffers 1 in use is the same, the priority levels may be changed alternately.

The circuits described above are the same as the circuits (FIGS. 10E, 10F, 10G, 10H, 10I and 10J) each determining the priority level of the thread given in the selection of the thread with respect to the instruction fetch, and hence their explanations are omitted.

For other variations, the thread to be selected can be also determined by monitoring the statuses of the instruction execution resources and if the resources of the reservation stations, the caches, etc are all occupied, the PRIORITY circuit being used as it is by switching OFF "VALID" and so on.

First Example of Instruction Supply Process

A first method of supplying the instructions in the selected thread from the instruction buffers 1 to the instruction executing unit, will hereinafter be exemplified. In the first embodiment, each instruction buffer in the instruction buffers 1 can be buffered with the eight instructions. The further pointer for pointing the instruction buffer 1, which is to be currently used for supplying the instruction or is currently in use, is prepared for every thread (CURRENT_STREAM_ID_THj). Moreover, OFFSET (NSI_COUNTER_THj) indicating which instruction counted from the top in the instruction buffer 1 starts being input, is provided simultaneously. This OFFSET, it follows, indicates any one of the eight pieces of buffer entries.

CURRENT_STREA_ID_THj is updated each time the instruction is supplied to the the instruction buffer 1. As a result of supplying the instructions to the instruction executing unit, if the eight buffer entries of the instruction buffer 1 are not yet all use up, the update is conducted with the same buffer number of the instruction buffer 1 as the current number (NSI_COUNTER THj (INSTRUCTION SUPPLY COUNT into the instruction buffer 1)<8). If necessary for setting the instruction buffer 1 consisting of another eight buffer entries after the (previous) eight buffer entries have been all used up, the update is done with the value of SEQ_IBR_ID of the instruction buffer 1 (NSI_COUNTER_THj (INSTRUCTION SUPPLY COUNT into the instruction buffer 1)$\geq$8).

Moreover, if the instruction buffer 1 contains the branch instruction for branching and if required to set next the branch target instruction buffer 1, the update is carried out with the value of TGT_IBR_ID.

NSI_COUNTER_THj is updated with the number of the supplied instructions. An equation is given such as NSI_COUNTER_THj=NSI_COUNTER_THj+INSTRUCTION SUPPLY COUNT (where an upper limit value is subtracted from a carry digit because of being OFFSET, and a remainder is calculated).

If the instruction supply is continued between the two instruction buffers 1, the instruction can be obtained by selecting the next instruction buffer 1 via the pointer to the instruction buffer 1, and a further pointer NEXT_STREAM_ID_THj for indicating the next instruction buffer 1 may also be prepared separately. The next buffer number can be prepared beforehand by use of the further pointer NEXT_STREAM_ID_THj. As a matter of course, the data equal to NEXT_STREAM_ID_THj can be drawn from CURRENT- _STREAM_ID_THj, however, the actual implementation takes a measure such as this in order to solve a problem of the delay, thereby enabling a logic stage count to be reduced and the high-speed operation to be provided. Thus, the pointer chain to the instruction buffers 1 is traced on.

The instruction decoder 7 can accept the plurality of instructions simultaneously but, if limited to the same thread, selects, with another selection mechanism, which thread CURRENT_STREAM_ID is used of (the selected thread is expressed by CURRENT_STREAM_THREAD_ID). The instruction buffer 1, from which the instructions are finally input, is thereby determined, and the inputting of the instructions is executed.

If the instruction decoder 7 is provided for every thread, the necessity for selecting the thread is eliminated, and the instructions are input to the instruction decoders 7 in parallel.

The following is a description of a circuit configuration for supplying the instructions in a way that traces the pointer to the instruction buffer 1 for the selected thread.

FIG. 13 illustrates a circuit which generates a further pointer (CURRENT_STREAM_ID_THj) pointing the top buffer entry in the instruction buffer 1 in use for one thread (having the thread number j). This circuit is included in the instruction supply control unit 6 (see FIG. 7).

As depicted in FIG. 13, the further pointer is generated by a selector 61 and a register 62. The selector 61 includes combining of AND gates and an OR gate. Then, when the supply from the current instruction buffer 1 is completed and if the branch is not predicted, the pointer SEQ_IBR_ID in the sequential direction is stored in the register 62. Herein, the case where the supply from the current instruction buffer 1 is completed is a case in which OFFSET (NSI_COUNTER_THj) exceeds an upper limit value (which is, e.g., the upper limit value "7" when the buffer entry count is "8") of the buffer entry count.

Moreover, in such a case that the branch instruction to branch off is predicted in the supplied instruction stream, even if the instruction stream is not used up, the pointer TGT_IBR_ID in the branch target direction is next stored in the register 62.

If not applied to any conditions described above, i.e., if the branch is not predicted and if the supply from the current instruction buffer 1 is not yet completed, a value of the register 62 is returned as it is to the register 62.

FIG. 14 illustrates a selector circuit which selects the pointers SEQ_IBR_ID in the sequential direction and the pointers TGT_IBR_ID in the branch target direction, which are the inputs to the selector 61 in FIG. 13.

This selector circuit decodes, to begin with, the further pointer (CURRENT_STREAM_ID_THj). The further pointer is registered with the buffer number of the buffer from which the instructions are currently supplied. Accordingly, as a result of being decoded, any one signal line, associated with the buffer number, among signal lines CURRENT_STREAM_ID_DEC_i_THj (where, e.g., i=0 through 7) is switched ON. Hence, any one of the pointers SEQ_IBR_ID_IBRi (i=0 through 7) is selected and extracted as SEQ_IBR_ID by this signal. Moreover, any one of the pointers TGT_IBR_ID_IBRi (i=0 through 7) is selected and extracted as TGT_IBR_ID by this signal. Thus, the pointers SEQ_IBR_ID and TGT_IBR_ID are selected and input to the selector 61 in FIG. 13.

Figure 15:
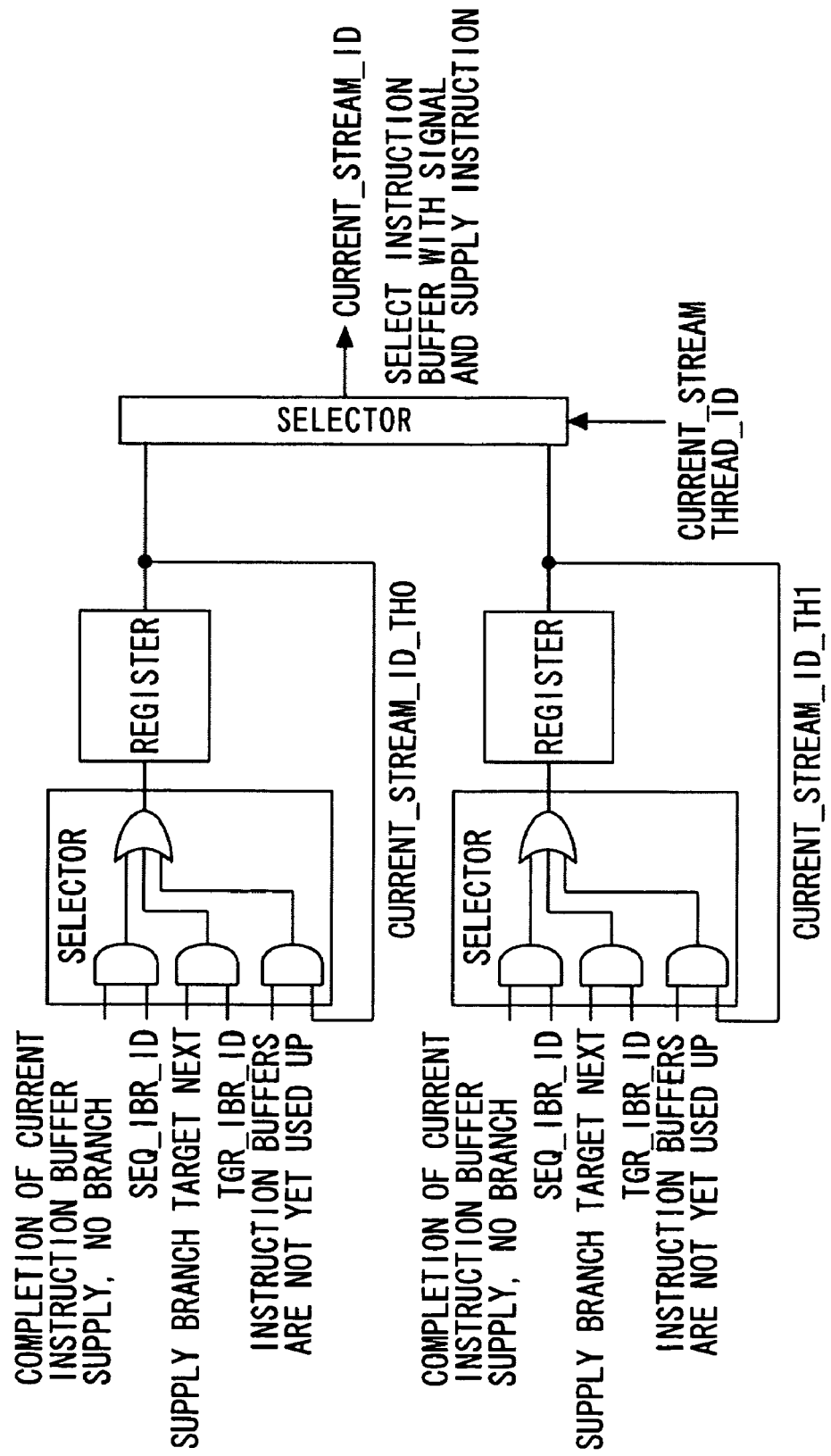
FIG. 15 is a diagram illustrating a circuit which generates and selects the further pointer individually for every thread with the selector.

FIG. 15 illustrates a selector circuit which generates and selects the further pointer CURRENT_STREAM ID_THj individually for every thread by use of the selector. FIG. 15, however, illustrates only a simplified case in which j=0 and j=1. The implementation of the first embodiment is not necessarily, however, limited to this scheme. The configuration and the operation of the circuit generating the further pointer CURRENT_STREAM_ID_THj are as explained in FIG. 13.

Herein, the further pointer associated with the thread number is selected from within the plurality of pointers CURRENT_STREAM_ID_THj on the basis of the CURRENT_STREAM_THREAD_ID specifying the thread number of the thread currently undergoing the instruction supply.

The configuration described above enables the pointer chain to be traced on for every thread.

Second Example of Instruction Supply Process

Exemplified is a second method by which the instruction executing unit supplies the instructions from the instruction buffer 1. The instruction decoder 7 can accept the plurality of instructions, however, these instructions are limited to within the same thread.

One register, which is stored with the further pointer pointing the instruction buffer 1 that is to be currently used or is currently in use for supplying the instructions, is prepared in common between or among the threads (CURRENT_STREAM_ID). Provided further is OFFSET (NSI_COUNTER) indicating by a number of instructions counted from the top of the instruction buffer 1, which instruction is to be input.

Another mechanism previously selects which thread is input. A retaining register, which retains information indicating which point the unselected thread has been input up to, is prepared. The register retains the buffer number of the instruction buffer 1 and OFFSET indicating by a number of instructions counted from the top entry of the instruction buffer 1, which instruction is to be input next.

CURRENT_STREAM_ID and NSI_COUNTER are updated each time instruction supply is conducted. The update is carried out in the same procedure as the procedure in the first processing example. If the same thread is selected for the next input, however, the update target becomes CURRENT_STREAM_ID, and, whereas if a different thread is selected, the items of information are replaced. To be specific, with respect to the newly selected thread, the items of information retained in the retaining register are set in CURRENT_ STREAM_ID and NSI_COUNTER, while the updated items of information of the thread which have been set so far in CURRENT_STREAM_ID and NSI_COUNTER, are registered in the resultantly-emptied retaining register.

FIG. 16 depicts an example of a configuration of a circuit in which one dedicated register stored with the further pointer is provided for the thread undergoing the instruction supply, and the further pointer is replaced between the threads. In FIG. 16 also, for simplifying the discussion, with respect to the thread, j is given such as j=0 and j=1. The implementation of the first embodiment is not necessarily restricted to the configuration such as this but may take a configuration flexible to a greater number of threads.

In this configuration, a switching circuit 63 is provided between selectors 61-0 and 61-1 and between registers 62-0 and 62-1. The switching circuit 63 inputs, in response to a thread replacement indicating signal, any one of signals of the selectors 61-0, 61-1 to the register 62-1 (corresponding to a trace register) and makes an output as the further pointer CURRENT_STREAM_ID.

On the other hand, the output of the other selector, which is not output as the further pointer, is input to the register 62-0 (corresponding to a waiting-for-trace register) and is output as a dummy pointer CURRENT_STREAM_ID_SAVED.

Note that if there are three or more selectors corresponding to the number of threads, the thread number specifying the thread being in the process of the instruction supply is decoded, and any one of the outputs of the selectors 62-$j$ ($j$=0, 1, 2, ...) may be selected. The output of the selected selector 62-$j$ may be output as CURRENT_STREAM_ID to the register 62-$l$. While on the other hand the outputs of the unselected selectors 62-$j$ may be discarded directly.

Thus, the pointer chains can be still kept tracing on the per-thread basis.

<Release Process of Instruction Buffer>

A release (which is also termed invalidation) of the instruction buffer 1 will hereinafter be described. The instruction buffer 1 is released after using the instruction buffer 1 and when the instruction buffer 1 becomes unnecessary due to the failure in the branch prediction.

After an end of the supply of the instruction buffer 1, the buffer number of the instruction buffer 1 with the supply being finished is retained in pipeline, and, when reaching such a stage that the instruction buffer 1 may be released in the pipeline process, the instruction buffer 1 is released by setting "0" in a valid flag of the instruction buffer 1 having this buffer number.

When failing to predict the branch, a signal (CANCEL_THj) representing the failure in the branch prediction on the per-thread basis and a signal for invalidating the instruction buffer 1 with the thread number are generated, thereby releasing the instruction buffer 1. The thus-released instruction buffer 1 returns to the initial status, and therefore whichever thread may use the released instruction buffer 1.

Figure 17A:
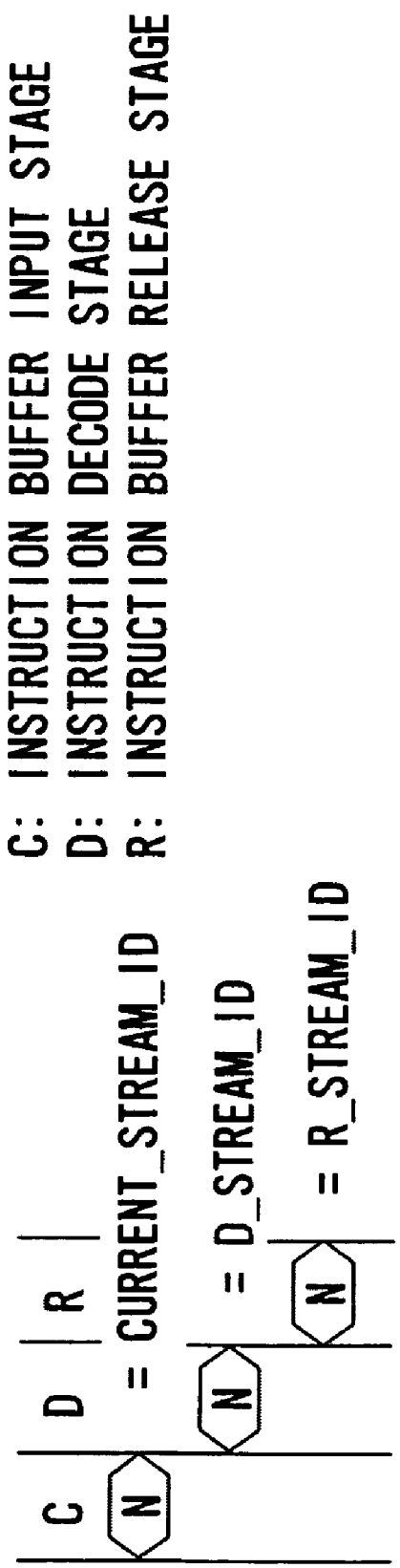
FIG. 17A is a diagram illustrating a cycle from inputting the instruction buffer and a release of the instruction buffer.

FIG. 17A is a diagram illustrating a cycle till the instruction buffer 1 is released since the timing of the input of the instruction buffer 1. In FIG. 17A, the symbol C denotes an instruction buffer input stage, D designates an instruction decode stage, and R represents an instruction buffer release stage. The buffer number of the instruction buffer 1 input at the instruction buffer input stage is retained in the further pointer CURRENT_STREAM_ID. The buffer number of the instruction buffer 1 is retained in a register D_STREAM_ID at the instruction decode stage. Moreover, the buffer number of the instruction buffer 1 is retained in a register R STREAM_ID at the instruction buffer release stage.

Figure 17B:
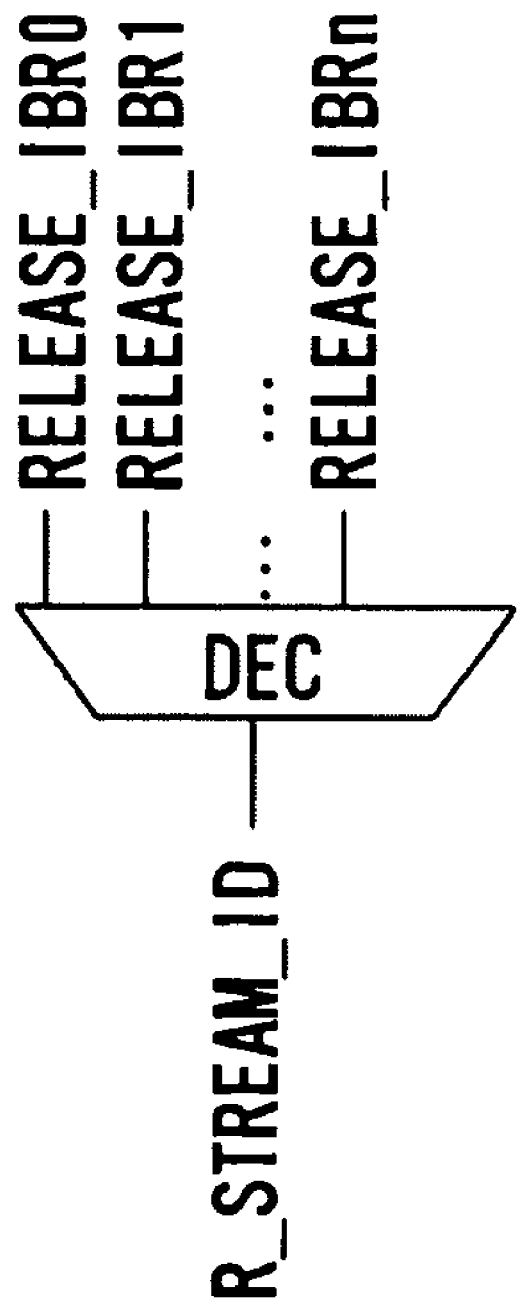
FIG. 17B is a diagram of a circuit which decodes the buffer number of the instruction buffer retained in a register R_STREAM_ID.

FIG. 17B depicts a circuit (corresponding to a selector circuit) decoding the buffer number of the instruction buffer 1, which is retained in the register R STREAM_ID. As a result of this decode, any one of RELEASE_IBR0 through RELEASE_IBRn is switched ON. RELEASE_IBR0 etc is a signal used for releasing the instruction buffer 1 which gets decoded and unnecessary.

FIG. 17C illustrates an example of a circuit (corresponding to a selecting unit) which generates a signal for releasing batchwise the instruction buffers 1 employed for a specified thread (having, e.g., the thread number $j$), which is contained in the instruction fetch request unit 2 (corresponding to a release unit). For instance, in a certain thread THj (thread number $j$), if the branch predicting unit 3 fails to predict the branch, the instruction is re-fetched, and all of the instruction buffers 1 in use at that point of time become unnecessary. Furthermore, the branch prediction gets successful, and the instruction buffer 1 in the sequential direction becomes unnecessary as the case may be.

In FIG. 17C, CANCEL_THj is switched ON when receiving notification of the failure in the branch prediction from, e.g., the branch reservation station 126. Moreover, the thread number of the thread for which the respective instruction buffers 1 are in use is stored in IBR_THREAD_ID (corresponding to an identifying information retaining unit) (THREAD_ID in FIG. 7). Accordingly, it follows that according to the circuit in FIG. 17C, the output signal CANCEL_IBRi serves to, when CANCEL_THj is switched ON, extract the instruction buffer 1 having a cancel target thread $j$ as IBR_THREAD_ID.

Figure 17D:
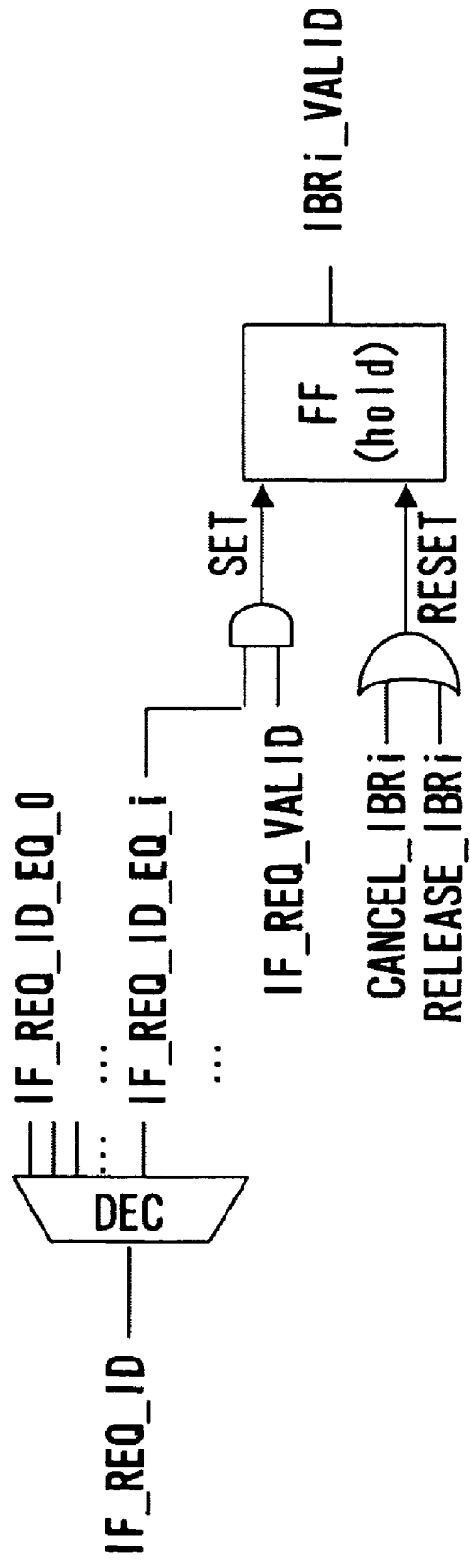
FIG. 17D is a diagram illustrating an example of a circuit which generates a valid bit of the buffer.

FIG. 17D illustrates an example of a circuit which generates a valid bit IBRi_VALID (VALID in FIG. 8) of the buffer. In this circuit, at the first onset, the register IF_REQ_ID representing the buffer number of the instruction buffer 1 in use is decoded, and any one of signals IF_REQ_ID_EQ0 through IF_REQ_ID_EQn, which is associated with the buffer number, is selected. Then, the AND gate is switched ON based on IF_REQ_VALID, then the flip-flop associated with IF_REQ_ID is set, and the valid bit IBRi_VALID is generated.

On the other hand, when any one of RELEASE_IBRi ($i$=1–n) generated by the circuit in FIG. 17B and CANCEL_IBRi ($i$=1–n) generated by the circuit in FIG. 17C is switched ON, the flip-flop is reset, and the valid bit IBRi_VALID is switched OFF.

Example of Sequential Release Process

A thinkable mechanism for releasing all of the instruction buffers 1 for the specified thread is that the instruction buffers 1 are sequentially released by making use of the links (pointers) among the respective instruction buffers 1. To be specific, any problem does not arise from the sequential release in a way that traces the pointers. The released buffers may be used for whichever threads. A starting point retaining register as disclosed in Japanese Patent Application No. 390806029 which was already patented to the present patent applicant may also be utilized. Namely, if this starting point register is provided for every thread, the release may be started based on this register as a starting point.

Figure 18C:
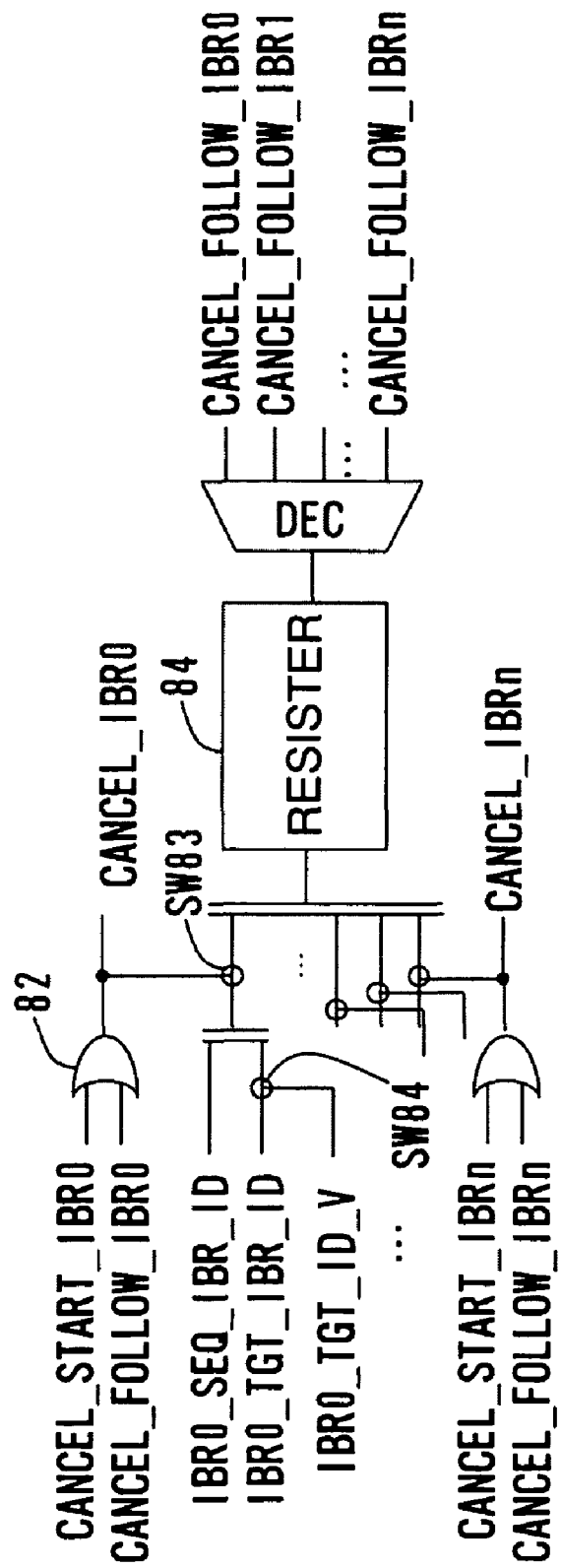
FIG. 18C is a diagram (part 2) illustrating the circuit which sequentially releases the chains of the instruction buffers 1 with START_IBR_ID_THj serving as the starting point.

FIGS. 18A through 18C illustrate a time chart and configurations of main circuits for executing the processes described above. An example of the release process, which involves tracing the pointers, will be given by exemplifying a case of forming a chain of the instruction buffers 1 such as IBR0≧IBR4≧IBR2.

FIG. 18A depicts the processes up to another 4 cycles (cancel, 1T-4T) since occurrence of cancellation in the branch reservation station 126.

FIG. 18B and FIG. 18C illustrate the circuit which sequentially releases a chain of the instruction buffers 1 with START_IBR_ID_THj serving as the starting point. The top of the chain of the instruction buffers 1 can be retained in the starting point register START_IBR ID_THj. In the first embodiment, each of chains of the instruction buffers 1 corresponds to each of different threads. Therefore, it follows that the starting point register START_IBR_ID_THj is prepared on the per-thread basis.

Such a case is now considered that a command of canceling the instruction buffers 1 for the thread THj is issued due to the failure in the branch prediction in the branch reservation station 126. In this case, the starting point register START_IBR_ID_THj is decoded, and, e.g., IF_REQ_ID_EQ_i is kept ON. Moreover, IF_REQ_ID_EQ i together with CANCEL_THj issued from the branch reservation station 126 is input to the AND gate, and CANCEL_START_IBRi is switched ON. With this operation, at first, the buffer having the buffer number i in the instruction buffers 1 is released (the decoder in FIG. 18B corresponds to a first release processing unit). Now, a case where i=0, i.e., CANCEL_START_IBR0 is kept ON, is considered by way of an example.

Then, the circuit (corresponding to a second release processing unit) in FIG. 18C switches ON CANCEL IBR0 via an OR gate 82. To begin with, the instruction buffer 1 having the buffer number 0 is thereby released. Moreover, CANCEL_IBR0 is switched ON, whereby a switch SW83 is switched ON. Further, a chain is formed by any one of the pointer IBR0_SEQ_IBR_ID in the sequential direction and the pointer IBR0_TGT_IBR_ID in the branch target direction in the pointers subsequent to the instruction buffer 1 having the buffer number 0. It is known, from simply seeing the valid flag IBR0_TGT_ID_V of the pointer in the branch target direction, which is valid. In the circuit in FIG. 18C, a switch SW84 is switched ON/OFF depending on the valid flag IBR0_TGT_ID_V. Specifically, if IBR0_TGT_ID_V is OFF, the pointer IBR0 SEQ_IBR_ID in the sequential direction is stored in the register 84. Further, if IBR0_TGT_ID_V is ON, the pointer IBR0_TGT_IBR_ID in the branch target direction is stored in the register 84. Then, the buffer number in the register 84 is decoded, and CANCEL_FOLLOW_IBRk (k is any one of 1 through n) is switched ON.

Accordingly, with CANCEL_FOLLOW_IBRk, a switch equal to the switch SW83 is switched ON, and CANCEL_IBRk is switched ON. As a result, the chain of the instruction buffers 1 is traced by one, thereby releasing the instruction buffer 1 specified by the buffer number k. Hereafter, through the propagation of the same signal, it follows that the chain of the instruction buffers 1 is traced.

FIG. 18A illustrates a processing flow (timing chart) in that case. To be specific, at first, a reference to CANCEL_START_IBR0 is made, and CANCEL_IBR0 is generated. Then, IBR0_VALID is switched OFF.

At the next cycle, CANCEL_IBR0 is generated by extracting the next pointer with CANCEL_FOLLOW_IBRk, and IBR4_VALID is switched OFF. At the further next cycle, CANCEL_IBR2 is generated, and IBR2_VALID is switched OFF.

<Process of Short Loop>

A structure of a short loop will further be described. In the case of desiring to form a short loop as disclosed in Japanese Patent Application No. 3804941, the short loop can be realized by having the starting point register for retaining the starting point of the short loop on the per-thread basis.

FIG. 19 is a diagram of a configuration of the instruction fetch control unit 5 to which the starting point register is applied. FIG. 19 depicts, for simplification, only the starting point registers associated with the thread numbers j=1 and j=2. The mode of the first embodiment is not limited to the configuration such as this.

Figure 20A:
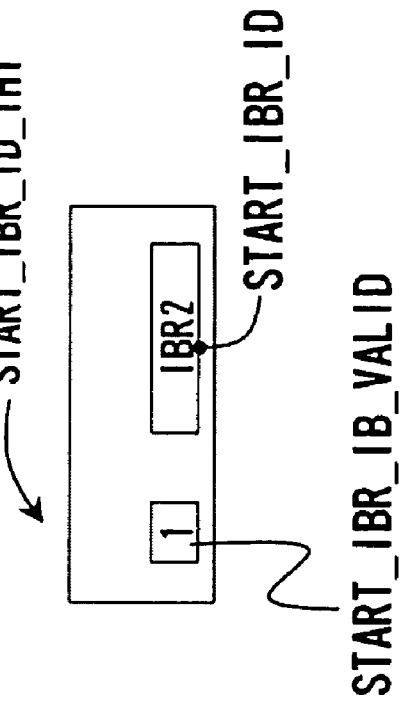
FIG. 20A is a diagram illustrating a configuration of a starting point register for a thread 0.
Figure 20B:
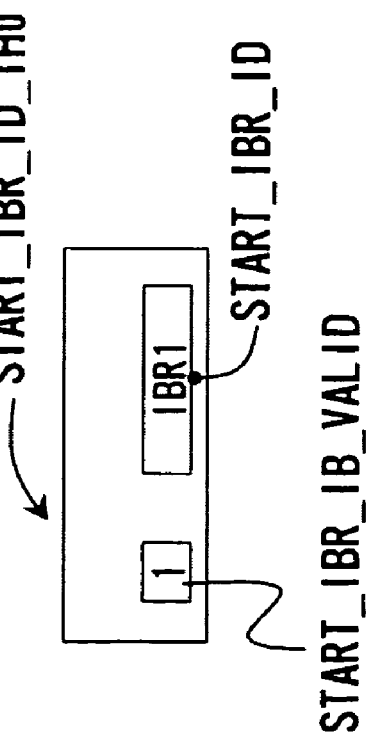
FIG. 20B is a diagram illustrating a configuration of a starting point register for a thread 1.

FIG. 20A is a diagram illustrating a configuration of the starting point register for the thread 0. Further, FIG. 20B is a diagram illustrating a configuration of the starting point register for the thread 1. The starting point register has a register START_IBR_ID for retaining the buffer number at the starting point and the valid flag (START_IBR_ID_VALID).

Figure 21:
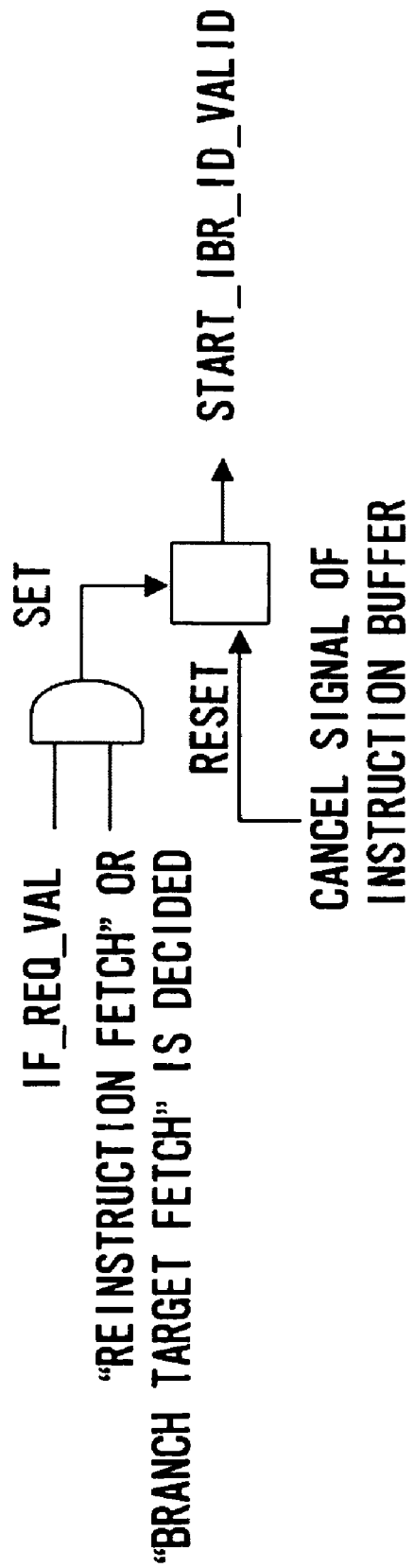
FIG. 21 is a diagram illustrating a circuit which generates a valid flag START_IBR_ID_VALID of the starting point register.

FIG. 21 illustrates a circuit which generates the valid flag START_IBR_ID_VALID of the starting point register. This circuit is switched ON when the instruction fetch request is valid (IF_REQ_VALID is ON) and when the reinstruction fetch or the branch target fetch is carried out. While on the other hand, the circuit is switched OFF when the cancel signal with respect to the instruction buffer 1 is transmitted.

Figure 22:
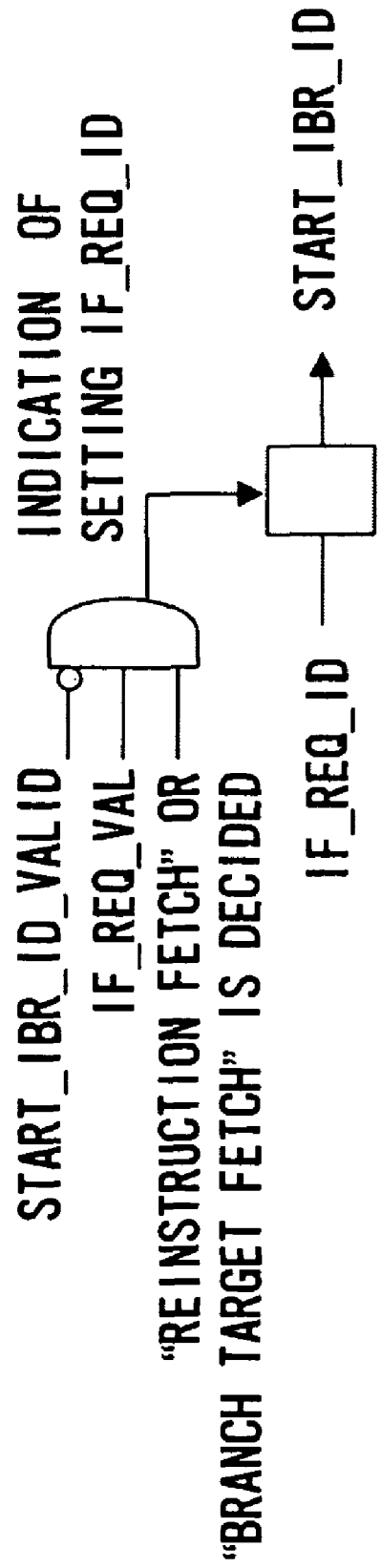
FIG. 22 is a diagram illustrating a circuit which sets a buffer number in a register START_IBR_ID for retaining the buffer number of the starting point register.

FIG. 22 illustrates a circuit (corresponding to a starting point setting unit) which sets the buffer number in the register START_IBR_ID for retaining the buffer number of the starting point register. This circuit sets IF_REQ_ID defined as the identification ID of the instruction buffer 1 in START_IBR_ID of the starting point register for the thread concerned when the valid flag of the starting point register is invalid (START_IBR_ID_VALID is OFF, i.e., the valid starting point is not yet set), when the instruction fetch request is valid (IF_REQ_VALID is ON) and when the reinstruction fetch or the branch target fetch is performed. This is because both of the reinstruction fetch target address and the branch target address have a high possibility of becoming the starting point of the loop.

Such a case is presumed that the instruction fetch request sent from the instruction fetch request unit 2 is the branch target instruction fetch request based on the branch prediction made by a branch history unit of the branch predicting unit 3 or is the branch target reinstruction fetch request for redoing the instruction fetch because of knowing that the branch prediction has got into the failure when executing the instruction. In this case, the starting point register (START_IBR_ID) is registered with the buffer number (i.e., IF_REQ_ID) of the instruction buffer 1 ensured by the branch target instruction fetch request or the reinstruction fetch request, and VALID of the register is set ON.

The branch predicting unit 3 has the branch history unit. Herein, a brief description of the branch history unit will be made. The branch history unit predicts existence of the branch instruction and the branch target address thereof. For example, the implementation thereof is exemplified as below. On such an occasion that the processing device executes the process, the branch proves to be established as a result of executing the branch instruction, in which case the branch instruction will, it is considered, also branch off next, and a pair of an address of the branch instruction itself (which will hereinafter be referred to as the branch instruction address) and an address of the branch target instruction (which will hereinafter be referred to as the branch target address) is registered in the branch history unit. Thus, the paired data about the branch instruction with the branch being established is accumulated in the branch history unit. Namely, the branch history unit is registered with only the data of the branch instruction predicted to branch off.

Then, on the occasion of fetching a certain branch instruction from the main storage device and executing this branch instruction, a search through an index of the branch history unit is made in advance of the execution thereof, and, if the branch instruction address is registered in the branch history unit, the branch target address paired with the branch instruction address is read from the branch history unit. Then, without waiting for an end of the anterior execution of the instruction, the instruction associated with the branch target address is fetched out of the main storage device and executed. Note that if the instruction cache 102 retains a copy of the instruction associated with the branch target address, this instruction is fetched from the instruction cache 102 and executed. Further, the branch history unit can also improve accuracy of the branch prediction by predicting whether to branch off or not when the branch instruction occurs next on the basis of the branch result (=branch history) of a plurality of occurrences of a certain branch instruction. If predicted to branch off, this is likewise registered in the branch history unit.

Namely, before executing the branch instruction, if the branch history unit predicts the establishment of the branch (if the branch target address associated with the branch instruction address is registered in the branch history unit), the instruction fetch is carried out by use of the predicted branch target address, and, subsequent to the branch instruction, the readout branch target instruction is input to the instruction execution stage.

Figure 25:
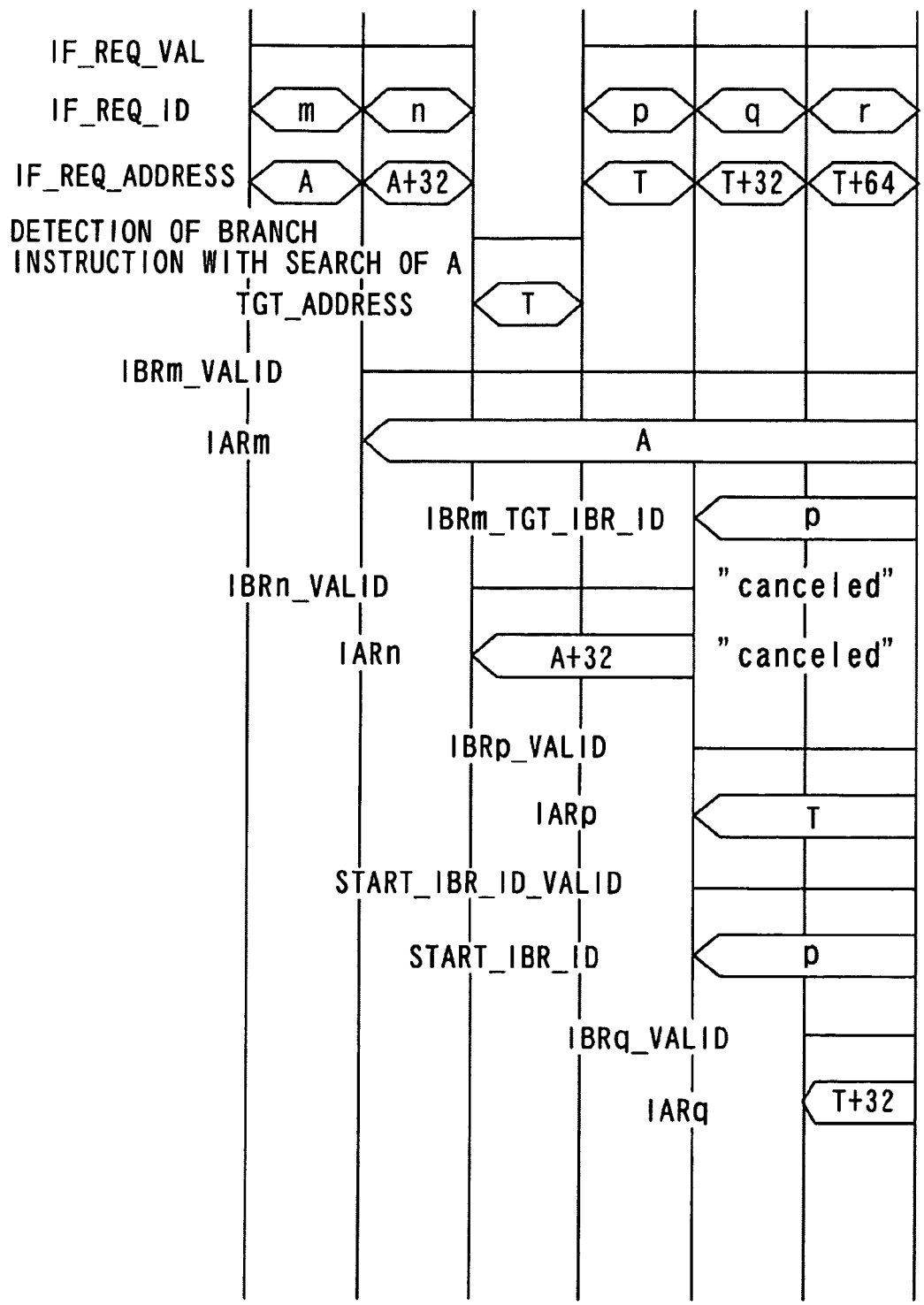
FIG. 25 is a time chart illustrating the process of the instruction buffer by the starting point register.

Further, as discussed above, the processing device waits for the starting point register on the per-thread basis. An assumption is that a certain instruction fetch request is sent, in which IF_REQ ADDRESS="A" and IF_REQ_ID="m". When the buffer number of the instruction buffer 1 is "m", this instruction buffer 1 is denoted by IBRm. The discussion will hereinafter be made with reference to a time chart in FIG. 25.

The instruction fetch request has been, it follows, sent while ensuring the instruction buffer 1 (IBRm) having the buffer number "m". Such being the case, IBRm_VALID defined as the valid flag of IBRm is set ON. Moreover, the instruction fetch address of IBRm is stored in a register IARm. It is noted, the following is the fetch within the same thread.

The subsequent instruction fetch in the sequential direction continues such as IF_REQ_ADDRESS="A+32", IF_REQ_ID="n", . . . .

On the other hand, it is assumed that when searching through the branch history unit of the branch predicting unit 3 with the instruction fetch address A, the branch instruction to branch off is detected (the branch target address TGT_ADDRESS="T", and, for simplifying the story, let "T" be a 32-byte border address).

Then, the instruction fetch request unit 2 sends the branch target instruction fetch request. Further, the instruction fetch request unit 2 cancels the instruction fetch request in the sequential direction. Let "p" be IF_REQ_ID when making the branch target instruction fetch request, IBRp_VALID is set ON at this time. "p" is registered as the pointer (IBRm_TGT_IBR_ID) in the branch target direction to the next instruction buffer 1. Moreover, this pointer "p" is registered as the starting point of the loop with respect to the starting point register (START_IBR_ID_THj) for the thread specified by IF_REQ_THREAD_ID (=j). Furthermore, the instruction fetch address "T" is registered in the register IARp.

Thereafter, it is assumed that the branch instruction is detected (TGT_ADDRESS="TT") during an instruction fetch (IF_REQ_ADDRESS="T+64", IF_REQ_ID="r") further next to the instruction fetch (IF_REQ ADDRESS="T+32", IF_REQ_ID="q") in the sequential direction from the address T with.

Herein, the branch target address "TT" and IARp are referred to, from the instruction fetch address IAR (START_IBR_ID) of the instruction buffer 1 specified by the starting point register START_IBR_ID_THj for the thread j to which the branch target address "TT" belongs, i.e., from START_IBR_ID="p" in this case. Then, if IARp="T"="TT", it follows that the branch target of IBRr becomes equal to IBRp. Then, "p" is registered as IBRr_TGT_IBR_ID. A loop extending to IBRp from IBRr is thereby formed. FIG. 26 depicts the loop of the instruction buffers, which is formed at this time. The processes described above are executed by the logic circuit including the starting point register of the instruction fetch control unit 5 in FIG. 19. This logic circuit corresponds to a branch-directional pointer setting unit.

Figure 23:
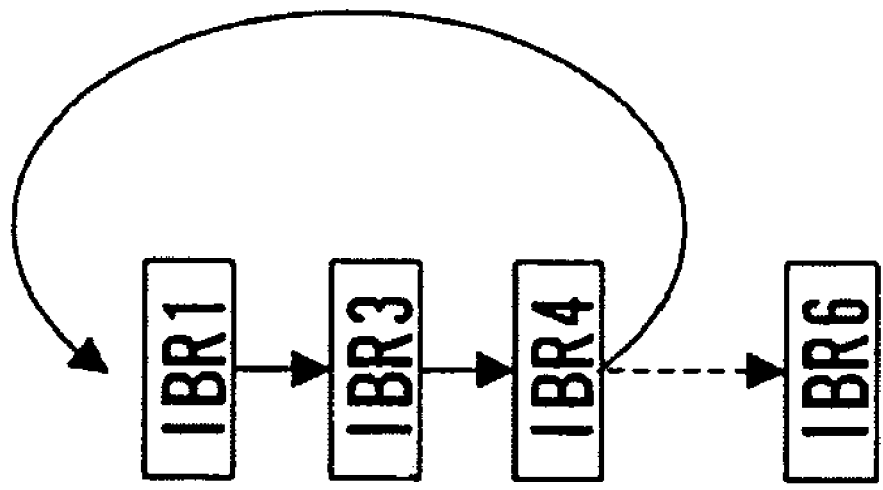
FIG. 23 is a conceptual diagram of a short loop.
Figure 24:
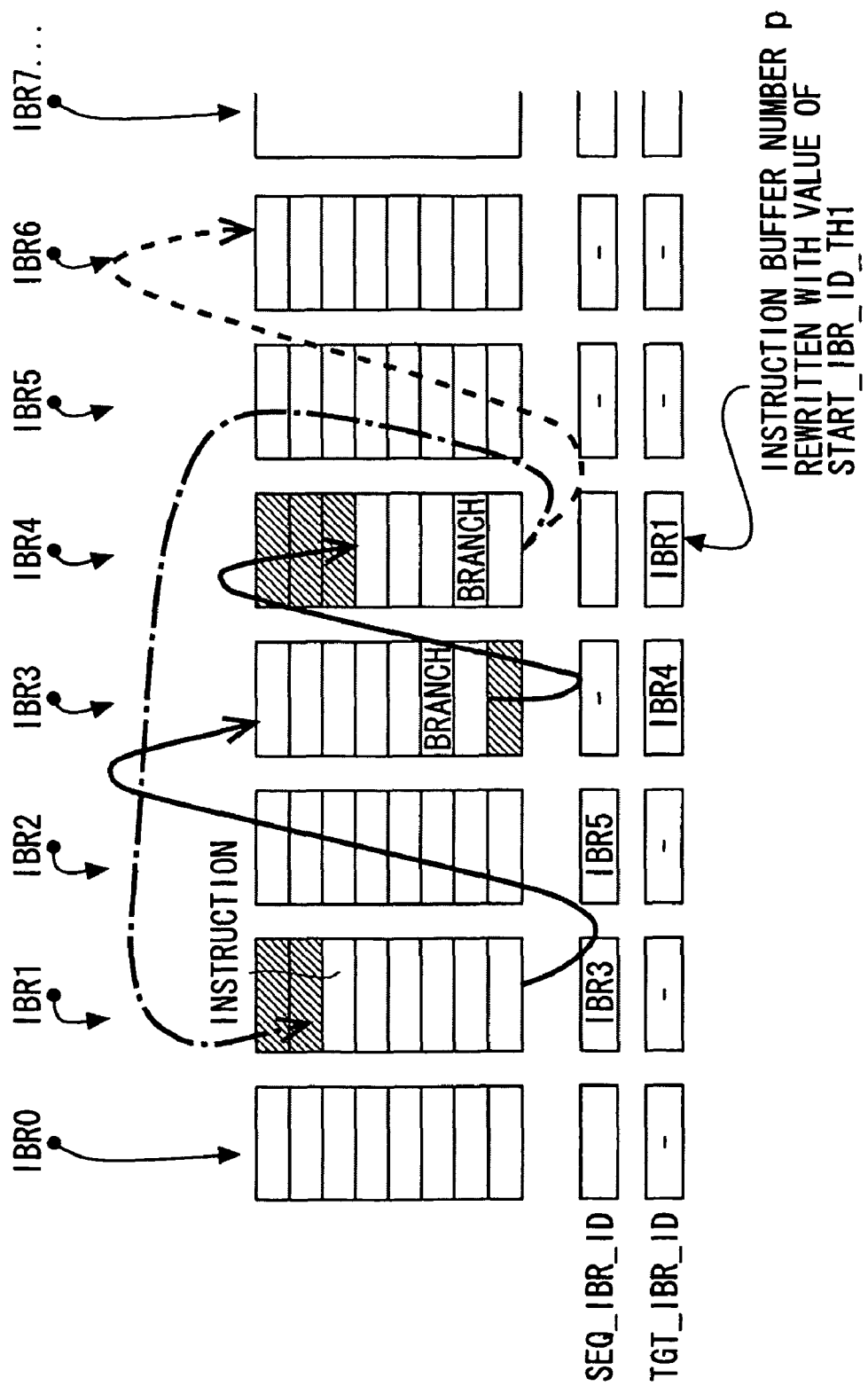
FIG. 24 is a diagram illustrating an example of forming the short loop.

FIG. 23 illustrates an example of forming the short loop by IBR1, IBR3 and IBR4 with IBR1 serving as the starting point (when p=1). Further, FIG. 24 is a diagram illustrating the short loop formed by IBR1, IBR3 and IBR4 in the plurality of instruction buffers 1 (IBR0-IBR7) including SEQ_IBR_ID and TGT_IBR_ID. In FIG. 24, a value of TGT_IBR_ID is set in IBR1, and the short loop to IBR1 is formed.

Thus, the instruction buffer 1 serving as the starting point can be set for every thread without limiting the locations by providing the starting point register START_IBR_ID_THj. It is feasible to use whichever thread as far as there is the free space and to form the short loop.

Moreover, the starting point register is registered with the buffer number of the instruction buffer employed for the reinstruction fetch at the time of the reinstruction fetch, and hence this value can be used for setting the initial value of CURRENT_STREAM_ID after the reinstruction fetch.

Accordingly, the Multi-Threading process, which utilizes the limited resources to the full, can be attained.

The resources can be always utilized without any futility by taking the configuration discussed above. Accordingly, the number of the whole instruction buffers can be restrained. As a result, this leads to a variety of merits such as restraining an increase in chip area and the power consumption.

Furthermore, this configuration enables all of the resources to be used without taking any special measures even in the case of an occurrence of, e.g., a dynamic change in process of the single-threading process from the Multi-Threading process.

To be specific, the instruction buffers 1 are not fixedly allocated to the thread, and therefore, when switched over to the single-threading process from the Multi-Thread to the single-thread, all of the instruction buffers 1, if released, can be used for the single-thread.

In the case of having a set of instruction buffers 1 for every thread, when operating (running) based on the single-thread, it follows that a mechanism given below are adopted, such as:
(1) abandoning the use of the instruction buffers for other threads; and
(2) enabling all of the instruction buffers to be employed by use of special mechanism.

Thus, the processing device exhibits a variety of great effects in the Multi-Threading process with the costs being restrained.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A processor comprising:
an executing unit to execute instructions included in a thread having a plurality of instructions;
a supplying unit to supply the instructions to the executing unit;
a buffer unit to retain the instructions to be supplied to the executing unit, the buffer unit including a plurality of buffers, each of the plurality of buffers including a plurality of entries to retain the instructions and a pointer unit to define a serial linking relationship between the buffers by setting a pointer of a first buffer to point an entry of a second buffer; and
a control unit to control each of the plurality of buffers by use of a thread allocating unit to allocate a thread to which subsequent instructions to be retained next belongs, to a next buffer to retain the subsequent instructions to be retained next to the instructions already retained in the buffer unit, to make a serial linking relationship between buffers to which the thread is allocated within the buffer unit having an other serial linking relationship between buffers to which an other thread is allocated.

2. The processor according to claim 1, further comprising:
a storage unit stored with the instructions;

an instruction fetch unit to control read of the subsequent instructions from a readout address of the storage unit and storage of the readout instruction into the next buffer;

an address retaining unit to retain the readout address of the subsequent instructions to be read next, on a per-thread basis; and a fetch thread determining unit to determine a thread to be selected in the address retaining unit provided on the per-thread basis.

3. The processor according to claim 2, wherein the address retaining unit includes:

a non-branch address retaining unit to retain a readout address of the subsequent instruction in a case of reading the subsequent instructions without a branch;

a branch target address retaining unit retaining a readout address in a case of reading the subsequent instructions from a branch target address with a branch instruction being predicted to be executed; and a reread address retaining unit to retain a readout address in a case of reading the subsequent instructions on failing to predict the branch.

4. The processor according to claim 1, wherein the pointer unit includes:

a non-branch directional pointer unit pointing a buffer to retain the subsequent instructions in a case of executing the subsequent instructions without a branch; and a branch directional pointer unit pointing a buffer to retain a branch target subsequent instructions in a case of executing the subsequent instructions according to a branch instruction.

5. The processor according to claim 2, wherein the fetch thread determining unit preferentially selects a thread having a small number of buffer in use.

6. The processor according to claim 2, further comprising a fetch sequence management unit to manage a sequence among a plurality of threads in the order of elapse time after the instruction fetch unit has read the instructions included in each of the plurality of threads, wherein the fetch thread determining unit determines a thread having a long period of elapse time as the thread to be selected.

7. The processor according to claim 6, wherein the fetch sequence management unit includes:

thread registers to retain thread identifying information of the plurality of threads in execution in the order of the elapse time;

a comparing unit to determine whether thread identifying information of the thread determined by the fetch thread determining unit is coincident with the thread identifying information within any of the thread registers; and a shift control unit to shift the thread identifying information with its coincidence being determined by the comparing unit to last one of the thread registers in the order of the elapse time, and to shift one by one forward pieces of thread identifying information retained by another thread register posterior to the thread register retaining, before being shifted, the thread identifying information shifted to the last one of the thread registers.

8. The processor according to claim 6, wherein the number of the threads, which can be processed simultaneously by the processor, is limited to "2", and the fetch sequence management unit includes:

an equi-count determining unit to determine whether in-use buffer counts for the two threads are equal;

a binary retaining unit to retain identifying information of thread undergoing the instruction fetch last time; and an inverting unit to invert information of the binary retaining unit if the in-use buffer counts for the two threads are equal.

9. The processor according to claim 2, wherein the fetch thread determining unit includes an excluding unit to exclude an instruction-fetch-disabled thread during a stop of the execution due to a failure in the branch prediction and a thread with a cache access being congested.

10. The processor according to claim 1, further comprising a supply thread determining unit to determine a supply thread corresponding to a stream in which the supplying unit is to supply the instructions to the executing unit among streams of the plurality of buffers.

11. The processor according to claim 10, wherein the supply thread determining unit preferentially determines a thread having a large number of the buffers in use as the supply thread.

12. The processor according to claim 10, further comprising a supply sequence management unit to manage a sequence among the plurality of threads in the order of elapse time after the supply unit has supplied the instructions to the executing unit, wherein the supply thread determining unit determines a thread having a long period of elapse time as the supply thread.

13. The processor according to claim 12, wherein the supply sequence management unit includes:

thread registers to retain thread identifying information of the plurality of threads in execution in the order of the elapse time;

a comparing unit to determine whether thread identifying information of the thread determined by the supply thread determining unit is coincident with the thread identifying information within any of the thread registers; and a shift control unit to shift the thread identifying information with its coincidence being determined by the comparing unit to last one of the thread registers in the order of the elapse time, and to shift one by one forward the pieces of thread identifying information retained by another thread register posterior to the thread register retaining, before being shifted, the thread identifying information shifted to the last one of the thread registers.

14. The processor according to claim 12, wherein the number of the threads, which can be processed simultaneously by the processor, is limited to "2", and the supply sequence management unit includes:

an equi-count determining unit to determine whether in-use buffer element counts for the two threads are equal;

a binary retaining unit to retain identifying information of the thread undergoing the instruction supply; and an inverting unit to invert information of the binary retaining unit when the in-use buffer counts for the two threads are equal.

15. The processor according to claim 12, further comprising:

a trace register to retain the identifying information of the thread in instruction supply;

a waiting-for-trace register to retain the identifying information of the thread with the instruction supply in a waiting status; and a replacing unit to replace the information retained in the trace register with the information retained in the waiting-for-trace register.

16. The processor according to claim 15, wherein a plurality of the waiting-for-trace registers are provided, and one of the waiting-for-trace registers is determined based on the identifying information of the thread determined by the supply thread determining unit, and the replacing unit replaces the information retained by the trace register with the information retained by the determined waiting-for-trace register.

17. The processor according to claim 1, wherein the control unit includes a release unit to release a buffer becoming unnecessary for retaining the instructions.

18. The processor according to claim 17, further comprising an identifying information retaining unit retaining the identifying information of the thread allocated to the buffer or a stream of the buffers,
wherein the release unit includes a selecting unit to generate a selection signal of the buffer to be released, from the identifying information for identifying the thread, when a cancel signal for releasing the buffer stored with not-yet-supplied instructions is transmitted, the buffer to be released being included in a stream of buffers allocated to any one of the threads.

19. The processor according to claim 17, further comprising a starting point register to specify, when a loop is formed by a stream of the buffers, any one of the buffers of the stream,
wherein the release unit includes:
a first release processing unit to select and to release the buffer specified by the starting point register when a cancel signal for releasing the buffer stored with not-yet-supplied instructions is transmitted, the buffer to be released being included in a stream of buffers allocated to any one of the threads; and
a second release processing unit to sequentially release the buffer of which a linking relationship with the released buffers is defined by a pointer of the pointer unit.

20. The processor according to claim 4, further comprising:
a starting point register to point, when a loop is formed by a stream of the buffers, any one of the buffers of the stream on the per-thread basis;
a starting point setting unit to set, in the starting point register on the per-thread basis, a branch target address with a branch prediction being made or a readout start target address from which a read of the instruction is to be started after invalidating the readout instruction as a result of the branch prediction due to the failure in the branch prediction; and
a branch directional pointer setting unit setting, when a branch prediction target address predicted by a branch predicting unit with respect to a pre-branch address is coincident with a readout address of an instruction retained in the buffer pointed by the starting point register, buffer identifying information pointed by the starting point register in the branch directional pointer unit of the buffer stored with the instruction read with the pre-branch address.

21. A processor in which a process is organized by a plurality of instructions, and a plurality of processes, which can be executed independently of each other, is each identified as a thread, the processor comprising:
an executing unit executing the instructions; and
a sequence management unit managing priority levels of the instructions,
the sequence management unit including:
thread registers to retain thread identifying information of the plurality of threads in execution in the order of the priority level;
a comparing unit determining whether thread identifying information of the thread undergoing predetermined control is coincident with the thread identifying information within any of the thread registers; and
a shift control unit to shift the thread identifying information with its coincidence being determined by the comparing unit to last one of the thread registers in the order of the priority level, and to shift one by one forward the pieces of thread identifying information retained by another thread register posterior to the thread register retaining, before being shifted, the thread identifying information shifted to the last one of the thread registers.

22. A management device to manage priority levels of processing targets for which a process is executed when the process is executed for the plurality of processing targets, comprising:
an array of retaining units to retain pieces of identifying information for identifying the processing targets according to the priority level with which the process is executed;
a comparing unit to determine, when the process is executed for any one of the processing targets, whether identifying information for identifying the one of the processing targets is coincident with the identifying information retained any of the array of retaining units; and
a shift control unit to shift the identifying information with its coincidence being determined by the comparing unit to last one of the array of retaining units in the order of the priority level, and to shift one by one forward the pieces of identifying information retained by another retaining unit posterior to the retaining unit retaining, before being shifted, the identifying information shifted to the last one of the array of retaining units.

* * * * *